(12) United States Patent
Revington et al.

(10) Patent No.: US 10,899,969 B2
(45) Date of Patent: Jan. 26, 2021

(54) ENHANCED TECHNIQUES FOR DEWATERING THICK FINE TAILINGS

(71) Applicant: SUNCOR ENERGY INC., Calgary (CA)

(72) Inventors: Adrian Revington, Fort McMurray (CA); Ana Sanchez, Calgary (CA); Trevor Bugg, Fort McMurray (CA); Oladipo Omotoso, Calgary (CA)

(73) Assignee: SUNCOR ENERGY INC., Calgary (CA)

( * ) Notice: Subject to any disclaimer, the term of this patent is extended or adjusted under 35 U.S.C. 154(b) by 737 days.

(21) Appl. No.: 14/408,690

(22) PCT Filed: Jun. 21, 2013

(86) PCT No.: PCT/CA2013/050483
§ 371 (c)(1),
(2) Date: Dec. 17, 2014

(87) PCT Pub. No.: WO2013/188982
PCT Pub. Date: Dec. 27, 2013

(65) Prior Publication Data
US 2015/0176893 A1    Jun. 25, 2015

Related U.S. Application Data

(60) Provisional application No. 61/662,726, filed on Jun. 21, 2012.

(51) Int. Cl.
*C10G 1/04* (2006.01)
*E21B 43/34* (2006.01)
(Continued)

(52) U.S. Cl.
CPC .............. *C10G 1/045* (2013.01); *B09C 1/08* (2013.01); *C02F 1/52* (2013.01); *C02F 1/56* (2013.01);
(Continued)

(58) Field of Classification Search
None
See application file for complete search history.

(56) References Cited

U.S. PATENT DOCUMENTS 5,656,174 A * 8/1997 Hodges .................. B01D 29/01
210/705
2009/0020458 A1 * 1/2009 Bozak ................ B01D 17/0205
208/390

(Continued)

FOREIGN PATENT DOCUMENTS

WO    WO-2011032258 A1 *    3/2011    ............ B01F 5/0463
WO    WO-2011050440 A1 *    5/2011    ................ F26B 5/00

OTHER PUBLICATIONS

Penner, et al. Canadian Journal of Microbiology, 2010, 56:459-470. (Year: 2010).*
(Continued)

*Primary Examiner* — Clare M Perrin
(74) *Attorney, Agent, or Firm* — BakerHostetler

(57) ABSTRACT

Techniques for dewatering thick fine tailings may include one or more pre-treatment steps, such as pre-shearing to reduce the yield stress prior to flocculation, hydrocarbon removal below a threshold to improve flocculation and dewatering, flocculant dosing on a clay basis, and providing certain properties of the thick fine tailings related to coarse and fine particle sizes and/or chemistry such as divalent cation content. Various advantages may result from pre-treatments based on thick fine tailings properties, such as reduced flocculant dosage requirements, improved dispersion of flocculant into the thick fine tailings and/or enhanced (Continued)

dewatering, for example. One or more of the pre-treatments may be performed.

42 Claims, 34 Drawing Sheets

(51) Int. Cl.
| | |
|---|---|
| C02F 1/52 | (2006.01) |
| E21B 21/06 | (2006.01) |
| B09C 1/08 | (2006.01) |
| C02F 1/56 | (2006.01) |
| F26B 1/00 | (2006.01) |
| B01D 21/01 | (2006.01) |
| C02F 103/10 | (2006.01) |
| B03D 3/06 | (2006.01) |

(52) U.S. Cl.
CPC ............ *E21B 21/063* (2013.01); *E21B 43/34* (2013.01); *F26B 1/00* (2013.01); *B01D 21/01* (2013.01); *C02F 2103/10* (2013.01); *C10G 1/04* (2013.01); *C10G 2300/1033* (2013.01); *C10G 2300/208* (2013.01)

(56) References Cited

U.S. PATENT DOCUMENTS

| | | | | |
|---|---|---|---|---|
| 2012/0018383 | A1* | 1/2012 | Sortwell | B01D 21/01 210/667 |
| 2012/0138541 | A1* | 6/2012 | Rennard | E21C 41/32 210/723 |
| 2012/0138542 | A1* | 6/2012 | Dang-Vu | B01F 5/102 210/723 |
| 2012/0248042 | A1* | 10/2012 | Baldrey | B03D 1/02 210/710 |
| 2012/0318170 | A1* | 12/2012 | Moffett | C04B 26/003 106/270 |
| 2012/0318718 | A1* | 12/2012 | Simpson | C10G 31/09 208/391 |
| 2013/0075340 | A1* | 3/2013 | Bara | C02F 1/56 210/710 |

OTHER PUBLICATIONS

Yang et al. "Computational Fluid Dynamics Modeling of Deposition of Oil Sand Slurry into Mature Fine Tailings", PhD Thesis, 2009, pp. 1-395) (Year: 2009).*
Jet Pump, accessed online Jan. 18, 2019; pp. 1-5) (Year: 2019).*
International Search Reported dated Sep. 10, 2013 from International Application No. PCT/CA2013/050483.

* cited by examiner

ENHANCED TECHNIQUES FOR DEWATERING THICK FINE TAILINGS

REFERENCE TO RELATED APPLICATIONS

This application is the U.S. national stage of International application No. PCT/CA2013/050483, filed Jun. 21, 2013, which claims the priority of Canadian application No. 61662726, filed Jun. 21, 2012, the disclosures of which are incorporated in their entireties herein.

FIELD OF INVENTION

The present invention relates to the field of dewatering thick fine tailings.

BACKGROUND OF THE INVENTION

Tailings derived from mining operations, such as oil sands mining, are often placed in dedicated disposal ponds for settling.

The settling of fine solids from the water in tailings ponds is a relatively slow process. Certain techniques have been developed for dewatering fine tailings. Dewatering of fine tailings can include contacting the fine tailings with a flocculant and then depositing the flocculated fine tailings in a deposition area where the deposited material can release water and eventually dry. In the context of dewatering thick fine tailings, there are a number of challenges related to properties of the thick fine tailings itself.

SUMMARY OF THE INVENTION

Various techniques for enhancing dewatering of thick fine tailings are described below.

In some implementations, there is provided a process for treating oil sands mature fine tailings (MFT), comprising:
  pre-shear thinning the MFT to produce a shear thinned MFT fluid;
  mixing a flocculant into the shear thinned MFT fluid to produce a mixture comprising water and flocs; and
  dewatering the mixture to allow the water to separate from the flocs.

In some implementations, the pre-shear thinning is performed so as to reduce flocculant dosage.

In some implementations, the pre-shear thinning is performed so as to increase water release from the mixture.

In some implementations, the process also includes: monitoring a viscosity or yield stress of the shear thinned MFT; and adjusting dosage of the flocculant in accordance with the measured viscosity or yield stress.

In some implementations, the pre-shear thinning imparts at least a shear equivalent to a shear rate of approximately 360 $s^{-1}$ for 70 minutes.

In some implementations, the pre-shear thinning imparts at least a shear equivalent to a shear rate of approximately 400 $s^{-1}$ for two hours.

In some implementations, the pre-shear thinning is at least partially performed by at least one high shear mixer or an ultra-high shear mixer.

In some implementations, the pre-shear thinning is at least partially performed by an in-line mixer or a tank mixer or a combination thereof.

In some implementations, the pre-shear thinning is at least partially performed by pipeline transport of the MFT.

In some implementations, the pre-shear thinning is performed proximate to the step of mixing the flocculant into the shear thinned MFT.

In some implementations, the pre-shear thinning is sufficient to reduce the yield stress of the MFT to below approximately 20 Pa. In some implementations, the pre-shear thinning is sufficient to reduce the yield stress of the MFT to below approximately 10 Pa. In some implementations, the pre-shear thinning is sufficient to reduce the yield stress of the MFT to below approximately 5 Pa. In some implementations, the pre-shear thinning is sufficient to reduce the yield stress of the MFT to below approximately 2 Pa.

In some implementations, the pre-shear thinning is sufficient to reduce the yield stress of the MFT by at least 50%. In some implementations, the pre-shear thinning is sufficient to reduce the yield stress of the MFT by at least 70%. In some implementations, the pre-shear thinning is sufficient to reduce the yield stress of the MFT by at least 90%.

In some implementations, the process also includes retrieving the MFT from a tailings pond.

In some implementations, the step of dewatering comprises depositing the mixture at a deposition site.

In some implementations, the step of dewatering comprises subjecting the mixture to thickening and/or filtering.

In some implementations, there is provided a system for treating oil sands mature fine tailings (MFT), comprising:
  a retrieval assembly for retrieving MFT from a tailings pond;
  a fluid transportation assembly for providing an MFT fluid flow;
  a pre-shearing device for shear thinning the MFT fluid flow to produce a shear thinned MFT fluid;
  a mixer for mixing a flocculant into the shear thinned MFT fluid to produce a mixture; and
  a dewatering unit for receiving the mixture and allowing separation of water from flocculated tailings solids.

In some implementations, the pre-shearing device is configured and operated to enable shear thinning sufficient to reduce flocculant dosage.

In some implementations, the pre-shearing device is configured and operated to enable shear thinning sufficient to increase water release from the mixture.

In some implementations, the system also includes: a monitoring device for monitoring a viscosity or yield stress of the shear thinned MFT; and a controller for adjusting dosage of the flocculant in accordance with the measured viscosity or yield stress.

In some implementations, the pre-shearing device comprises at least one high shear mixer or at least one ultra-high shear mixer.

In some implementations, the pre-shearing device comprises at least one in-line mixer or at least one tank mixer or a combination thereof.

In some implementations, the dewatering unit comprises a deposition site for receiving the mixture, allowing formation of a flocculated tailings deposit and release of water from the flocculated tailings deposit.

In some implementations, there is provided a process for treating fine tailings having a yield stress of at least 2 Pa and thixotropic behaviour, comprising:
  pre-shear thinning the fine tailings to produce a shear thinned tailings fluid;
  mixing a flocculant into the shear thinned tailings fluid to produce a mixture comprising water and flocs; and
  dewatering the mixture to allow water to separate from the flocs.

In some implementations, the fine tailings comprise mature fine tailings (MFT).

In some implementations, the fine tailings comprise oil sands MFT.

In some implementations, the fine tailings comprise tailings derived from an oil sands extraction operation.

In some implementations, the fine tailings comprise thick fine tailings.

In some implementations, the step of dewatering comprises depositing the mixture at a deposition site and allowing the mixture to release water and dry.

In some implementations, there is provided a method of reducing dosage of a flocculant for flocculating and dewatering thick fine tailings, comprising imparting sufficient shear thinning to the fine tailings to reduce dosage prior to mixing the flocculant therewith.

In some implementations, there is provided a method of increasing water release from flocculated thick fine tailings, comprising imparting sufficient shear thinning to the thick fine tailings to increase water release prior to mixing a flocculant therewith.

The methods may include one or more features as described in other implementations discussed herein.

In some implementations, there is provided process for treating thick fine tailings, comprising:
  pre-shear thinning the thick fine tailings to produce a shear thinned thick fine tailings fluid;
  mixing a flocculant into the shear thinned thick fine tailings fluid to produce a mixture comprising water and flocs; and
  dewatering the mixture to allow water to separate from the flocs.

In some implementations, the pre-shear thinning is performed so as to reduce flocculant dosage.

In some implementations, the pre-shear thinning is performed so as to increase water release from the mixture.

In some implementations, the process also includes: monitoring a viscosity or yield stress of the shear thinned thick fine tailings fluid; and adjusting dosage of the flocculant in accordance with the measured viscosity or yield stress.

In some implementations, the pre-shear thinning imparts at least a shear equivalent to a shear rate of approximately 360 s$^{-1}$ for 70 minutes.

In some implementations, the pre-shear thinning imparts at least a shear equivalent to a shear rate of approximately 400 s$^{-1}$ for two hours.

In some implementations, the pre-shear thinning is at least partially performed by at least one high shear mixer or an ultra-high shear mixer.

In some implementations, the pre-shear thinning is at least partially performed by an in-line mixer or a tank mixer or a combination thereof.

In some implementations, the pre-shear thinning is at least partially performed by pipeline transport of the thick fine tailings.

In some implementations, the pre-shear thinning is performed proximate to the step of mixing the flocculant into the shear thinned thick fine tailings.

In some implementations, the pre-shear thinning is sufficient to reduce the yield stress of the thick fine tailings to below approximately 20 Pa. In some implementations, the pre-shear thinning is sufficient to reduce the yield stress of the thick fine tailings to below approximately 10 Pa. In some implementations, the pre-shear thinning is sufficient to reduce the yield stress of the thick fine tailings to below approximately 5 Pa. In some implementations, the pre-shear thinning is sufficient to reduce the yield stress of the thick fine tailings to below approximately 2 Pa.

In some implementations, the pre-shear thinning is sufficient to reduce the yield stress of the thick fine tailings by at least 50%. In some implementations, the pre-shear thinning is sufficient to reduce the yield stress of the thick fine tailings by at least 70%. In some implementations, the pre-shear thinning is sufficient to reduce the yield stress of the thick fine tailings by at least 90%.

In some implementations, the process includes retrieving the thick fine tailings from a tailings pond.

In some implementations, the step of dewatering comprises depositing the mixture at a deposition site. In some implementations, the step of dewatering comprises subjecting the mixture to thickening and/or filtering.

In some implementations, there is provided a system for treating thick fine tailings, comprising:
  a retrieval assembly for retrieving thick fine tailings from a tailings pond;
  a fluid transportation assembly for providing a thick fine tailings fluid flow;
  a pre-shearing device for shear thinning the thick fine tailings fluid flow to produce a shear thinned fluid;
  a mixer for mixing a flocculant into the shear thinned fluid to produce a mixture comprising water and flocs; and
  a dewatering unit for receiving the mixture and allowing separation of water from flocculated tailings solids.

In some implementations, the pre-shearing device is configured and operated to enable shear thinning sufficient to reduce flocculant dosage.

In some implementations, the pre-shearing device is configured and operated to enable shear thinning sufficient to increase water release from the mixture.

In some implementations, the system also has a monitoring device for monitoring a viscosity or yield stress of the shear thinned thick fine tailings fluid; and a controller for adjusting dosage of the flocculant in accordance with the measured viscosity or yield stress.

In some implementations, the pre-shearing device comprises at least one high shear mixer or at least one ultra-high shear mixer.

In some implementations, the pre-shearing device comprises at least one in-line mixer or at least one tank mixer or a combination thereof.

In some implementations, the dewatering unit comprises a deposition site for receiving the mixture, allowing formation of a flocculated tailings deposit and release of water from the flocculated tailings deposit.

In some implementations, there is provided a process for treating oil sands mature fine tailings (MFT), comprising:
  thinning the MFT to produce a thinned MFT fluid having reduced yield stress;
  mixing a flocculant into the thinned MFT fluid to produce a mixture comprising water and flocs; and
  dewatering the mixture to allow water to separate from the flocs.

In some implementations, the step of dewatering comprises depositing the mixture at a deposition site.

In some implementations, the step of dewatering comprises subjecting the mixture to thickening and/or filtering.

In some implementations, the thinning comprises mechanically shearing the MFT.

In some implementations, the thinning comprises introducing a chemical additive into the MFT.

In some implementations, the thinning comprises reducing or removing free divalent cations in the MFT. In some implementations, the divalent cations comprise calcium cations. In some implementations, the thinning comprises increasing calcium cations associated with clay platelets in the MFT.

In some implementations, the process also includes adding an amount of calcium cations to the MFT and providing sufficient time to allow the calcium cations to associate with clay platelets in the MFT.

In some implementations, the flocculant comprises an anionic polymer flocculant. In some implementations, the flocculant comprises a sodium salt of an anionic polymer flocculant. In some implementations, the flocculant comprises a 30% anionic sodium polyacrylamide-polyacrylate polymer flocculant.

In some implementations, the process includes retrieving the MFT from a tailings pond.

In some implementations, there is provided a process for treating thick fine tailings, comprising:
  thinning the thick fine tailings to produce a thinned fluid having reduced yield stress;
  mixing a flocculant into the thinned fluid to produce a mixture comprising water and flocs; and
  dewatering the mixture to allow water to separate from the flocs.

In some implementations, the step of dewatering comprises depositing the mixture at a deposition site.

In some implementations, the step of dewatering comprises subjecting the mixture to thickening and/or filtering.

In some implementations, there is provided a process for treating oil sands mature fine tailings (MFT), comprising:
  controlling the MFT at a bitumen content below 5 wt % on a total solids basis to provide a low bitumen content MFT;
  mixing a flocculant into the low bitumen content MFT to produce a mixture comprising water and flocs; and
  dewatering the mixture to allow water to separate from the flocs.

In some implementations, the step of controlling the MFT comprises removing residual bitumen from the MFT to provide the low bitumen content MFT as a bitumen depleted MFT having a bitumen content below 5 wt % on a total solids basis.

In some implementations, the step of removing residual bitumen comprises performing floatation.

In some implementations, the step of removing residual bitumen further comprises: pre-shearing the MFT to produce a pre-sheared MFT having reduced yield stress; and subjecting the pre-sheared MFT to a separation stage to remove the bitumen from the MFT.

In some implementations, the separation stage includes: feeding the pre-sheared MFT into a separation vessel; recovering a bitumen rich overflow stream; and withdrawing the bitumen depleted MFT as an underflow stream.

In some implementations, the step of controlling the MFT comprises selecting the MFT to be treated to have a bitumen content below 5 wt % on a total solids basis.

In some implementations, the flocculant comprises an anionic polymer flocculant. In some implementations, the flocculant comprises a sodium salt of an anionic polymer flocculant. In some implementations, the flocculant comprises a 30% anionic sodium polyacrylamide-polyacrylate polymer flocculant.

In some implementations, the step of controlling the MFT is performed such that the bitumen content is below 2 wt % on a total solids basis for MFT with at least 0.4 clay-to-water ratio (CWR), or below 4 wt % on a total solids basis for MFT with between 0.2 and 0.35 CWR.

In some implementations, the process also includes monitoring bitumen content and the CWR in the MFT; and adjusting control of the bitumen content based on the measured bitumen content and the CWR.

In some implementations, the step of controlling the MFT is performed such that the bitumen content of the MFT is below a threshold enabling a net water release (NWR) of at least 15%.

In some implementations, the step of dewatering comprises depositing the mixture at a deposition site.

In some implementations, the step of dewatering comprises subjecting the mixture to thickening and/or filtering.

In some implementations, there is provided a method for increasing water release from flocculated thick fine tailings, comprising reducing bitumen content in the thick fine tailings prior to mixing a flocculant therewith and subjecting the flocculated thick fine tailings to dewatering.

In some implementations, the flocculant comprises an anionic polymer flocculant. In some implementations, the flocculant comprises a sodium salt of an anionic polymer flocculant. In some implementations, the flocculant comprises a 30% anionic sodium polyacrylamide-polyacrylate polymer flocculant.

In some implementations, there is provided a process for treating thick fine tailings comprising hydrocarbons, comprising:
  removing an amount of the hydrocarbons from the thick fine tailings to provide a hydrocarbon depleted tailings having a hydrocarbon content below 5 wt % on a total solids basis;
  mixing a flocculant into the hydrocarbon depleted tailings to produce a mixture comprising water and flocs; and
  dewatering the mixture to allow water to separate from the flocs.

In some implementations, the step of dewatering comprises depositing the mixture at a deposition site.

In some implementations, the step of dewatering comprises subjecting the mixture to thickening and/or filtering.

In some implementations, the hydrocarbons comprise heavy hydrocarbons. In some implementations, the hydrocarbons comprise bitumen.

In some implementations, the step of removing hydrocarbons comprises performing floatation.

In some implementations, the step of removing hydrocarbons comprises: pre-shearing the thick fine tailings to produce a pre-sheared fine tailings having reduced yield stress; and subjecting the pre-sheared fine tailings to a separation stage to remove the hydrocarbons from the fine tailings.

In some implementations, the separation stage includes: feeding the pre-sheared fine tailings into a separation vessel; recovering a hydrocarbons rich overflow stream; and withdrawing the hydrocarbon depleted fine tailings as an underflow stream.

In some implementations, the flocculant comprises an anionic polymer flocculant. In some implementations, the flocculant comprises a sodium salt of an anionic polymer flocculant. In some implementations, the flocculant comprises a 30% anionic sodium polyacrylamide-polyacrylate polymer flocculant.

In some implementations, the step of removing the hydrocarbons is performed such that the hydrocarbon content is below 2 wt % on a total solids basis for thick fine tailings with at least 0.4 CWR, or below 4 wt % on a total solids basis for thick fine tailings with between 0.2 and 0.35 CWR.

In some implementations, the process includes monitoring hydrocarbon content and CWR in the thick fine tailings;

and adjusting control of the hydrocarbon content based on the measured hydrocarbon content and CWR.

In some implementations, the hydrocarbon content of the thick fine tailings below a threshold enabling a net water release (NWR) of at least 15%.

In some implementations, there is provided a method for increasing water release from flocculated thick fine tailings, comprising reducing hydrocarbon content in the fine tailings prior to mixing a flocculant therewith and subjecting the flocculated thick fine tailings to dewatering.

In some implementations, the flocculant comprises an anionic polymer flocculant. In some implementations, the flocculant comprises a sodium salt of an anionic polymer flocculant. In some implementations, the flocculant comprises a 30% anionic sodium polyacrylamide-polyacrylate polymer flocculant.

In some implementations, there is provided a process for treating oil sands mature fine tailings (MFT), comprising:
  determining clay content of the MFT;
  dosing a flocculant in accordance with the clay content of the MFT and mixing the flocculant into the MFT to produce a mixture; and
  dewatering the mixture to allow water to separate from the flocs.

In some implementations, the step of dewatering comprises depositing the mixture at a deposition site.

In some implementations, the step of dewatering comprises subjecting the mixture to thickening and/or filtering.

In some implementations, the clay content is above 80% on a total solids basis.

In some implementations, the MFT has a clay-to-water ratio (CWR) between 0.2 and 0.4 and a sands-to-fine ratio (SFR) below 1.

In some implementations, the step of determining the clay content of the MFT comprises conducting a methylene blue test or using an estimate based on viscosity measurement of the MFT.

In some implementations, the process also includes pre-shearing the MFT prior to the step of determining clay content to produce a pre-sheared MFT.

In some implementations, the step of determining the clay content of the MFT comprises using an estimate based on viscosity measurement of the pre-sheared MFT.

In some implementations, the process includes adjusting the dosing of the flocculant in accordance with the determined clay content.

In some implementations, there is provided a process for treating thick fine tailings, comprising:
  determining clay content of the thick fine tailings;
  dosing a flocculant in accordance with the clay content of the thick fine tailings and mixing the flocculant into the thick fine tailings to produce a mixture comprising water and flocs; and
  dewatering the mixture to allow water to separate from the flocs.

In some implementations, the step of dewatering comprises depositing the mixture at a deposition site.

In some implementations, the step of dewatering comprises subjecting the mixture to thickening and/or filtering.

In some implementations, the clay content is above 80% on a total solids basis.

In some implementations, the thick fine tailings has a clay-to-water ratio (CWR) between 0.2 and 0.4 and a sands-to-fine ratio (SFR) below 1.

In some implementations, the step of determining the clay content of the thick fine tailings comprises conducting a methylene blue test or using an estimate based on viscosity measurement of the thick fine tailings.

In some implementations, the process also includes pre-shearing the thick fine tailings prior to the step of determining clay content to produce a pre-sheared fine tailings.

In some implementations, the step of determining the clay content of the thick fine tailings comprises using an estimate based on viscosity measurement of the pre-sheared thick fine tailings.

In some implementations, the process also includes adjusting the dosing of the flocculant in accordance with the determined clay content.

In some implementations, the flocculant comprises an anionic polymer flocculant. In some implementations, the flocculant comprises a sodium salt of an anionic polymer flocculant. In some implementations, the flocculant comprises a 30% anionic sodium polyacrylamide-polyacrylate polymer flocculant.

In some implementations, there is provided a process for treating thick fine tailings, comprising:
  providing a sand-to-fines ratio (SFR) of the thick fine tailings below 1;
  mixing a flocculant into the thick fine tailings to produce a mixture; and
  dewatering the mixture to allow water to separate from the flocs.

In some implementations, the step of dewatering comprises depositing the mixture at a deposition site.

In some implementations, the step of dewatering comprises subjecting the mixture to thickening and/or filtering.

In some implementations, the process includes providing the sand-to-fines ratio (SFR) of the thick fine tailings below 0.5.

In some implementations, the process includes providing a clay-to-water ratio (CWR) of the thick fine tailings of between 0.2 and 0.4.

In some implementations, the process includes adding a coagulant to the thick fine tailings to reduce the SFR.

In some implementations, the flocculant comprises an anionic polymer flocculant. In some implementations, the flocculant comprises a sodium salt of an anionic polymer flocculant. In some implementations, the flocculant comprises a 30% anionic sodium polyacrylamide-polyacrylate polymer flocculant.

In some implementations, the thick fine tailings comprise mature fine tailings (MFT). In some implementations, the thick fine tailings comprise tailings derived from an oil sands extraction operation.

In some implementations, there is provided a process for treating thick fine tailings, comprising:
  co-adding sand and calcium to the thick fine tailings;
  mixing a flocculant into the thick fine tailings to produce a mixture; and
  dewatering the mixture to allow water to separate from the flocs.

In some implementations, the step of dewatering comprises depositing the mixture at a deposition site.

In some implementations, the step of dewatering comprises subjecting the mixture to thickening and/or filtering.

In some implementations, the step of co-adding sand and calcium comprises adding the sand and the calcium at the same time.

In some implementations, the step of co-adding sand and calcium comprises adding the sand and the calcium at different times prior to mixing the flocculant.

In some implementations, the adding of the sand provides the thick fine tailings with a sand-to-fines ratio (SFR) of at least 0.5.

In some implementations, the adding of the sand provides the thick fine tailings with a sand-to-fines ratio (SFR) of between 0.5 and 2.

In some implementations, the adding of the sand provides the thick fine tailings with a sand-to-fines ratio (SFR) of between 1 and 2.

In some implementations, at least 0.006 grams of calcium per gram of clay is added to the thick fine tailings.

In some implementations, the calcium is added to the thick fine tailings with a reaction time of at least 12 hours prior to mixing the flocculant therewith.

In some implementations, the calcium is added in the form of gypsum.

In some implementations, the sand is added in the form of a sand-containing tailings stream.

In some implementations, the thick fine tailings comprise mature fine tailings (MFT). In some implementations, the thick fine tailings comprise tailings derived from an oil sands extraction operation.

In some implementations, there is provided a method of increasing water release from flocculated thick fine tailings, comprising providing the thick fine tailings with sufficient sand and calcium content prior to mixing a flocculant therewith and subjecting the flocculated thick fine tailings to dewatering.

In some implementations, the sand and calcium content are provided by adding sand and calcium to the thick fine tailings retrieved from a tailings pond.

In some implementations, the sand and calcium content are provided by retrieving the thick fine tailings from a location in a tailings pond having the sand and calcium content.

In some implementations, the thick fine tailings comprise mature fine tailings (MFT). In some implementations, the thick fine tailings comprises tailings derived from an oil sands extraction operation.

In some implementations, there is provided a process for treating thick fine tailings, comprising:
  adding calcium to the thick fine tailings in an amount and with sufficient reaction time prior to flocculation to allow association of the calcium with clay platelets in the thick fine tailings;
  mixing a flocculant into the thick fine tailings to produce a mixture; and dewatering the mixture to allow water to separate from the flocs.

In some implementations, the step of dewatering comprises depositing the mixture at a deposition site.

In some implementations, the step of dewatering comprises subjecting the mixture to thickening and/or filtering.

In some implementations, the calcium is added to the thick fine tailings in an amount and with sufficient reaction time prior to the flocculation to enable clarification of release water compared to no calcium addition.

In some implementations, the calcium is added to the thick fine tailings in an amount and with sufficient reaction time prior to the flocculation to enable increased water release compared to no calcium addition.

In some implementations, the calcium is added to the thick fine tailings in an amount and with sufficient reaction time prior to the flocculation to enable decreased flocculant dose compared to no calcium addition.

In some implementations, the calcium is added to the thick fine tailings in an amount and with sufficient reaction time to minimize free calcium cations in interstitial water of the thick fine tailings.

In some implementations, the calcium is added to the thick fine tailings in an amount and with sufficient reaction time to avoid precipitation of the flocculant.

In some implementations, the flocculant comprises an anionic polymer flocculant. In some implementations, the flocculant comprises a sodium salt of an anionic polymer flocculant. In some implementations, the flocculant comprises a 30% anionic sodium polyacrylamide-polyacrylate polymer flocculant.

In some implementations, the calcium is added in an amount between 20 ppm and 2000 ppm. In some implementations, the calcium is added in an amount between 40 ppm and 1000 ppm. In some implementations, the calcium is added in an amount between 60 ppm and 500 ppm. In some implementations, the calcium is added in an amount between 100 ppm and 200 ppm.

In some implementations, the calcium is added with sufficient reaction time prior to flocculation, of at least 12 hours. In some implementations, the calcium is added with sufficient reaction time prior to flocculation, of at least 24 hours. In some implementations, the calcium is added with sufficient reaction time prior to flocculation, of at least 2 days. In some implementations, the calcium is added with sufficient reaction time prior to flocculation, of at least 2 weeks.

In some implementations, the calcium is added in the form of gypsum.

In some implementations, the calcium is added in the form of a tailings stream having a higher level of calcium than the thick fine tailings.

In some implementations, the thick fine tailings comprise mature fine tailings (MFT). In some implementations, the thick fine tailings comprises tailings derived from an oil sands extraction operation.

In some implementations, there is a process for treating thick fine tailings, comprising:
  mapping a tailings pond containing thick fine tailings to identify a plurality of pond locations having determined clay-to-water ratio (CWR), sand-to-fines ratio (SFR), calcium content, heavy hydrocarbon or bitumen content, water content, yield stress and/or clay content;
  retrieving thick fine tailings from one of the pond locations to produce a thick fine tailings stream having determined properties;
  treating the thick fine tailings stream with a dewatering chemical based on the determined properties to produce a mixture; and
  dewatering the mixture to allow water to separate from the flocs.

In some implementations, the step of dewatering comprises depositing the mixture at a deposition site.

In some implementations, the step of dewatering comprises subjecting the mixture to thickening and/or filtering.

In some implementations, the process also includes retrieving the thick fine tailings from a pond location having a depth such that the thick fine tailings has a CWR between 0.2 and 0.4 and a SFR below 1.

In some implementations, the process also includes retrieving the thick fine tailings from a pond location such that the thick fine tailings has a hydrocarbon or bitumen content below 5 wt %.

In some implementations, the process also includes retrieving the thick fine tailings from a pond location such that the thick fine tailings has calcium content sufficient to enhance clarification of release water and/or increase water release.

In some implementations, the process also includes retrieving the thick fine tailings from a pond location such that the thick fine tailings has a yield stress below 20 Pa.

In some implementations, the process also includes retrieving the thick fine tailings from a pond location such that the thick fine tailings has a yield stress below 15 Pa.

In some implementations, the process also includes retrieving the thick fine tailings from a pond location such that the thick fine tailings has a yield stress below 10 Pa.

In some implementations, the process also includes retrieving the thick fine tailings from a pond location such that the thick fine tailings has a substantially constant CWR, and dosing the dewatering chemical based on the CWR.

In some implementations, the mapping comprises obtaining a plurality of samples from the plurality of pond locations, measuring properties of the samples, and recording the properties for each of the pond locations.

In some implementations, the mapping comprises monitoring composition and flow rate of new tailings fed to the tailings pond.

In some implementations, the mapping comprises determining pond locations in three dimensions.

In some implementations, the process also includes mapping a plurality of tailings ponds and determining pond locations in different tailings ponds that contain thick fine tailings.

In some implementations, the process also includes blending together thick fine tailings having complementary properties from different tailings ponds to produce a blended thick fine tailings mixture, prior to treating the blended thick fine tailings mixture with the dewatering chemical.

In some implementations, the dewatering chemical comprises a flocculant. In some implementations, the flocculant comprises an anionic polymer flocculant. In some implementations, the flocculant comprises a sodium salt of an anionic polymer flocculant. In some implementations, the flocculant comprises a 30% anionic sodium polyacrylamide-polyacrylate polymer flocculant.

In some implementations, the thick fine tailings comprise mature fine tailings (MFT). In some implementations, the thick fine tailings comprises tailings derived from an oil sands extraction operation.

It should also be noted that various features, step and implementations described above may be combined with other features, step and implementations described above or herein. For example, one or more pre-treatment methods may be selected in accordance with given thick fine tailings properties. For instance, in the case where the thick fine tailings to be treated has higher bitumen content (e.g., higher than 5 wt %) a bitumen removal step may be included, whereas in the case that the thick fine tailings to be treated has a bitumen content lower than 5 wt % one may opt not to implement a bitumen removal step. Likewise, in the case where the thick fine tailings to be treated has an initial low yield strength (e.g., lower than 5 to 15 Pa), a pre-shearing step may not be performed, although it may still be performed to further reduce polymer dosage. In some scenarios, the thick fine tailings to be treated may have one or more features where certain selected pre-treatment(s) would be beneficial, and thus may be selected based upon an initial analysis of the thick fine tailings.

DETAILED DESCRIPTION

Figure 1:
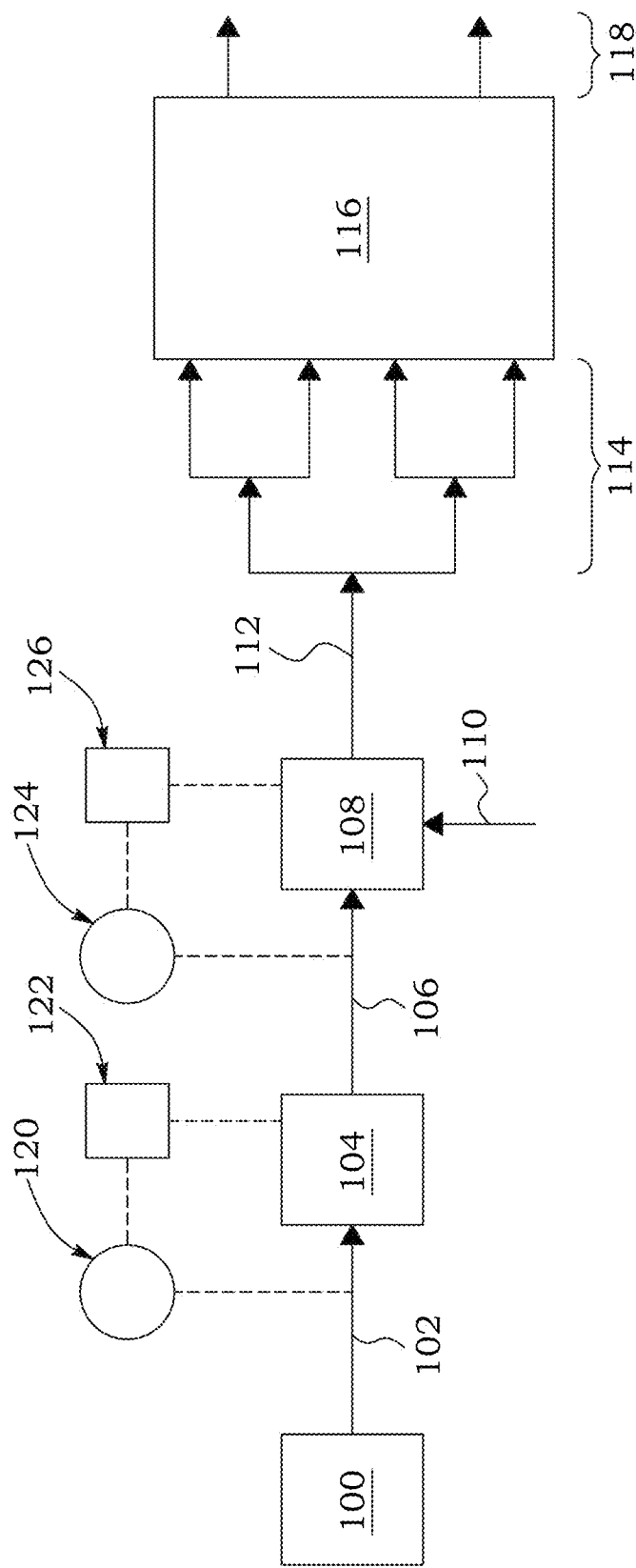
FIG. 1 is a block diagram.

Thick fine tailings dewatering techniques may include various steps for pre-treating the thick fine tailings, chemically modifying the thick fine tailings by addition of a dewatering chemical such as a polymer flocculant, as well as monitoring or managing physical and chemical properties of the thick fine tailings.

Many different types of tailings may be treated using one or more of the techniques described herein. In some implementations, the techniques described can be used for "thick fine tailings", where thick fine tailings are suspensions derived from a mining operation and mainly include water and fines. The fines are small solid particulates having various sizes up to about 44 microns. The thick fine tailings have a solids content with a fines portion sufficiently high such that the fines tend to remain in suspension in the water and the material has slow consolidation rates. More particularly, the thick fine tailings may have a ratio of coarse particles to the fines that is less than or equal to 1. The thick fine tailings has a fines content sufficiently high such that flocculation of the fines and conditioning of the flocculated material can achieve a two phase material where release water can flow through and away from the flocs. For example, thick fine tailings may have a solids content between 10 wt % and 45 wt %, and a fines content of at least 50 wt % on a total solids basis, giving the material a relatively low sand or coarse solids content. The thick fine tailings may be retrieved from a tailings pond, for example, and may include what is commonly referred to as "mature fine tailings" (MFT).

"MFT" refers to a tailings fluid that typically forms as a layer in a tailings pond and contains water and an elevated content of fine solids that display relatively slow settling rates. For example, when whole tailings (which include coarse solid material, fine solids, and water) or thin fine tailings (which include a relatively low content of fine solids and a high water content) are supplied to a tailings pond, the tailings separate by gravity into different layers over time. The bottom layer is predominantly coarse material, such as sand, and the top layer is predominantly water. The middle layer is relatively sand depleted, but still has a fair amount of fine solids suspended in the aqueous phase. This middle layer is often referred to as MFT. MFT can be formed from various different types of mine tailings that are derived from the processing of different types of mined ore. While the formation of MFT typically takes a fair amount of time (e.g., between 1 and 3 years under gravity settling conditions in the pond) when derived from certain whole tailings supplied form an extraction operation, it should be noted that MFT and MFT-like materials may be formed more rapidly depending on the composition and post-extraction processing of the tailings, which may include thickening or other separation steps that may remove a certain amount of coarse solids and/or water prior to supplying the processed tailings to the tailings pond.

It should also be noted that certain aspects of the dewatering techniques described herein may be adapted for different types of thick fine tailings. For example, the structure, properties and dosage range of the dewatering chemical, such as a polymer flocculant, may be modified and provided depending affinities with the particular type of thick fine tailings. In addition, certain pre-treatment steps may be performed for thick fine tailings having certain properties and compositions. For example, thick fine tailings containing quantities of hydrocarbons, e.g. heavy hydrocarbons such as bitumen, which would interfere with flocculation, may be subjected to an initial hydrocarbon removal step below a threshold concentration. In another example, thick fine tailings having a relatively high static yield stress, for example due to having a composition with a relatively high fines content and density, may be subjected to a pre-shear thinning treatment prior to addition of the dewatering chemical.

In general, thick fine tailings will have properties depending on its processing history and the nature of the mined ore from which it was derived.

Dewatering techniques can be influenced by various properties of the thick fine tailings being treated. Some of the properties that can influence the process are yield stress, viscosity, clay-to-water ratio (CWR), sand-to-fines ratio (SFR), clay content, bitumen content, salt content, and various other chemical and rheological properties.

Various techniques may be implemented to improve the dewatering operation in accordance with certain properties of the thick fine tailings.

Thinning Pre-Treatment of Thick Fine Tailings

Pre-treating the thick fine tailings in order to reduce its yield stress or viscosity prior to mixing with a dewatering chemical, such as a polymer flocculant, has been found to improve dewatering operations. For example, thinning the thick fine tailings can reduce the flocculant dose requirements and/or increase the water release from the flocculated material.

Thinning pre-treatments may be conducted in a number of ways, including mechanical and chemical treatments. Mechanical treatment may include shear thinning. Chemical treatments may include chemical addition, removal, adjustment or neutralization of components in the thick fine tailings that cause certain rheological behaviour such as high viscosity or high yield stress.

Shear Thinning Pre-Treatment of Thick Fine Tailings

In some implementations, for treating thick fine tailings having an elevated initial yield stress and thixotropic properties, the dewatering operation for separating water from thick fine tailings, such as oil sands MFT, may include a pre-shearing step for producing a shear thinned tailings fluid prior to addition and mixing of a polymer flocculant to produce a flocculated material. The flocculated material may then be deposited for water release and drying. In some implementations, the shear thinning step can enable a reduction in flocculant requirements to produce the flocculated deposition material for dewatering and/or can increases the water release from the flocculated material.

Figure 2:
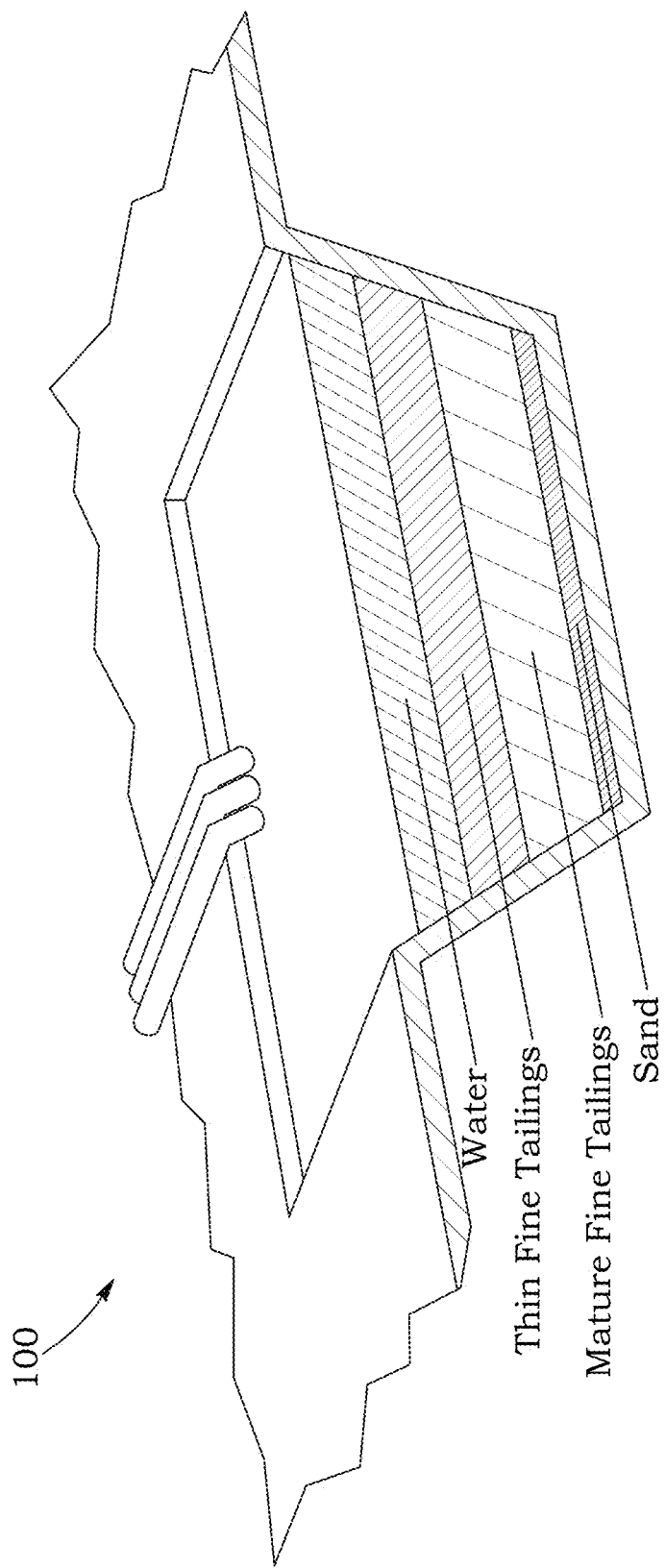
FIG. 2 is a perspective schematic of a tailings pond.

Referring to FIG. 1, in some implementations, the dewatering operation includes a thick fine tailings source 100, which may be a tailings pond for example, from which a flow of tailings 102 is retrieved by dredge or another type of pumping arrangement. For example, the thick fine tailings 102 may be oil sands thick fine tailings derived from an oil sands extraction operation. In addition, the oil sands thick fine tailings may be oil sands mature fine tailings (MFT). FIG. 2 illustrates oil sands MFT in a tailings pond that may be retrieved for processing in the dewatering operation.

It should also be understood that other types of mature fine tailings derived from other mining operations may also be treated in the dewatering operation. For example, thick fine tailings having an elevated initial yield stress and thixotropic properties, due to having a relatively high fines content and high density as well as the chemical properties of the solid and liquid components. Thixotropy is a reversible time dependent decrease in viscosity. A given thick fine tailings sample may be obtained and tested for yield stress and thixotropic behaviour prior to implementing shear thinning pre-treatment. Thixotropic behaviour is far more common than rheopectic behaviour (shear thickening response). For example, some coal-water slurries have been observed to exhibit rheopectic behaviour. The shear response of a given thick fine tailings may be easily determined using standard laboratory testing methods. When using shear-thinning pre-treatment to enhance dewatering, the shear-thinning pre-treatment should be performed on thick fine tailings having an elevated initial yield stress and thixotropic properties.

Referring still to FIG. 1, the tailings 102 may be subjected to pre-shearing in a pre-shear unit 104 for producing a shear thinned tailings flow 106 that is then supplied to a chemical addition unit 108 for contacting and mixing with a dewatering chemical 110, such as a flocculant. Once the shear thinned tailings 106 is mixed with the flocculant 110, a flocculated mixture 112 may be pipelined to a discharge assembly 114 that discharges the mixture onto a sub-aerial deposition site 116 for water release. The mixture may include water already released from flocculated material, i.e. includes water and flocs. So when the mixture is deposited the water separates from the flocs, e.g., by gravity drainage, and evaporation. In some implementations the deposition site can be sloped so that water separating from the flocs is assisted by gravity drainage. The released water may drain and be recovered by a water recovery pipe assembly 118 for recycling to various mining operations, such as extraction operations, water treatment facilities or other operations requiring process water.

In some implementations, the pre-shear unit 104 includes an in-line mixing unit upstream and relatively close to the flocculant addition unit 108. The in-line mixing unit may be configured and operated to provide vigorous mixing of the thick fine tailings before the flocculant addition sufficient to reduce the optimal flocculant dosage for dewatering.

Vigorous shearing of thick fine tailings, such as MFT, lowers the yield stress, viscosity and can also lower the flocculant dosage. Shear thinning can also increase water release from the flocculated material. The shear thinning includes a relatively high shear rate, which may be provided and adjusted in accordance with the source thick fine tailings and its thixotropic properties. For instance, it was found that a same shear rate imparted to different oil sands MFT sources resulted different final static yield stress values (e.g. about 2 Pa versus about 7 Pa). It was also found that a same shear rate imparted to different oil sands MFT sources resulted different flocculant requirement reductions (e.g. about 34% versus about 40%).

In some implementations, the shear thinning system also includes a first measurement device 120 for measuring a rheological property of the thick fine tailings 112, e.g. properties such as yield stress and viscosity. The first measurement device 120 may be in-line just prior to the pre-shear unit 104 in order to measure the initial yield stress and possibly also the viscosity of the thick fine tailings 102. There may be a first control device 122 coupled to the first measurement device 120 and the pre-shear unit 104, in order to adjust the level of shearing imparted by the pre-shear unit 104 to the thick fine tailings. The pre-shear unit 104 may include static or dynamic devices and shearing may or may not be continuously adjusted. The process operating conditions, such as the flow rate of the thick fine tailings, and the design of the pre-shear unit may be provided to ensure sufficient shear to reduce the yield stress of the thick fine tailings below a certain threshold.

In some implementations, the shear thinning system also includes a second measurement device 124 for measuring a rheological property of the shear thinned fine tailings 106 prior to the chemical addition unit 108, which may be a flocculant injection device. There may be a second control device 126 coupled to the second measurement device 124 and the chemical addition unit 108 in order to allow flocculant dosing to be adjusted based on the rheological property, e.g. properties such as yield stress and viscosity.

The first and/or second measurement devices may measure other properties of the thick fine tailings, such as clay content, composition, etc. The measurements of certain compositional properties may be correlated to determine other properties of the thick fine tailings, e.g. rheological properties.

In some implementations, the pre-shear unit 104 may include an in-line mixer. For example, the pre-shear unit 104 may include at least one static mixer (e.g. a static vane mixer such as a Komax™ mixer), an impeller tank mixer, or a pump configured to impart sufficient shear to the thick fine tailings, or a combination thereof. The pre-shear unit 104 may include a batch high-shear mixer having a rotating shaft and the bottom of a tank, an in-line high shear mixer having a rotor-stator arrangement, and/or an ultra-high-shear in-line mixer where the high-shear mixing takes place in a single or multiple passes through a rotor-stator array, and/or another type of mixer that imparts shear and allows thinning of the thick fine tailings. One or more mixers may also be used in series or in parallel.

The chemical addition unit 108 may be any kind of device for dispersion of the dewatering chemical with the shear thinned fine tailings. The type of chemical addition unit 108 depends on the state and properties of the dewatering chemical that is dispersed into the thick fine tailings. For instance, the dewatering chemical may be added dissolved in aqueous solution, dispersed in water, or as a solid particle or powder form. The chemical addition unit 108 may include an injector/mixer that is provided as a solid-liquid mixer, liquid-liquid mixer, in-line static mixer, impeller mixer, tank mixer, T-joint mixer, Y-joint mixer, or another type of mixer. In some scenarios, the chemical addition unit 108 may be selected and operated to provide rapid dispersion of the chemical into the pre-treated thick fine tailings. The chemical addition unit may include one or more chemical injectors, which may be used in series or in parallel.

Figure 3:
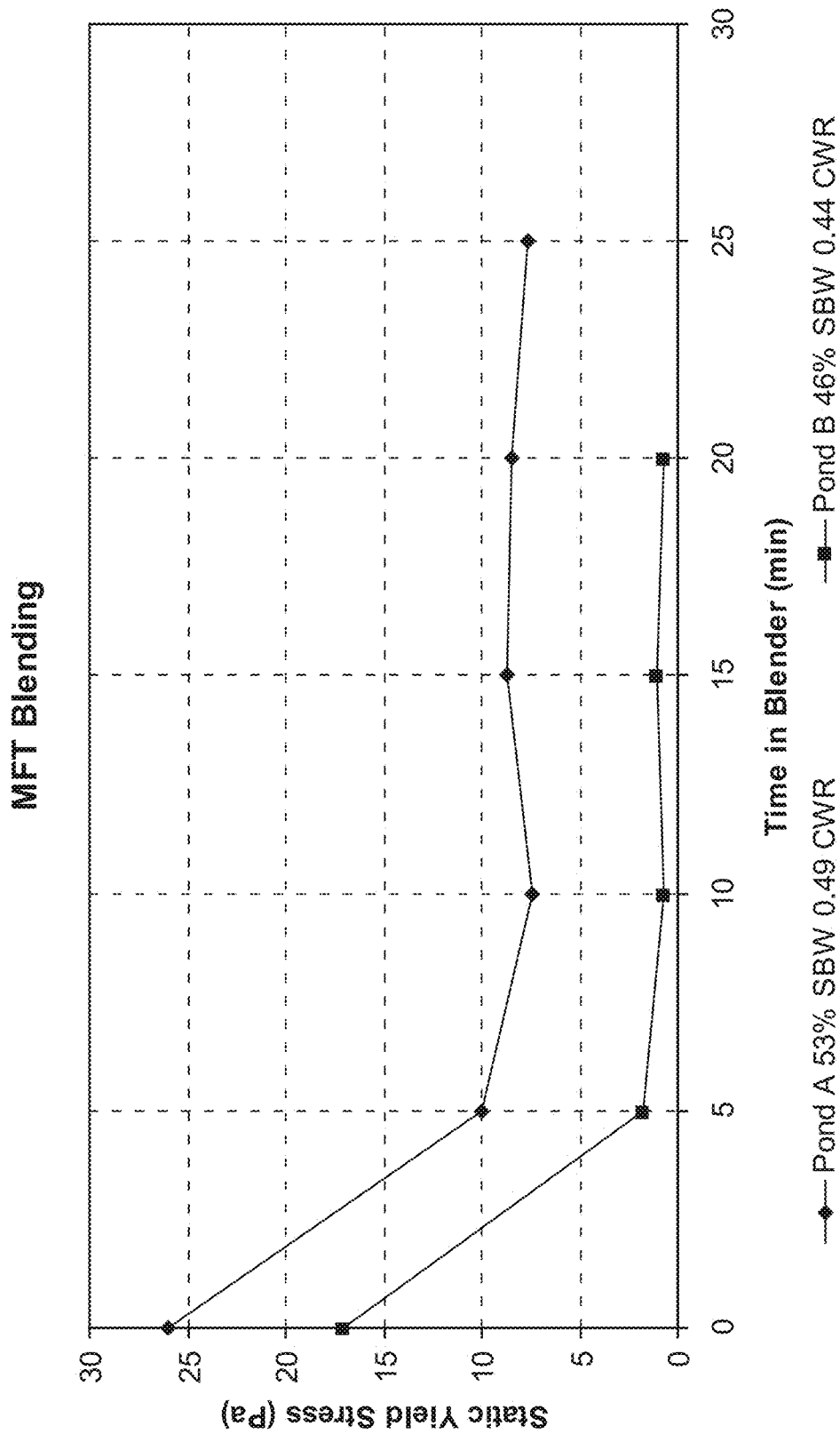
FIG. 3 is a graph of yield stress versus time in blender.

The following provides a number of examples and testing regarding shear thinning of thick fine tailings in a dewatering operation:

In one set of experiments, two high yield stress oil sands MFTs, from different ponds, were sheared in a blender set to high over 30 minutes. FIG. 3 shows that the reduction in yield stress was significant in response to this vigorous shearing. It can also be seen that static yield stress of both samples seem to have reduced at a similar rate of approximately 3 to 4 Pa/min over the first 5 minutes and then reached two different plateaus around 2 Pa and 7 Pa respectively.

Figure 4:
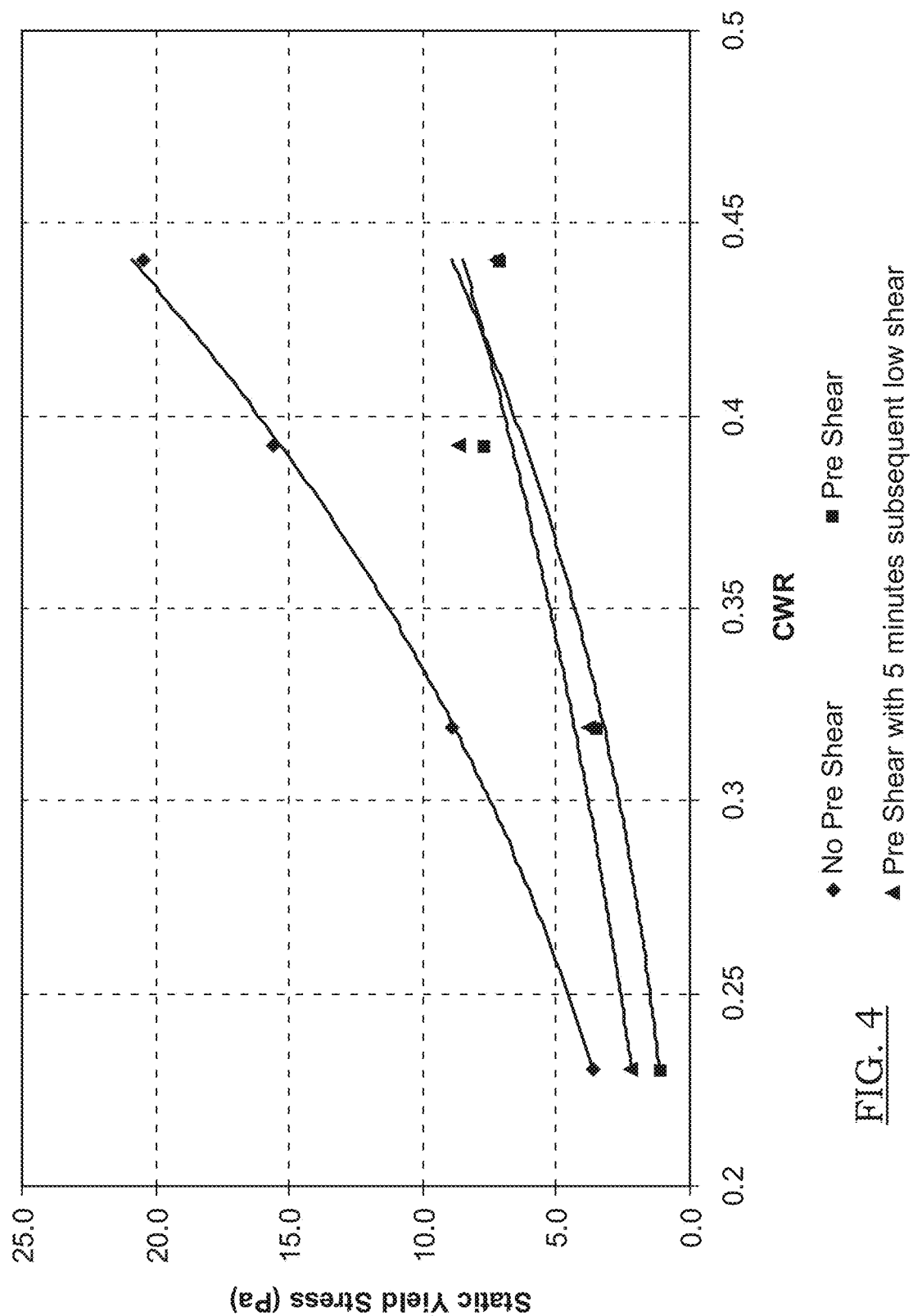
FIG. 4 is a graph of yield stress versus clay to water ratio (CWR).

In another set of experiments, various samples of oil sands MFT having different clay-to-water ratios (CWR) were compared with no pre-shearing and different types of pre-shearing. Some samples were sheared in the blender for 15 minutes and its static yield stress was measured. Other samples were sheared in the blender and then mixed in a lab mixer for 5 minutes at 320 rpm. A significant reduction in yield stress is observed in both shearing cases, compared to the non pre-sheared samples, as shown in FIG. 4. This illustrates that the shear thinning achieved by the vigorous shearing (e.g. blending) may be maintained over time with moderate shearing (e.g. lab mixer).

Figure 13:
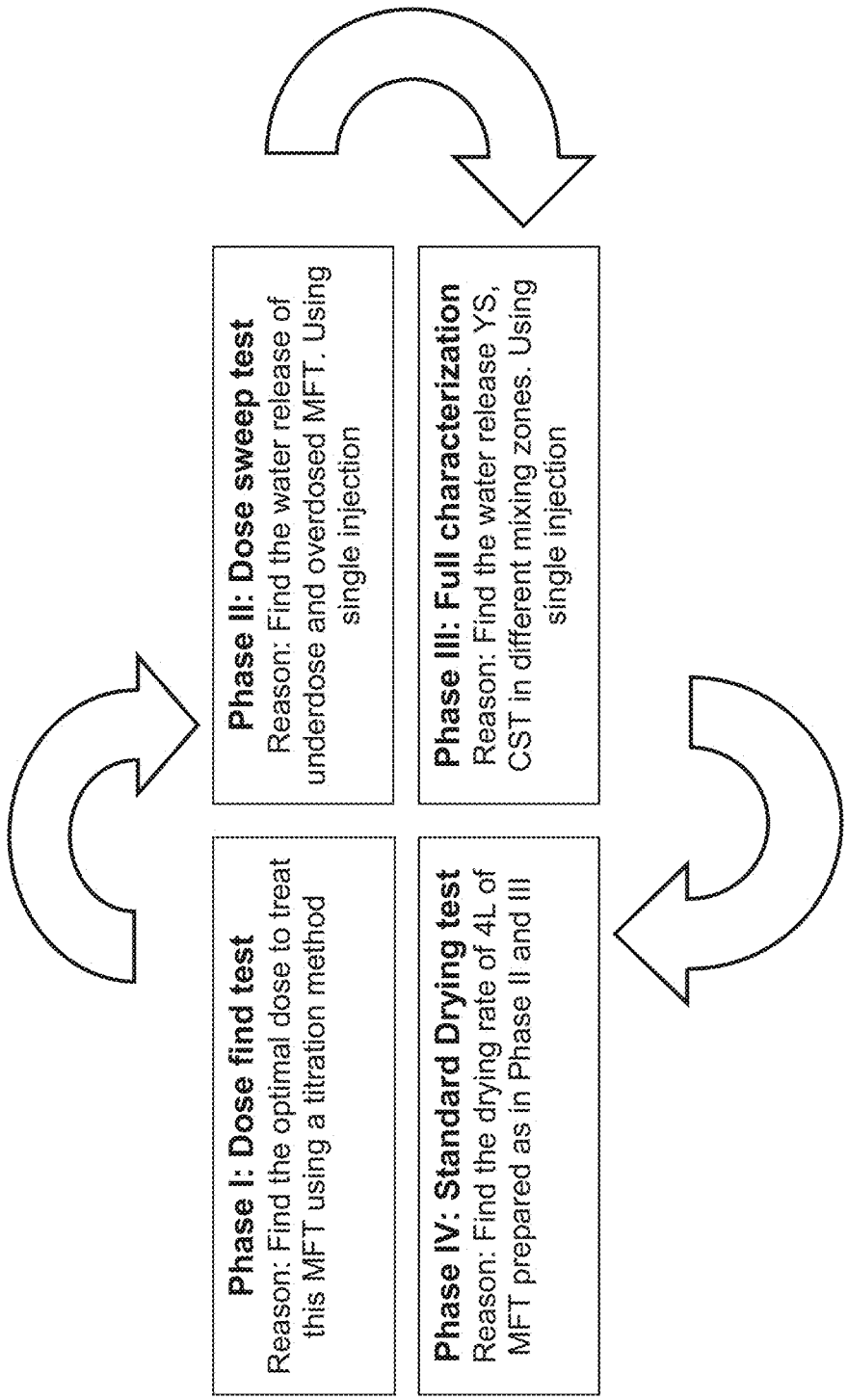
FIG. 13 is a block diagram of testing methodologies.

Before describing some additional examples, some of the methodology of experiments related to or providing background for shear thinning of thick fine tailings will be described below. Referring to FIG. 13, the following laboratory procedures have been used:
  (i) Dose find test (phase I);
  (ii) Dose sweep test (Phase II); and
  (iii) Yield stress and a corresponding water release test (Phase III). Note that the various different water release tests may be performed, such as a capillary suction time (CST) test or a Net Water Release (NWR) test, which will be further described below.

Phases I, II and III tests will be referred to below with reference to some of the examples.

In one example, further testing was conducted with the flocculation itself.

Figure 5:
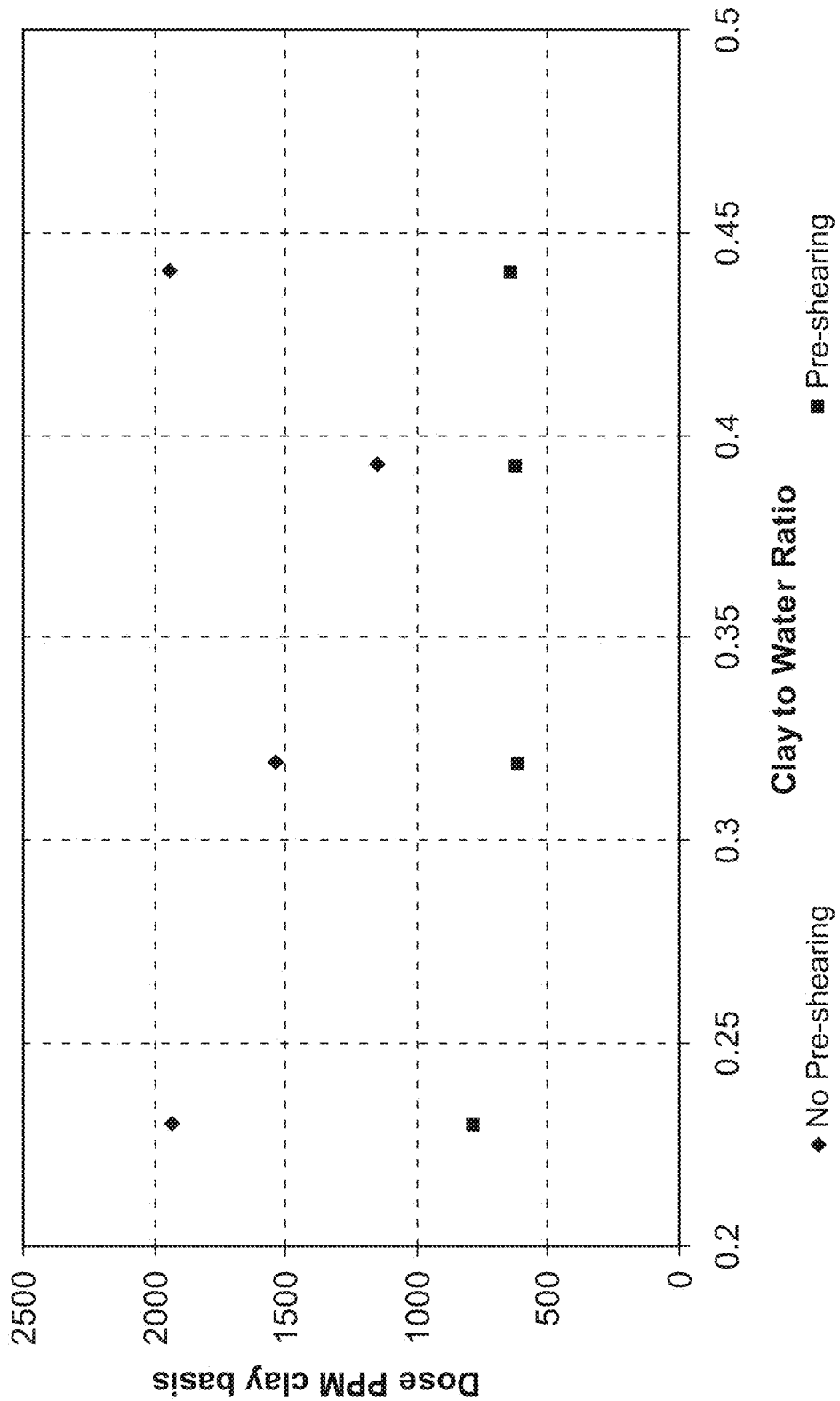
FIG. 5 is a graph of dose on a clay basis versus CWR.

A phase I test was conducted on samples of oil sands MFT to assess the flocculant dosage requirements. In these tests, 1 to 5 mL of flocculant solution was incrementally added to the MFT which had been either previously blended (pre-sheared) and non blended (non-sheared). A significant difference in the dosage requirements on a mineral basis was observed, as per FIG. 5. The dosage reduction occurred over a wide range of CWRs.

Figure 6:
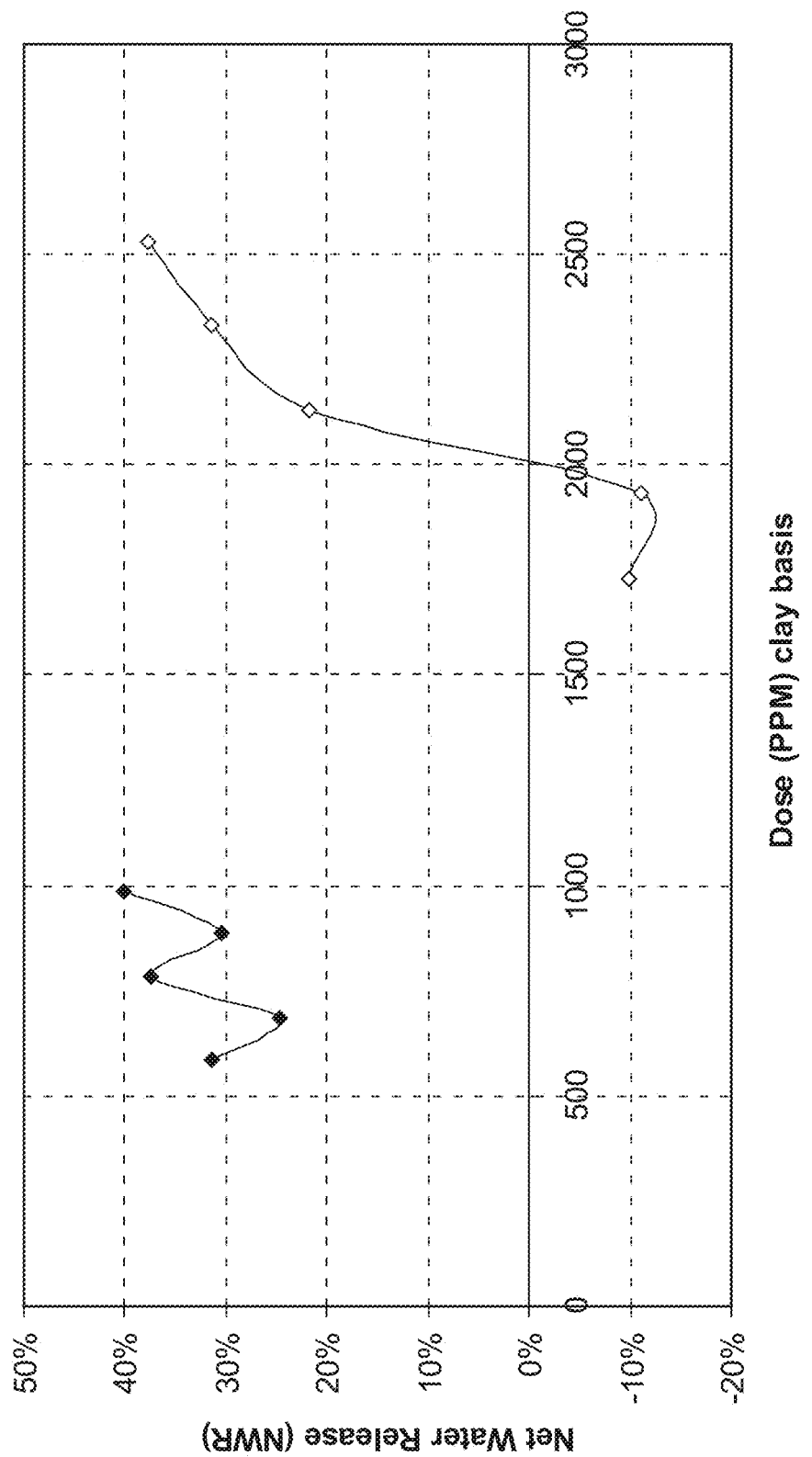
FIG. 6 is a graph of Net Water Release (NWR) versus dose on a clay basis for pre-sheared and non pre-sheared thick fine tailings.
Figure 7:
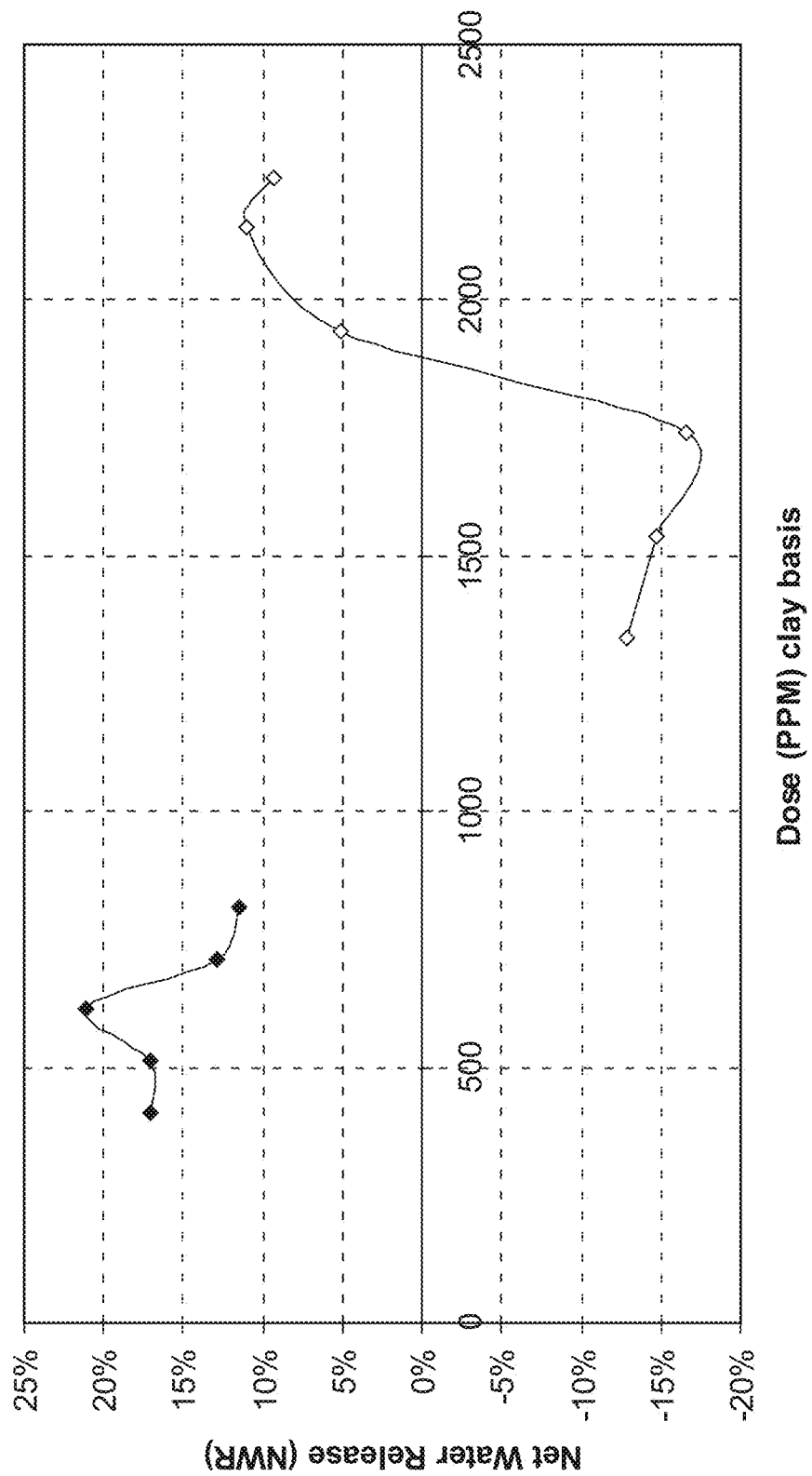
FIG. 7 is a graph of NWR versus dose on a clay basis.
Figure 8:
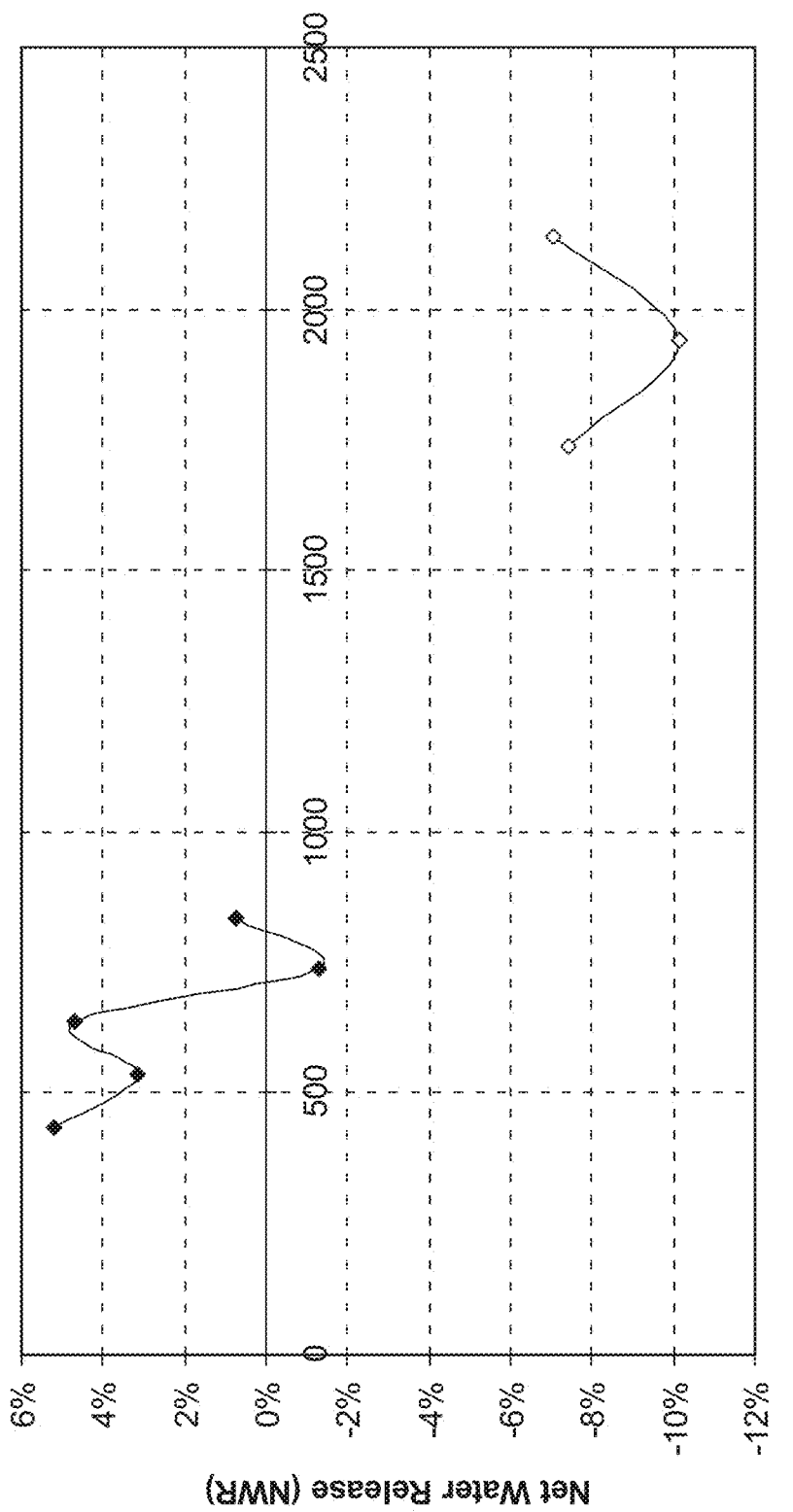
FIG. 8 is a graph of NWR versus dose on a clay basis.

A phase II test was conducted where the polymer flocculant for a set dosage (determined in phase I) was injected all at once. Dosages 100 PPM either side of the dose from phase I were determined to produce a dosage curve for each sample. The phase II dose results are a reasonable indicator of the dosage requirements in the field. The phase II tests (see FIGS. 6, 7 and 8) show that the pre-sheared samples have lower flocculant dose requirements to achieve a similar or greater water release compared to the non-sheared samples.

In another example, it was seen that, over the typical operating range of 0.3-0.45 Clay-Water-Ratio (CWR), pre-shearing has a positive effect on the water release increasing the water release to comparable to water release achieved for lower yield stress MFTs.

One surprising result was that the shear thinning significantly lowers the flocculant dose on a clay basis (about 1000 PPM rather than about 2300 PPM, for example).

Before describing the below example, one significant indicator of the performance of the dewatering operation is what will be referred to as the Net Water Release (NWR). The NWR is a metric that has been developed and is a measure of the differential in water between the starting solids of the thick fine tailings and the solids of treated and drained thick fine tailings after a given draining time. The draining time may be 24 hours, 12 hours, 20 minutes, or 10 minutes, for example, or another representative time period for drainage in the field. Example formula to calculate the NWR are as follows:

$$NWR = \left(\frac{\text{Quantity of water Recovered} - \text{Quantity of Flocculant Water Added}}{\text{Quantity of initial Fine Tailings Water}}\right)$$

$$NWR = 1 - \left(\frac{1}{tMFT \text{ wt \% mineral} + \text{wt \% Bitumen} - 1}\right) \div \left(\frac{1}{MFT \text{ wt \% mineral} + \text{wt \% Bitumen} - 1}\right)$$

The water quantities can be measured on a volumetric basis. The water volume in the initial thick fine tailings may be determined using the Marcy Scale test, and the volume of water recovered may be determined by determining the solids content in the treated thick fine tailings obtained from a drying test. Other testing methods may be used, such as a rapid volumetric method which measures the volume of water released from a treated sample and determines the treated thick fine tailings solids from process data so more regular data may be obtained, e.g. on an hourly basis.

A NWR test may be conducted using immediate drainage of the treated thick fine tailings sample for a drainage time of about 20 minutes. In this regard, for optimal dosage range and good flocculation, the water release in 20 minutes may be about 80% of the water release that would occur over a 12 to 24 hour period. For underdosed or overdosed samples, the water release in 20 minutes may be about 20% to 60% of the water release that would occur over a 12 to 24 hour period. The 20 minute NWR test may therefore be followed by a longer NWR test, e.g. 12 hour drainage time, which may use a water volume or solids content measurement approach. It is also noted that the laboratory and filed tests described herein used a volumetric 24 hour NWR test.

Figure 9:
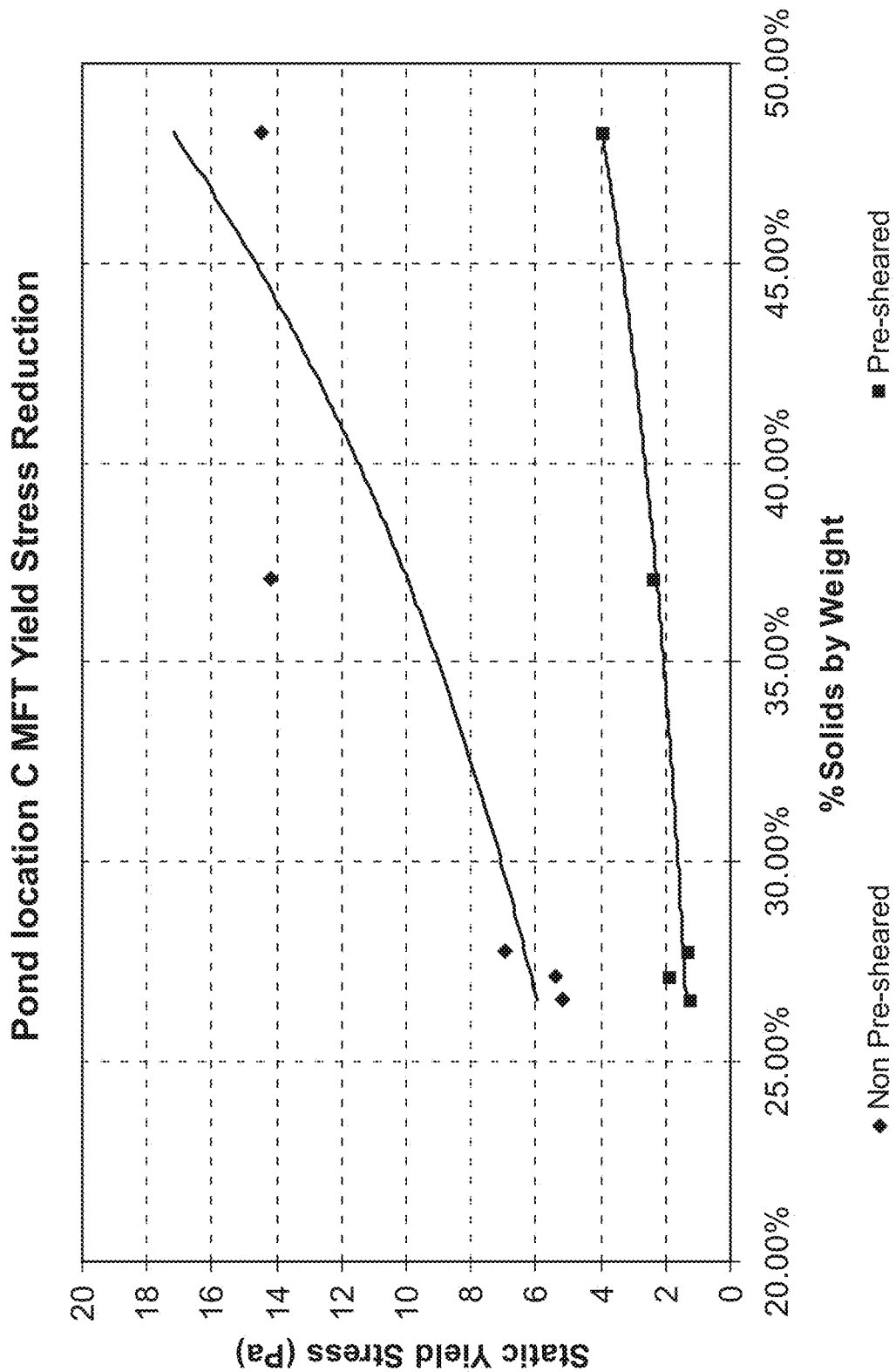
FIG. 9 is a graph yield stress versus percent solids by weight (SBW).
Figure 10:
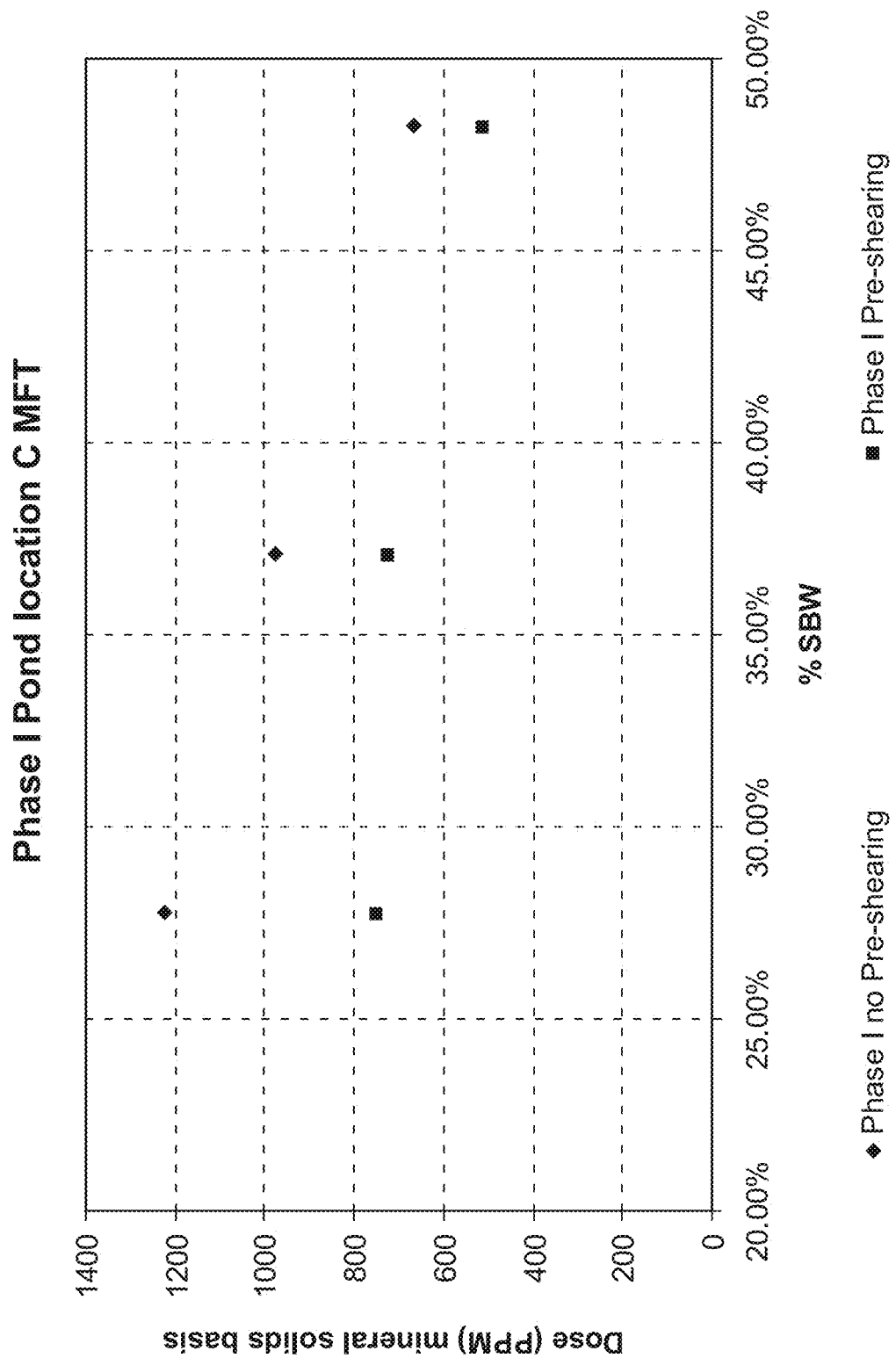
FIG. 10 is a graph of dose on a mineral solids basis versus percent SBW.

In another example, further testing was conducted to assess the pre-shearing effect on thick fine tailings from different locations compared to the previous examples. Three samples of varied solid content were collected. The samples were different from the previous MFT samples. The new different samples were sheared and indeed a yield stress reduction was observed, as shown in FIG. 9. The phase I dose test was also performed and the optimal dose was again found to be lower for the pre-sheared MFT than the non pre-sheared. The dose of flocculant versus % SBW is shown in FIG. 10. For these samples, water release was lower at the tested conditions. Bitumen extraction was performed on a sample with 28% solid-by-weight (SBW) MFT and the resulting bitumen depleted thick fine tailings flocculated and released water at a higher level, an increase of about 20% to about 30% NWR.

Figure 11:
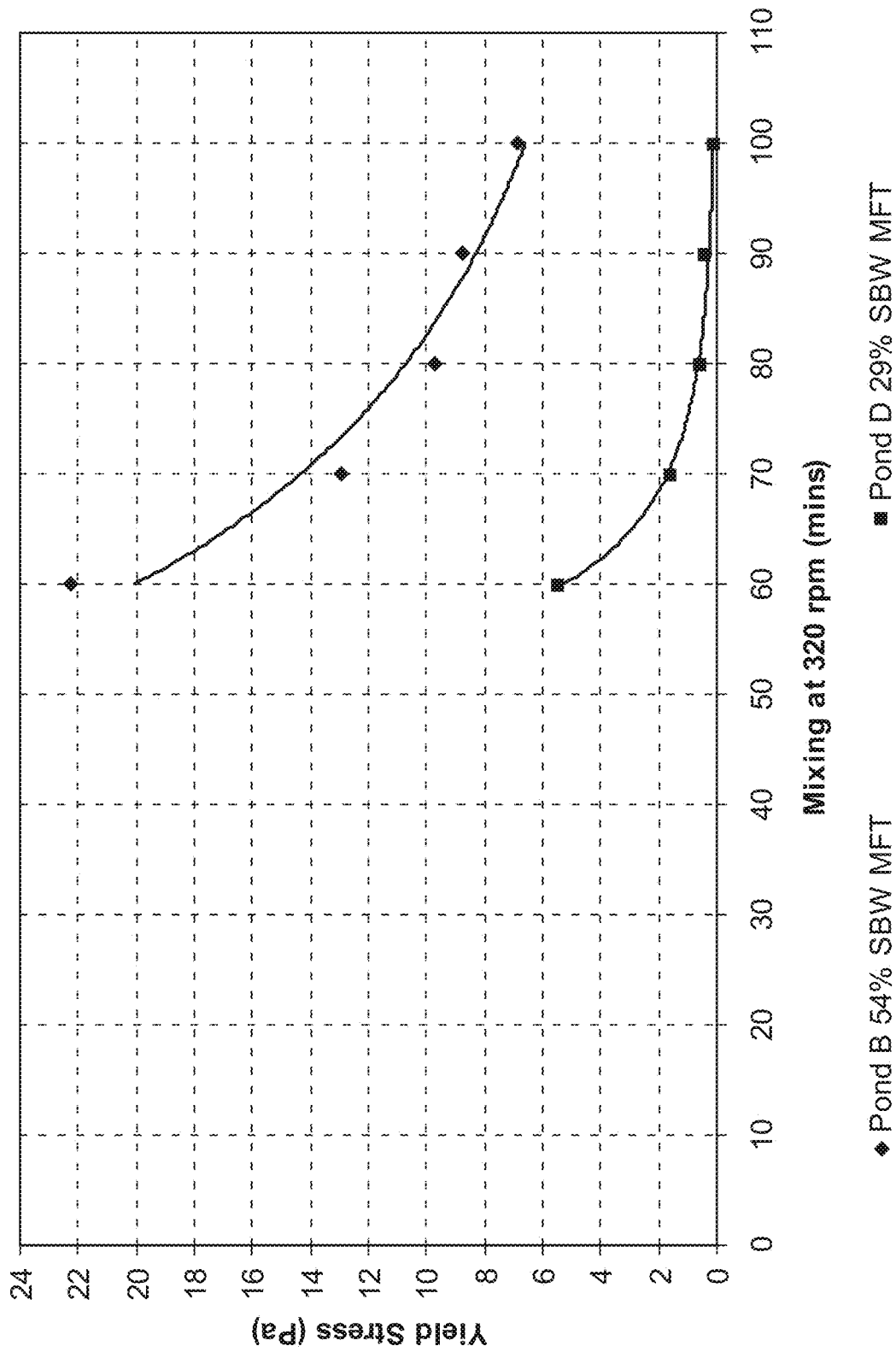
FIG. 11 is a graph of yield stress versus mixing time at 320 rpm.
Figure 12:
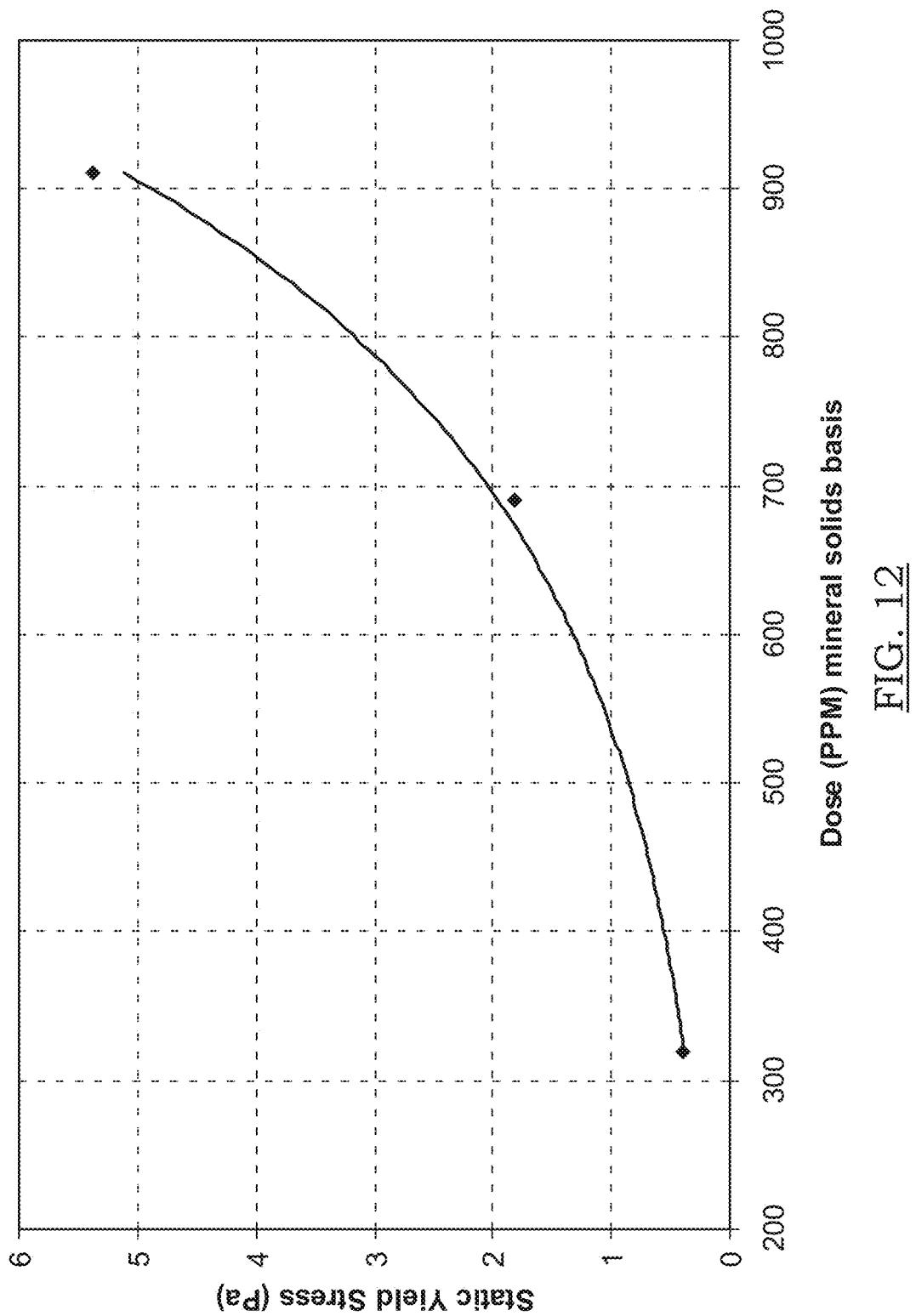
FIG. 12 is a graph of yield stress versus dose on a mineral solids basis.

In another example, a lab mixer running at 320 rpm was tested and it was determined that this mixer took around 70 minutes, at 320 rpm, to shear (360 s$^{-1}$ shear rate) a sample MFT to a similar state as the blender does in about 15 minutes (see FIG. 11). The testing with the 320 rpm mixing also indicates that the yield stress of the MFT from one of the sources, with a starting value of about 5.5 Pa, can be reduced to near zero for the blended samples suggesting that the flocculant dose could be further reduced. This is indeed the case where the 29% SBW MFT was further sheared in the lab mixer for an hour and a half (fully pre-sheared) and required a dose of 320 PPM for optimal flocculation, compared to approximately 700 PPM after partial pre-shearing and 900 PPM for non pre-sheared (see FIGS. 11 and 12).

It was noted that the time taken to shear thin MFT down to a Newtonian fluid like state may explain why the dosage in the field can be similar to the non pre-sheared scenario, as the shear rate in the pipes at typical flow rates may be about 533 s$^{-1}$ (assuming turbulent flow, 9" internal diameter and 2500 usgpm, laminar would be 95 s$^{-1}$). Greater shear thinning of MFT may benefit from a shear rate of at least about 1400 s$^{-1}$ for two hours.

Pre-shearing to change the state of the MFT prior to flocculation can have a significant influence on the dose and water release. A significant flocculant dosage reduction effect appears to be present in both different types of MFTs once the MFT has been sheared, for example approaching a Newtonian like fluid.

Pre-shearing experiments were performed in a milkshake blender and a Phipps and Bird mixer at 320 rpm or 360 s$^{-1}$. The dose, water release and treatability of an MFT with flocculant depended on the static yield stress. Given that there were challenges with flocculating and dewatering thick fine tailings having a yield stress above 20 Pa, pre-shearing the thick fine tailings below that level provided advantages and greater reliability. Thick fine tailings having higher yield stress resulted in greater dose on a clay basis and the amount of water release decreased (See FIG. 14).

In addition, some tailings ponds have thick fine tailings with a much higher yield stress than others. Such thick fine tailings may flocculate but may require a high dose and release lower amounts of water. One higher yield stress sample was eventually determined to be from a specific barge in a specific pond and its yield stress was much greater than expected for its CWR. While the CWR can be an indicator of yield stress, other chemical properties of thick fine tailings can also influence its rheological properties.

In another example, a sample of MFT, once homogenized for 5 minutes with the hand mixer, had a yield stress of 12 Pa, an optimal dose of 1000 PPM and a net water release (NWR) of 17%, which is typical for a 0.4 CWR sample from these ponds. When it was not homogenized with the hand mixer, the sample had a yield stress of 22 Pa, a dose of 1500 PPM and a water release of 1%.

In another example, it was found that oil sands MFT from a certain pond location had an optimal polymer flocculant dose on a clay basis of approximately 1800 ppm in the static yield stress range of 1 Pa to 20 Pa. Results showed that pre-shearing the oil sands MFT result in an optimal polymer flocculant dose between about 850 ppm to about 1000 ppm. In addition, results showed that the pre-shearing could also achieve an increase in NWR, which was more prevalent on the oil sands MFT having higher densities.

Figure 15:
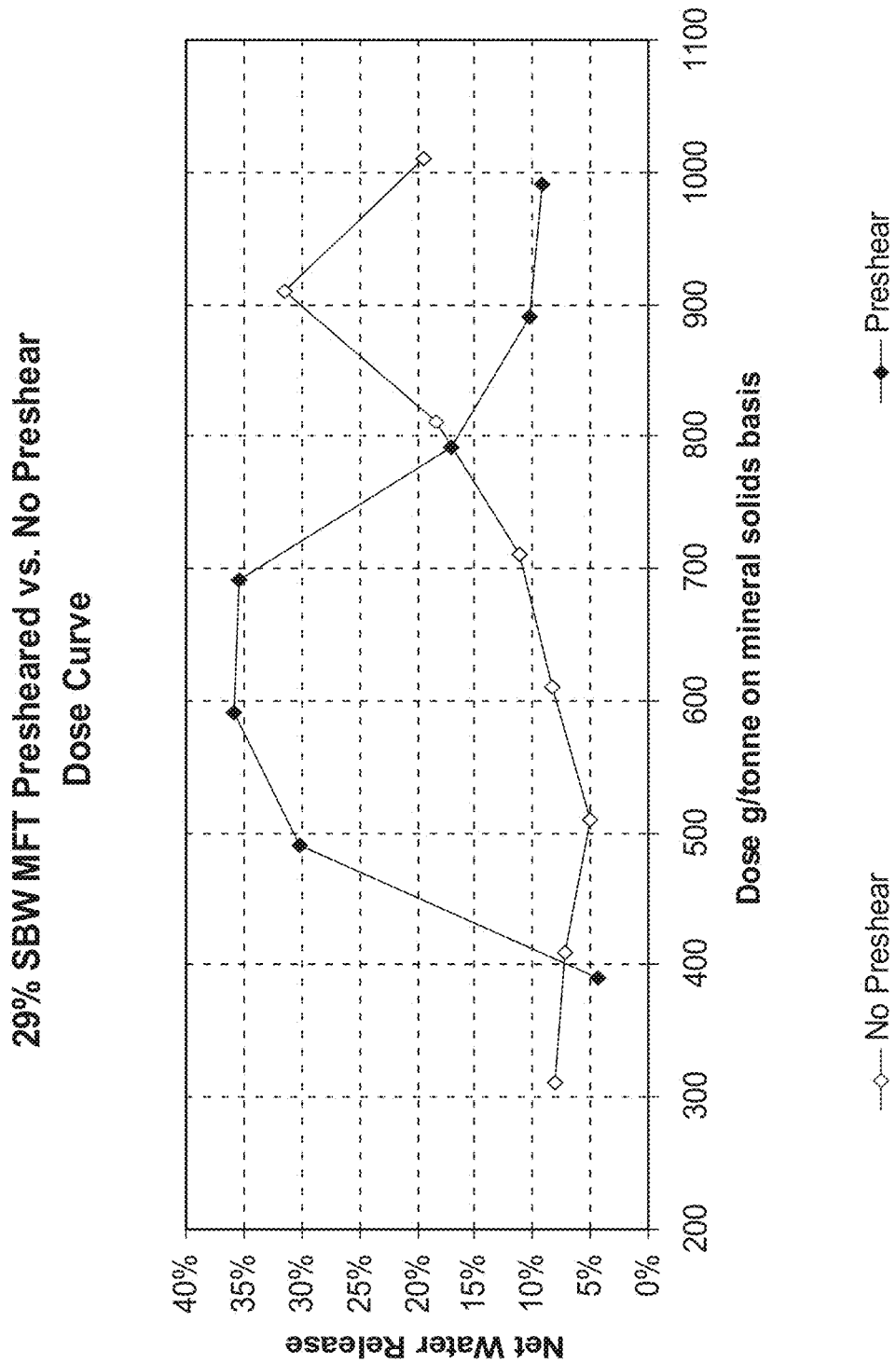
FIG. 15 is a graph of net water release versus dose on a mineral solids basis for pre-sheared and non pre-sheared samples.

FIG. 15 shows the effect of pre-shearing on flocculant dosage and NWR for a sample of MFT.

Figure 16:
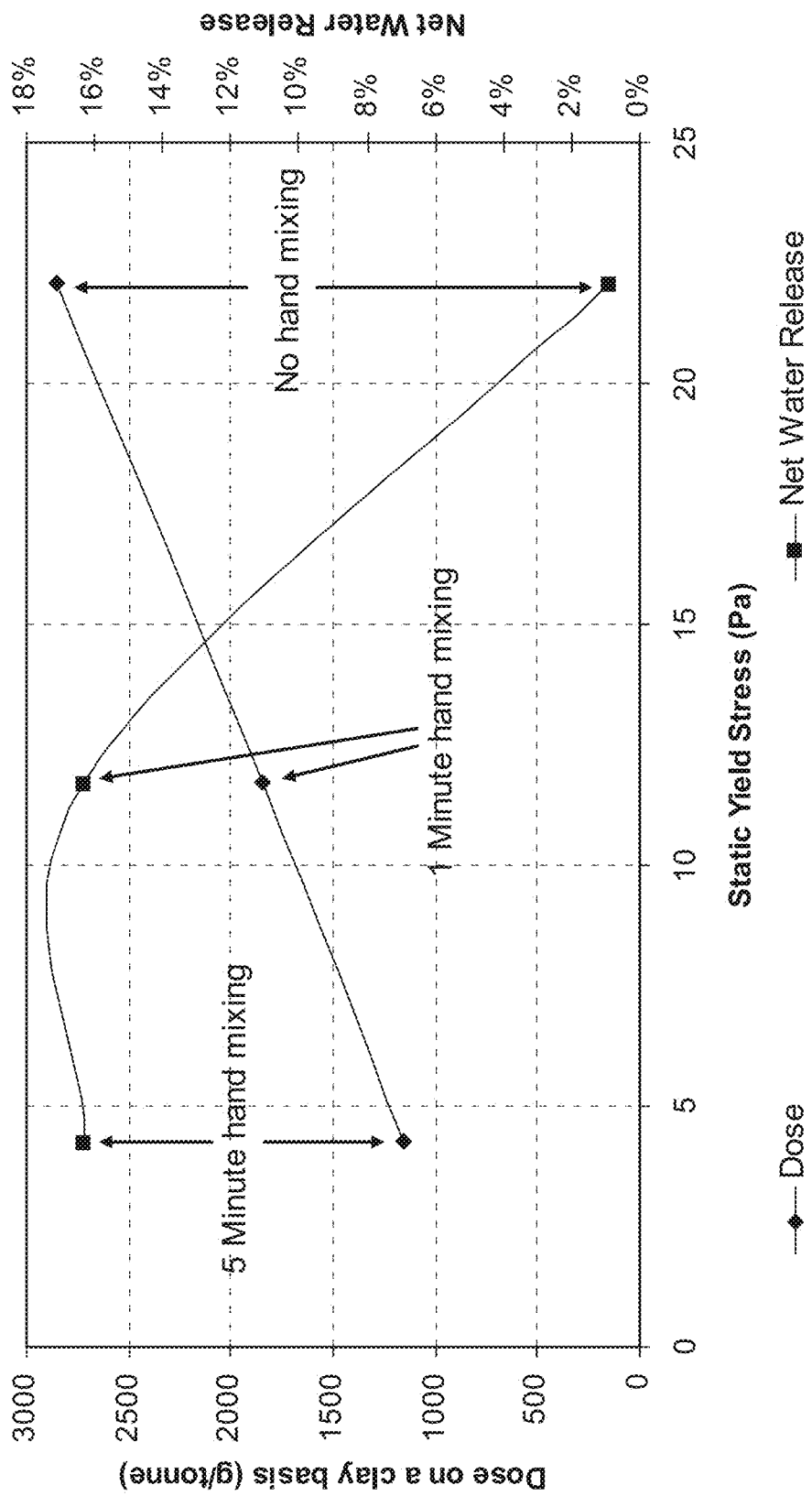
FIG. 16 is a graph of dose on a clay basis versus yield stress.

FIG. 16 shows the effect of different levels of pre-shearing on the flocculant dosage and NWR for a sample of MFT.

Figure 32:
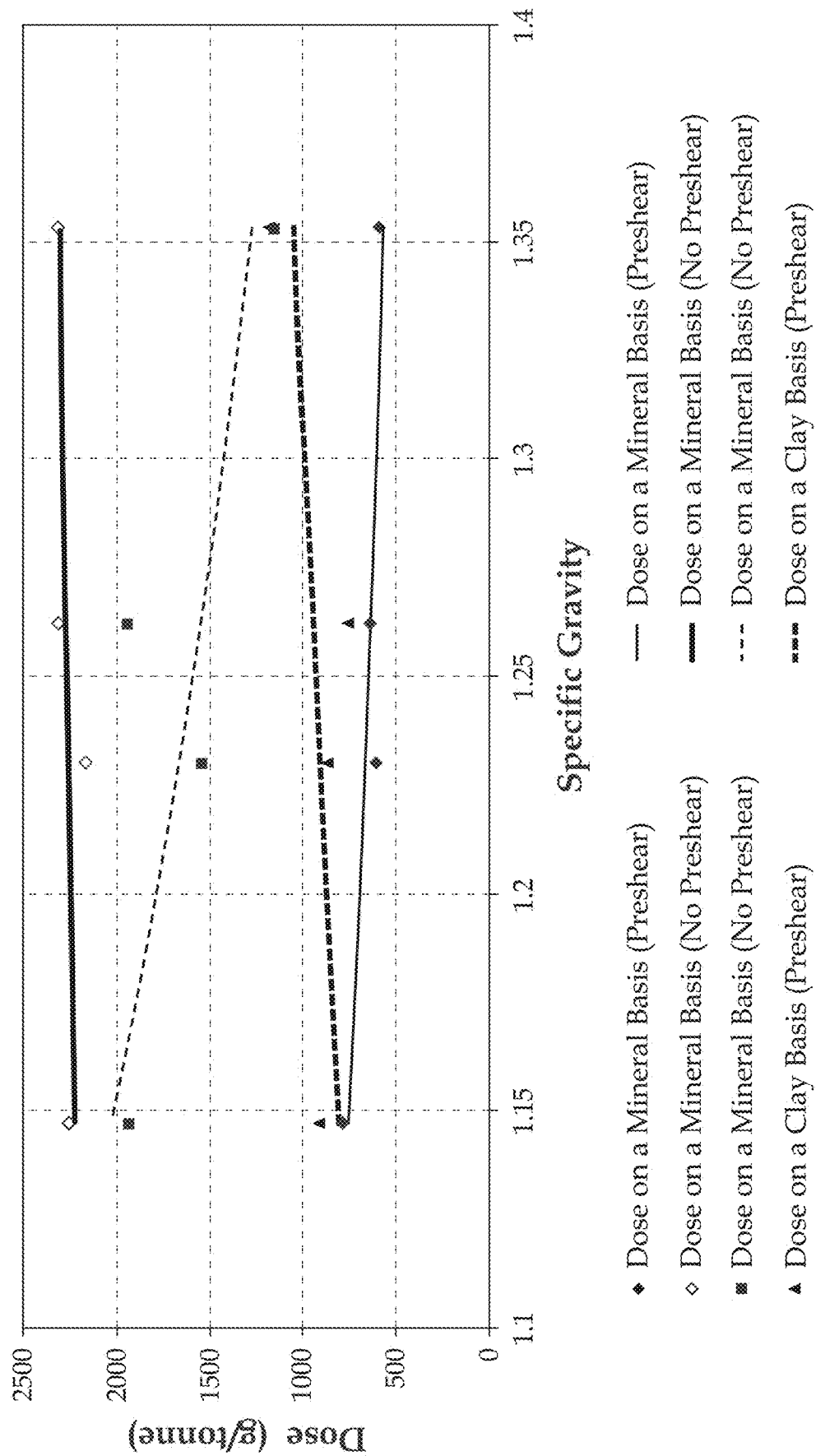
FIG. 32 is a graph of flocculant dose on a clay or mineral solids basis, versus specific gravity, for pre-sheared and non pre-sheared samples.

FIG. 32 shows phase I doses on pond A versus phase I doses with pre-shear, showing that the dose on a clay basis dropped from 2200 ppm down to around 1000 ppm.

In another example, pre-shearing of thick fine tailings containing an amount of coarse material (e.g. sand) facilitated separation of the sand fraction from the rest of the fluid. It was observed that sand separation was achieved by helping the sand drop out of the thick fine tailings. By reducing the yield stress, the sand can drop out of the fluid more easily. In some scenarios, pre-shearing can therefore also aid in preparing thick fine tailings that include sand or other relatively coarse particulate material by separating part of the sand from the bulk fluid with higher fines content.

In another example, pre-shearing of thick fine tailings containing an amount of heavy hydrocarbons (e.g. bitumen) facilitated separation of the bitumen from the rest of the fluid. It was observed that pre-shearing floats bitumen out of the fluid. By reducing the yield stress, the bitumen can float up and separate from the rest of the fluid more easily.

In some scenarios, pre-shearing can therefore also aid in preparing thick fine tailings that include bitumen or other heavy hydrocarbons by separating part of the bitumen from the bulk fluid.

In some implementations, thick fine tailings are pre-sheared to have a static yield stress of 20 Pa or below prior to flocculation. It should nevertheless be noted that some other implementations may use thick fine tailings over 20 Pa yield stress. The thick fine tailings may be pre-sheared to reduce its static yield stress to at most 15 Pa, 10 Pa, 5 Pa, or 2 Pa. In some scenarios, the pre-shearing reduces the static yield stress to approximately zero. The thick fine tailings may be pre-sheared to reduce its static yield stress to up to 50%, 60%, 70%, 80%, 90% or 95% of its initial level.

In some implementations, thick fine tailings may be pre-sheared to achieve a yield stress of the sheared fluid that is below a maximum threshold for flocculation.

Referring back to FIG. 1, there may also be a pre-screening or debris removal step for removing coarse debris from the thick fine tailings 102 and the pre-screening may be done prior to the shear-thinning step. The pre-screening may also be performed so as to facilitate shear thinning of the thick fine tailings, by removing coarse debris or other components that may disrupt or clog the shear unit.

In another implementation, a fluid may be injected into the thick fine tailings to effect at least a portion of the pre-shearing. For example, air may be injected into the thick fine tailings to impart shear on the fluid. Air injection may have other effects, such as increasing the volume of the fluid and thereby reducing the yield stress.

In another implementation, pre-shearing can be performed sufficiently in order to reduce the horsepower demand on pumps that are used to provide hydraulic energy to the pre-sheared fluid.

In another implementation, pre-shearing can be performed to reduce the yield stress of the thick fine tailings material sufficiently to enable viscosity measurements in order to calculate certain compositional characteristics of the thick fine tailings, which can aid in flocculant dosing and process control. For example, when pre-shearing is performed to reduce the yield stress to or near zero, viscosity measurements may be taken with greater precisions and used to determine clay-to-water ratio (CWR) of the thick fine tailings fluid. Such determinations regarding the composition of the thick fine tailings may be used for faster and/or more accurate dosage adjustments and process control.

Dilution and Fluid Combination Pre-Treatments of Thick Fine Tailings

In some implementations, the thick fine tailings may be diluted sufficiently to improve mixing with the flocculant and dewatering of the flocculated material. High yield stress thick fine tailings may be treated by diluting, for example with process water or a higher water content tailings. Dilution may be performed to reduce the viscosity and/or yield stress of the fluid and thereby enhance flocculant mixing such that the overall water release is increased despite the water addition.

Figure 14:
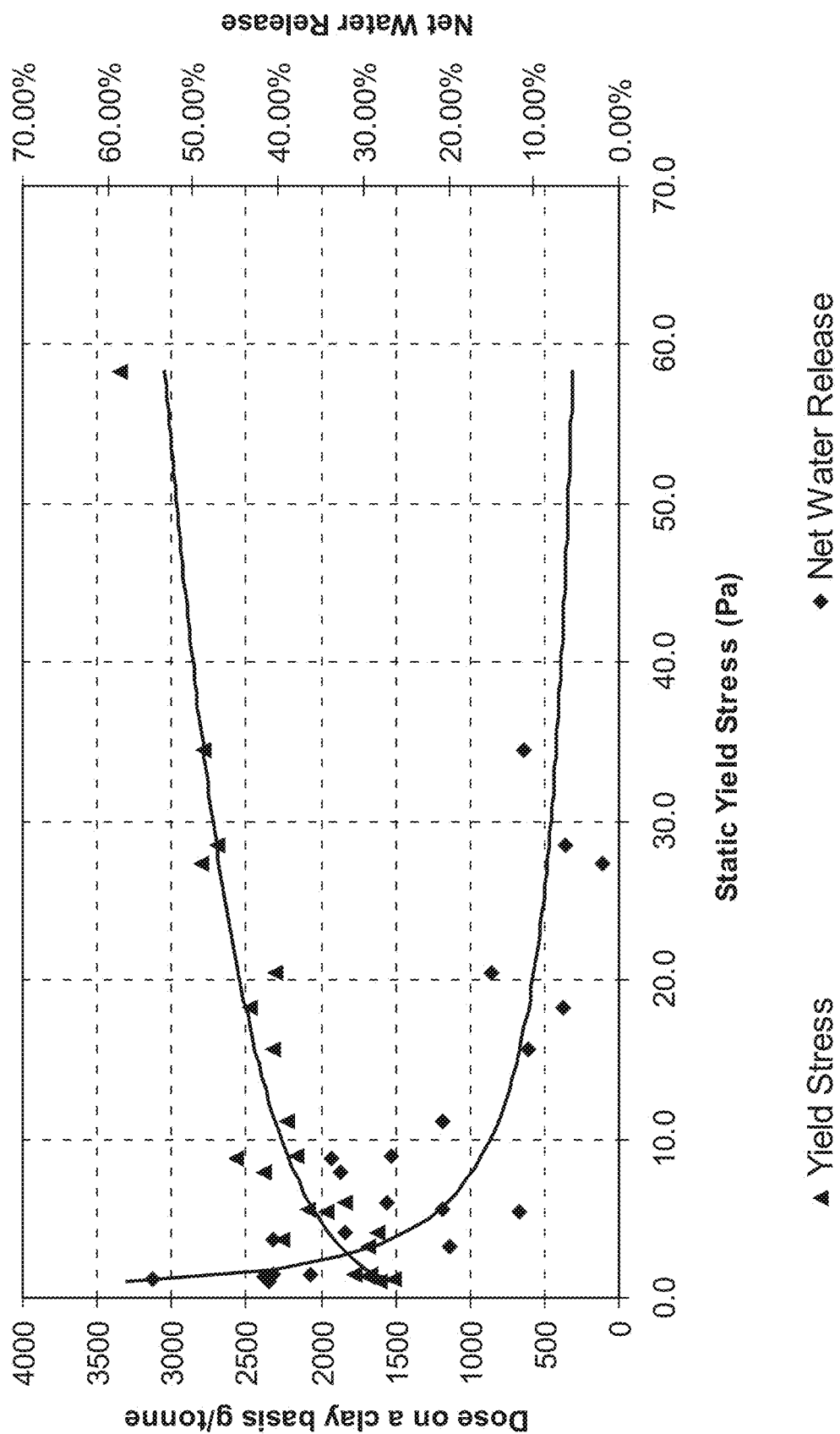
FIG. 14 is a graph of dose on a clay basis versus yield stress.
Figure 17:
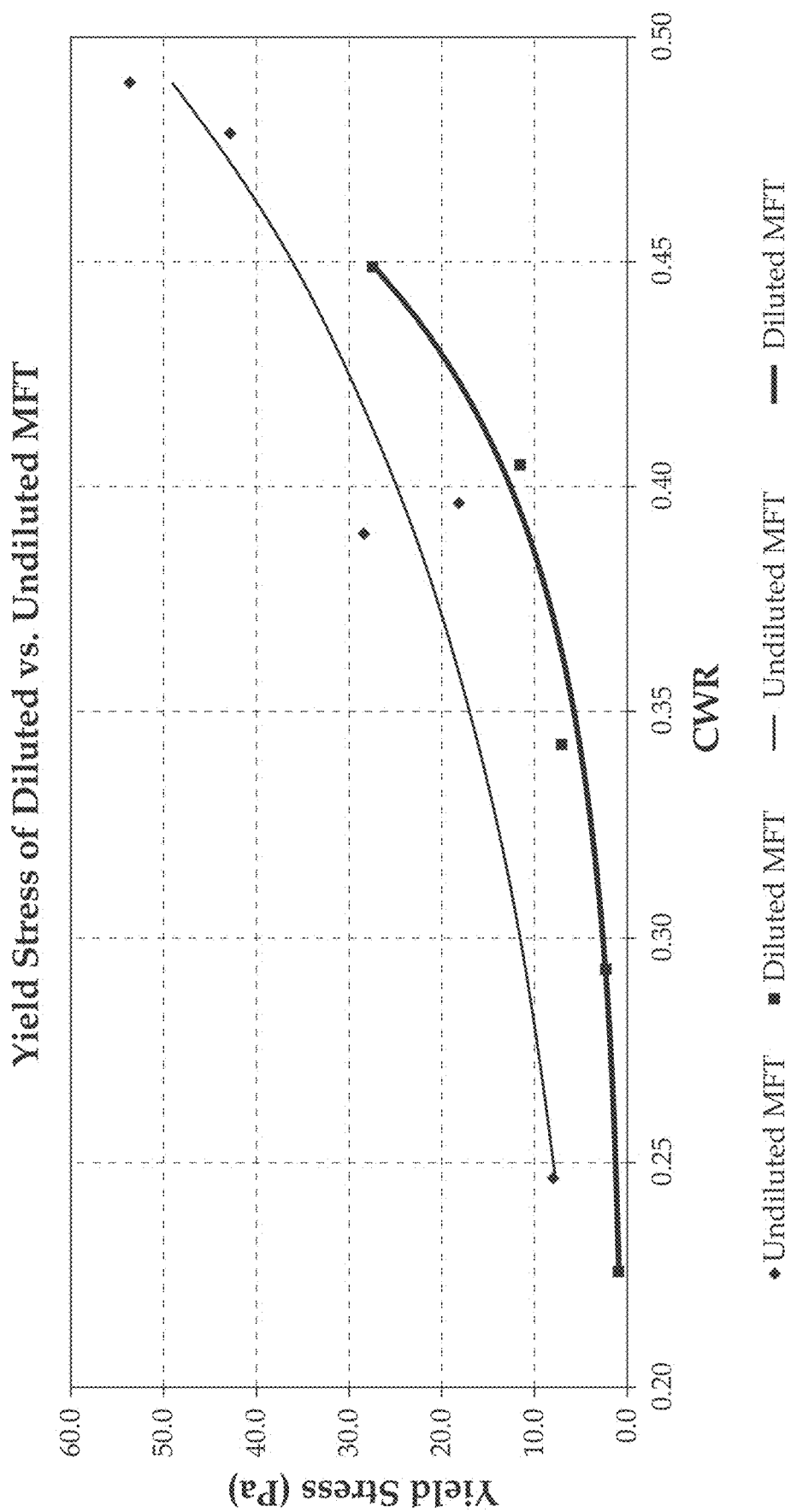
FIG. 17 is a graph of yield stress versus CWR.
Figure 18:
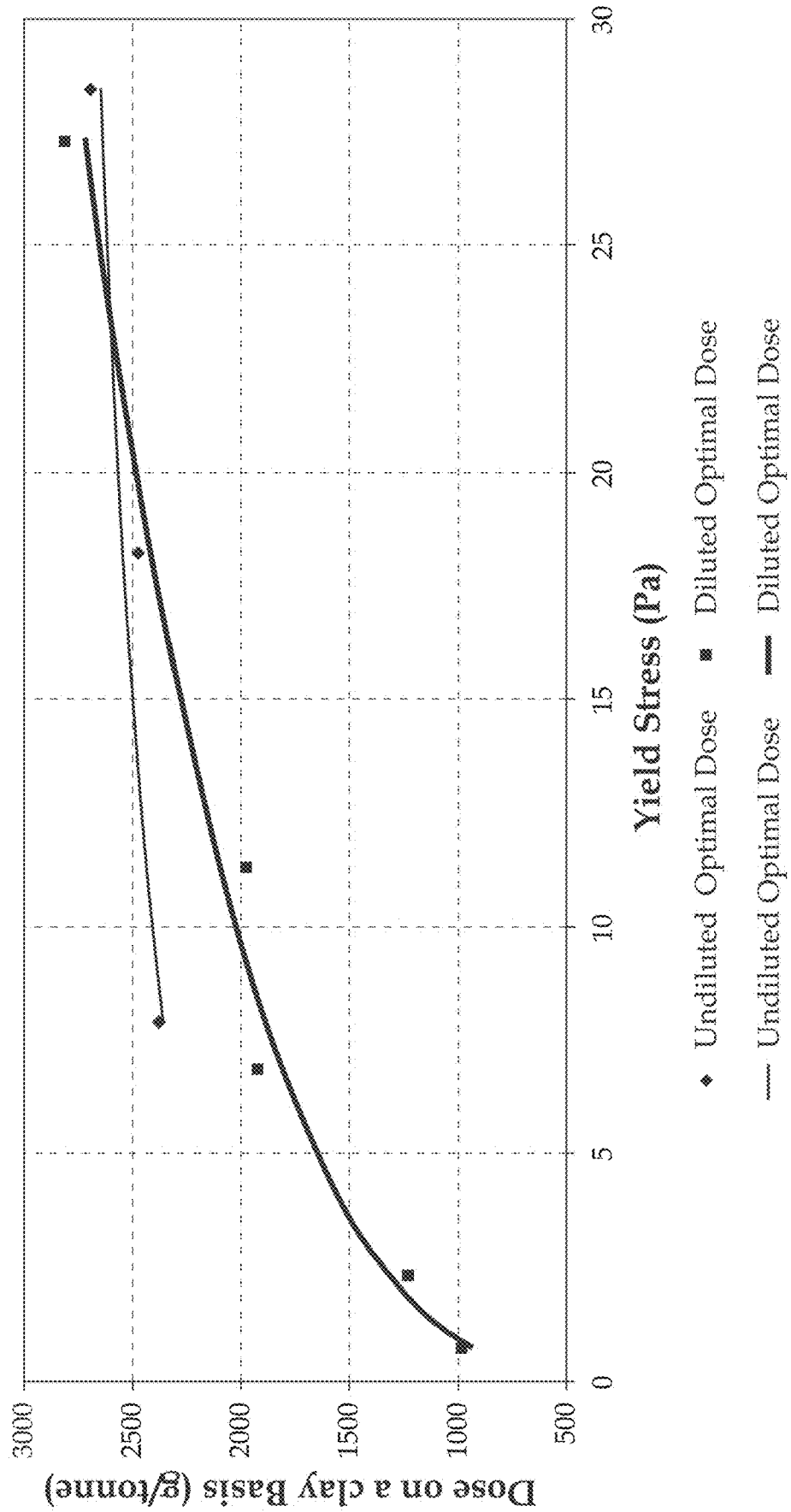
FIG. 18 is a graph of dose on a clay basis versus yield stress.

FIGS. 17 and 18 show results comparing diluted and undiluted thick fine tailings. These Figures also explain the effect of CWR on yield stress and the effect of yield stress on the dose required for increased water release. They indicate that diluting down a high yield stress MFT breaks the bonds between the clay that cause the high yield stress and thus reducing the yield stress lower than the natural pond MFT for the same CWR, and thus lowering the dose on a clay basis. As a comparison, FIG. 14 illustrates a similar relationship: that yield stress, water release and dose on a clay basis are related to each other. For thick fine tailings, such as MFT, there is a relationship between rheology and the CWR. Fully pre-sheared MFT still has this relationship. FIGS. 17 and 18 help illustrate, for example, an approximately 27 Pa, 0.45 CWR MFT being diluted down to lower CWR MFTs vs. some of the natural MFT in a pond.

Dilution water may be taken from oil sands or other mining operations, or may be recycled from the dewatering operation itself as part of the release water.

In some implementations, the dilution may be done by combining a higher water content thick fine tailings to another thick fine tailings stream or other tailings stream. For example, a first thick fine tailings may be combined with a second thick fine tailings to produce a combined thick fine tailings. The first and second thick fine tailings may have different properties and compositions, and when one has lower water content than the other, their combination may amount to an effective dilution. This approach may be used to quickly reduce the yield stress of thick fine tailings having a high initial yield stress.

Chemical Thinning Pre-Treatments of Thick Fine Tailings

In some implementations, an additive may be introduced into the thick fine tailings to reduce its yield stress and/or viscosity or to modify the chemical properties of the thick fine tailings to enhance the flocculation and dewatering operation.

In some implementations, a chemical additive may be added to the thick fine tailings prior to addition of the flocculant. The chemical additive may be selected to reduce the yield stress and/or the viscosity of the thick fine tailings. The chemical additive may be introduced into the thick fine tailings in the form of a solid or a liquid solution. It may be added close to the flocculant addition point so long as it provides sufficient time for the chemical additive to have the desired effect of reducing the yield stress and/or the viscosity. It may also be added far before flocculation, such as in the tailings stream that is pumped from a pond or into a tailings holding tank, to provide sufficient time to have the desired chemical effect. In some implementations, the chemical additive may be a compound for providing a desired ionic effect relative to the dispersed charged solid particles in the thick fine tailings, such as dispersed clay platelets. For example, thick fine tailings may contain an initial amount of calcium cations, a portion of which are ionically associated with charged surfaces of clay platelets. In the case that the calcium cation concentration exceeds the available clays to which they may be ionically associated, there may be an amount of free calcium cations in the interstitial water of the thick fine tailings. Such free calcium cations can have a negative impact on flocculation, which may for example use anionic flocculants. In some cases, the flocculant may be added in the form of a sodium salt, such as an anionic sodium polyacrylamide-polyacrylate polymer flocculant, and the free calcium cations can cause some of the anionic flocculant to precipitate. Thus, in some implementations, the chemical additive may be selected to remove or reduce free calcium cations.

In some implementations, the chemical additive used remove or reduce free calcium cations may include one typically used for descaling applications.

In some implementations, the chemical additive may include a pH adjustment agent to reduce the yield stress of the thick fine tailings. For example, an alkali compound, such as NaOH, may be added to increase the pH sufficiently to decrease the yield stress. It is noted that pH adjustment should be conducted such that the polymer flocculant is not negatively affected in the adjusted pH range.

More regarding calcium content in thick fine tailings and its impact on dewatering operations will be discussed further below.

Hydrocarbon Content in Thick Fine Tailings

In some thick fine tailings, such as oil sands thick fine tailings, hydrocarbons such as bitumen may be present. Bitumen content of oil sands thick fine tailings has been found to be a factor that can influence water release in some dewatering operations.

For example, it was found that a bitumen content of over 5 wt % can inhibit flocculation using an anionic polymer flocculant, such as a 30% anionic sodium polyacrylamide-polyacrylate polymer flocculant. Bitumen can also form mats on deposited material that can impede evaporative drying.

Figure 19:
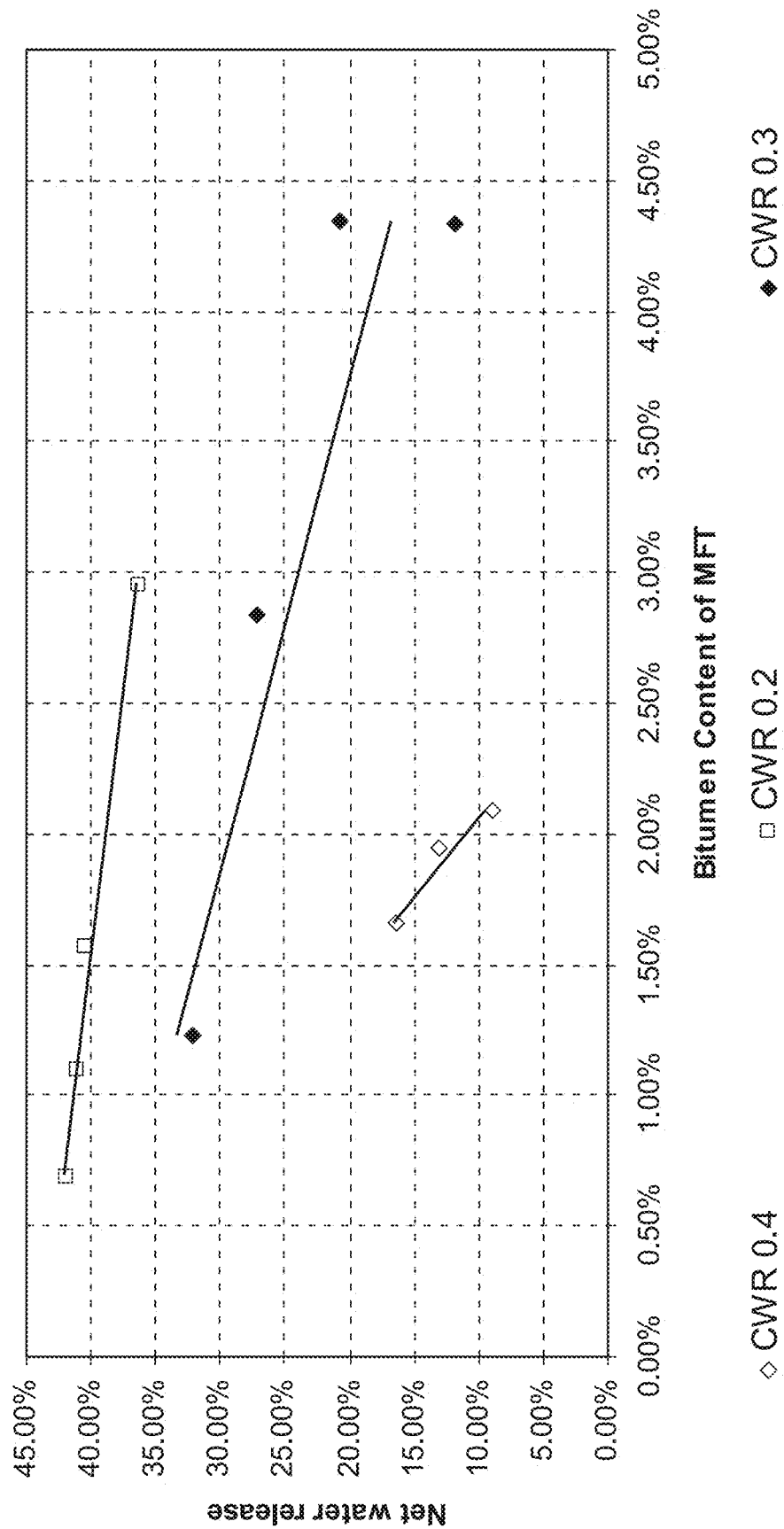
FIG. 19 is a graph of NWR versus bitumen content at different CWR.

FIG. 19 shows the influence of bitumen content on net water release (NWR) from flocculated oil sands MFT at different CWR levels. For increasing bitumen content, the NWR decreases. In addition, the impact of bitumen content appears to increase with increasing CWR of the thick fine tailings, as the NWR decrease is more pronounced with increasing bitumen content.

In some implementations, the dewatering operation may include a step of pre-treating thick fine tailings that include residual bitumen in order to reduce the bitumen content below a threshold, such as below 5 wt %. The bitumen reduction step may reduce the bitumen content below 2 wt %, 1.5 wt % or 1 wt % for thick fine tailings with at least 0.4 CWR, and below 4 wt % or 3 wt %, 2 wt % or 1 wt % for thick fine tailings with between 0.2 and 0.35 CWR. The bitumen reduction step may reduce the bitumen content below a threshold enabling NWR of at least 15%, 20%, 25%, 30%, 40%, 50%, 60% or 70%. According to observations in commercial application of dewatering operations, high NWR of about 70% have been achieved. In general, reducing the bitumen content facilitates obtaining higher or maximum water release for the given CWR of the thick fine tailings.

In addition, the thick fine tailings may also be monitored to ensure its bitumen content is below a certain threshold for the dewatering operation. The CWR may also be monitored to ensure that the bitumen content is below a certain threshold for a given range of CWR. Bitumen removal or reduction may be achieved by a number of methods, such as floatation, lipophilic bead separation techniques, skimming, and so on.

Clay-to-Water Ratio (CWR) an Clay Content of Thick Fine Tailings

The clay-to-water ratio (CWR) and the clay content of the thick fine tailings are other relevant factor in some aspects of the dewatering operation, for example for treating MFT.

A methylene blue test may be performed to determine the clay content. CWR may be calculated as follows:

$$CWR = (\% \text{ clay})(\% \text{ mineral})/(\% \text{ water})$$

Figure 20:
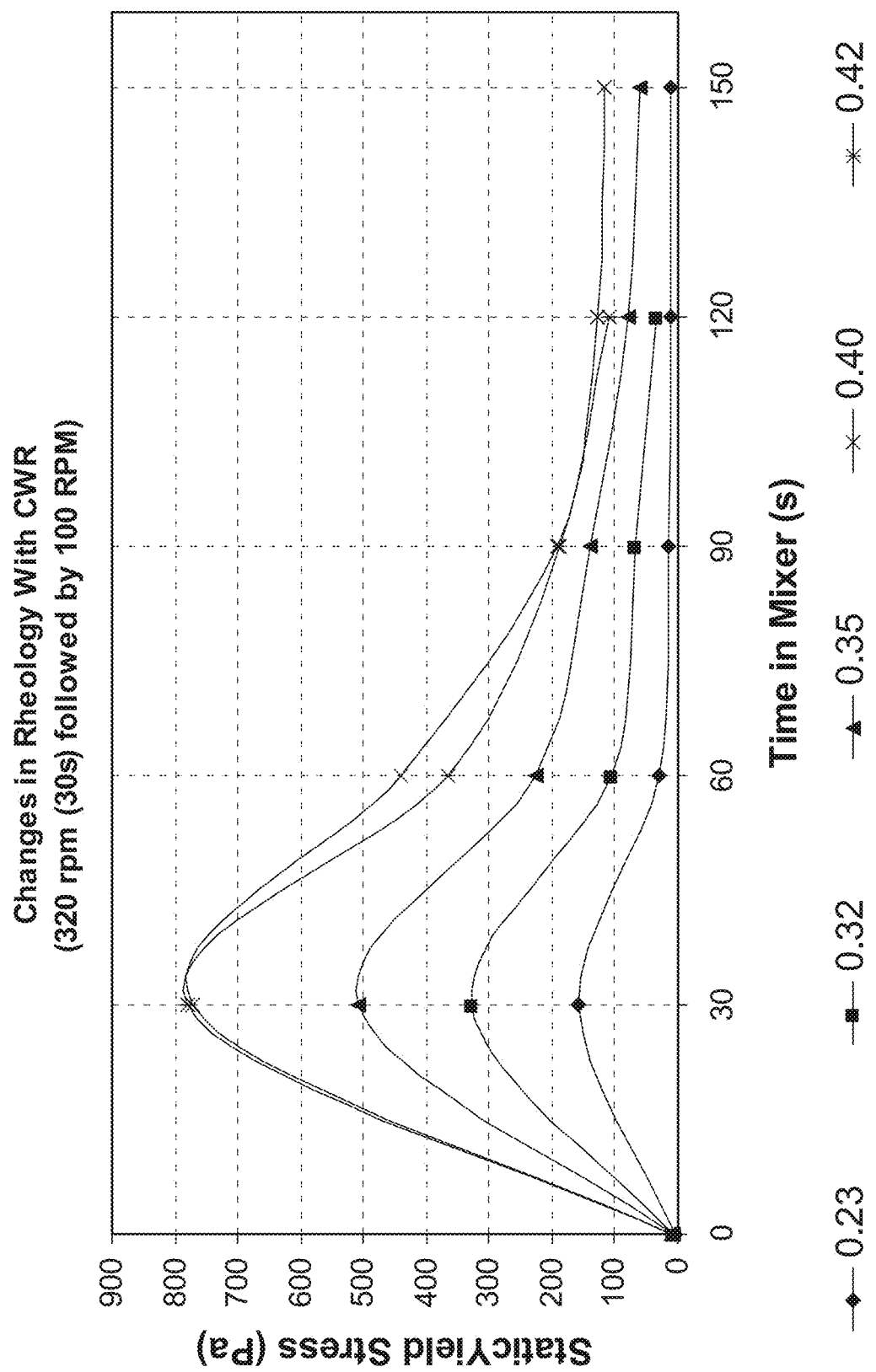
FIG. 20 is a graph of yield stress versus time in mixer.

FIG. 20 shows changes in rheology of flocculant treated thick fine tailings at different CWR from 0.23 to 0.42. The static yield stress response generally increases with higher CWR thick fine tailings.

For thick fine tailings that contain a significant amount of clay compared to sand, such a MFT, the CWR and clay content may be particularly useful indicators for dewatering operations.

In some implementations, the dewatering operation treats thick fine tailings for which the clay content and the CWR dominate the rheological behaviour. This may be contrasted with other "regular" tailings streams for which sand content dominates the rheological behaviour, which may be above sand-to-fines ratios (SFR) of 3 that has grain to grain contact of the sand. Regular tailings streams may typically have a SFR around 6 and a CWR of around 0.05, although there may be a high variation in the SFR depending on plant conditions. Thick fine tailings, such as MFT, has higher CWR and lower SFR, e.g. MFT may have a CWR between 0.1 and 0.4 and a typical SFR of less than 1, which may depend on the depth of the pond.

In some implementations, the dewatering operation treats MFT, which may or may not be from an oil sands tailings pond, having a CWR between 0.25 and 0.4. The viscosity may be between about 6 and about 12 mPa·s 8.2 and 22.8 cP and the yield stress may be between 0.5 and 20 Pa. The MFT feed may provided by varying the depth of a dredge cutter head or submersible pump, giving a consistent type of MFT having a relatively constant CWR. The MFT may be treated with a known flocculant dose, leading to a stable feed.

Figure 21:
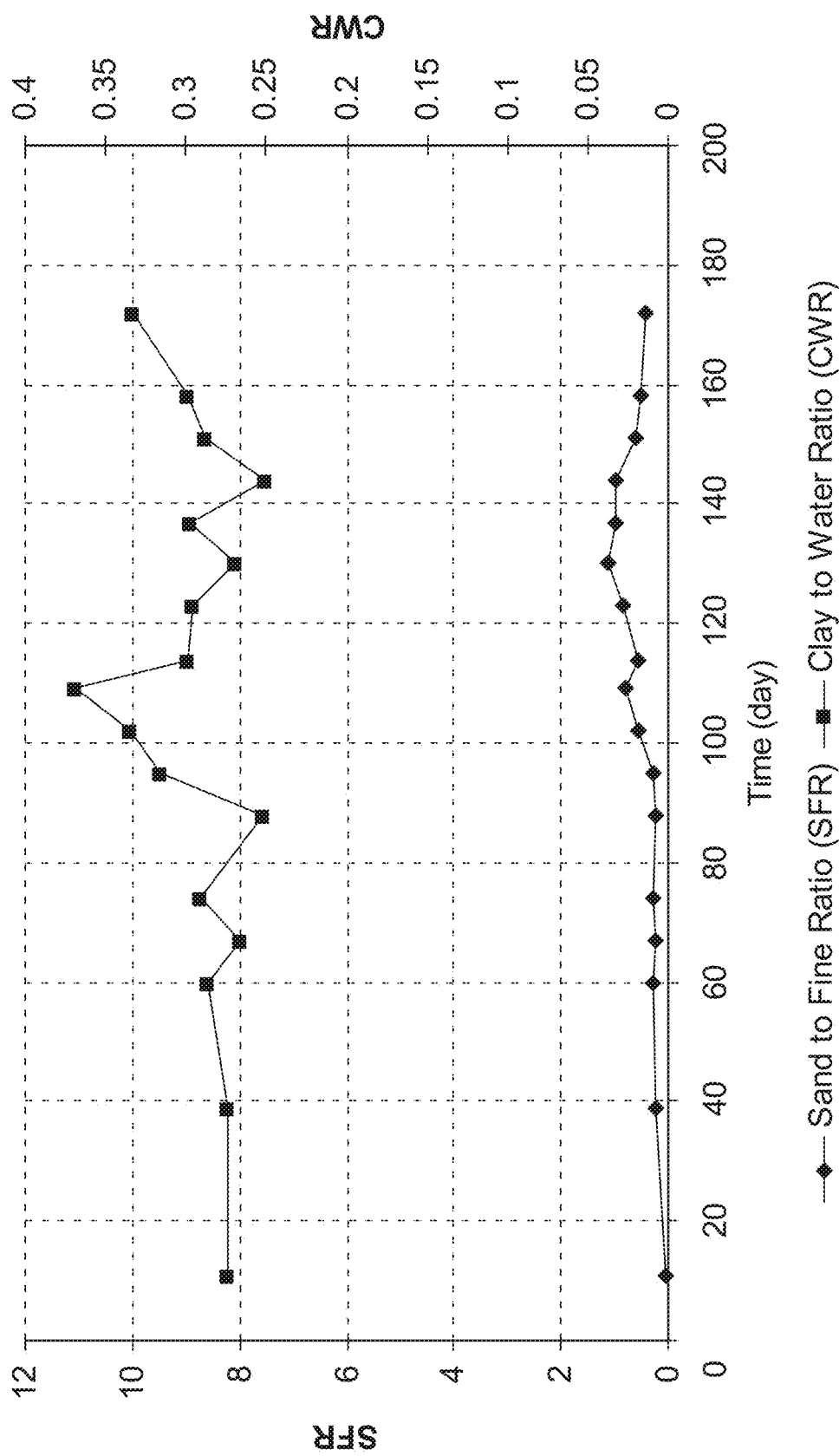
FIG. 21 is a graph of sand-to-fines ratio (SFR) and CWR versus time.

FIG. 21 shows an example of SFR and CWR of a dredged MFT feed. This shows stability of CWR in a dewatering operation range of 0.25 to 0.35 CWR and low SFR>0.05.

It has been found that the CWR of a particular MFT volume seems to have a large impact on the NWR. The CWR can generally vary depending on the source of the tailings. For instance, the CWR can vary between tailings ponds and depths within a given pond or a certain pond location. If the thick fine tailings are obtained from an extraction operation, e.g. as thickener underflow, the CWR can vary depending on upstream processing. Higher CWRs generally lead to higher yield stress in MFT. In addition, clay content can be an effective indicator of polymer flocculant dosage requirements while the CWR can be correlated with yield stress to determine the operating conditions of the dewatering operation.

In some implementations, the CWR and/or the clay content may be determined and/or estimated based on a survey of the tailings pond from which the MFT is retrieved. Tailings ponds may be mapped in order to determine the CWR and/or the clay content at various locations and depths. The dewatering operation may then be operated in accordance with the determined or estimated CWR and/or the clay content of the MFT. For example, the pre-shearing step may be performed for higher CWR thick fine tailings that also have a higher yield stress. In addition, the flocculant may be dosed based on the clay content of the non sheared MFT or the pre-sheared MFT.

In some implementations, the dewatering operation may include a clay analyzer installed to analyse the clay content and adjust dosing of the flocculant in accordance with clay content. It is also possible to use viscosity measurements as an indicator and indirect measure of clay content. Knowing that different CWRs have different viscosities, viscosity measurement can be used to estimate clay content and yield stress provides an approximate dosage.

Figure 22:
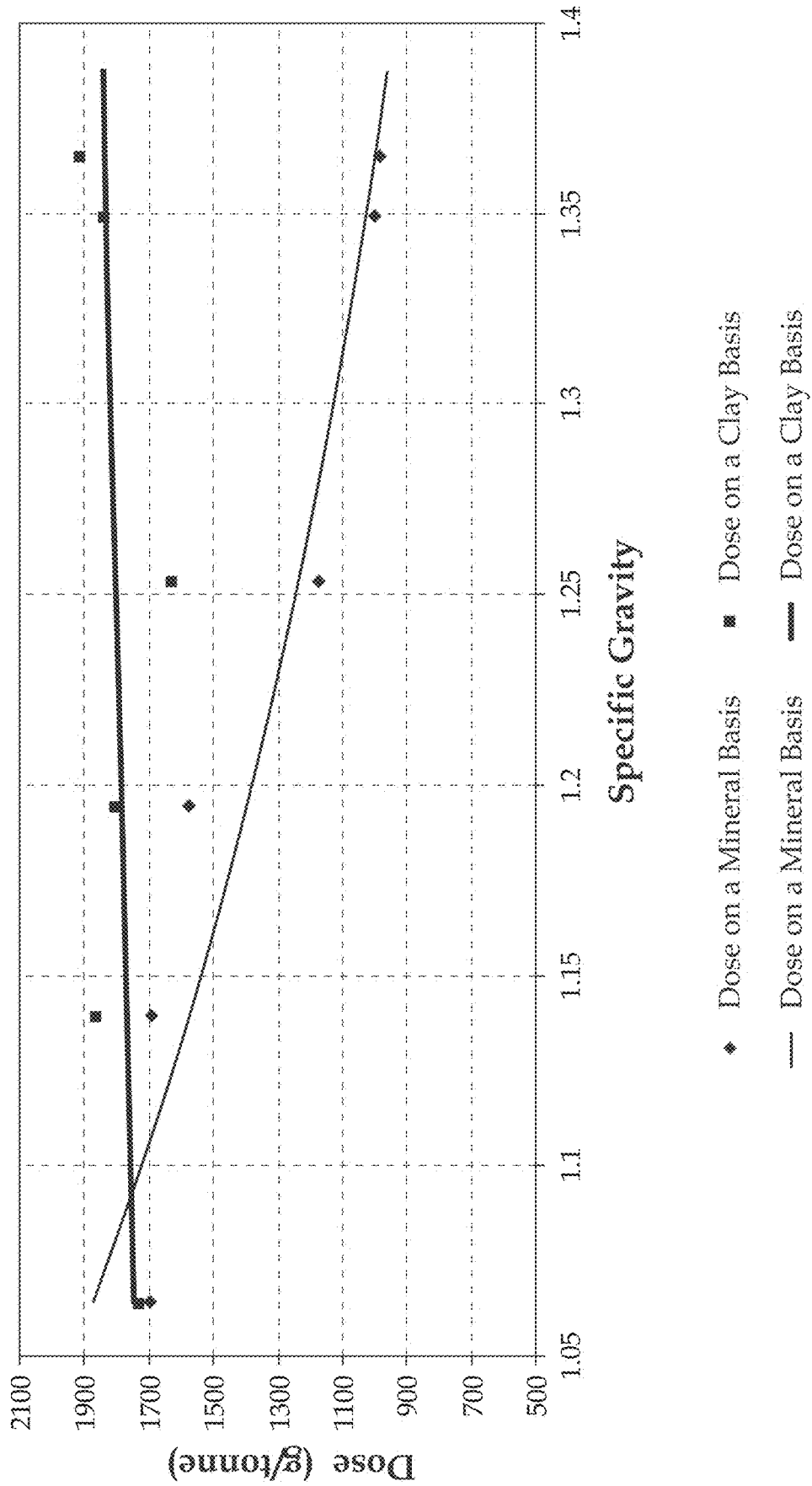
FIG. 22 is a graph of flocculant dose on a clay or mineral solids basis, versus specific gravity.

Referring to FIG. 22, the impact of specific gravity on dosage on different bases is shown. As the specific gravity increases, the dose on a mineral basis decreases, which is because the clay content measured by methylene blue decreases. The dose on a clay basis, however, remains relatively constant. In addition, the dose on a clay basis increases to a point in accordance with yield stress although this is quite slight. This illustrates the relevance of dosing on a clay basis rather than on a mineral solids basis.

Figure 23:
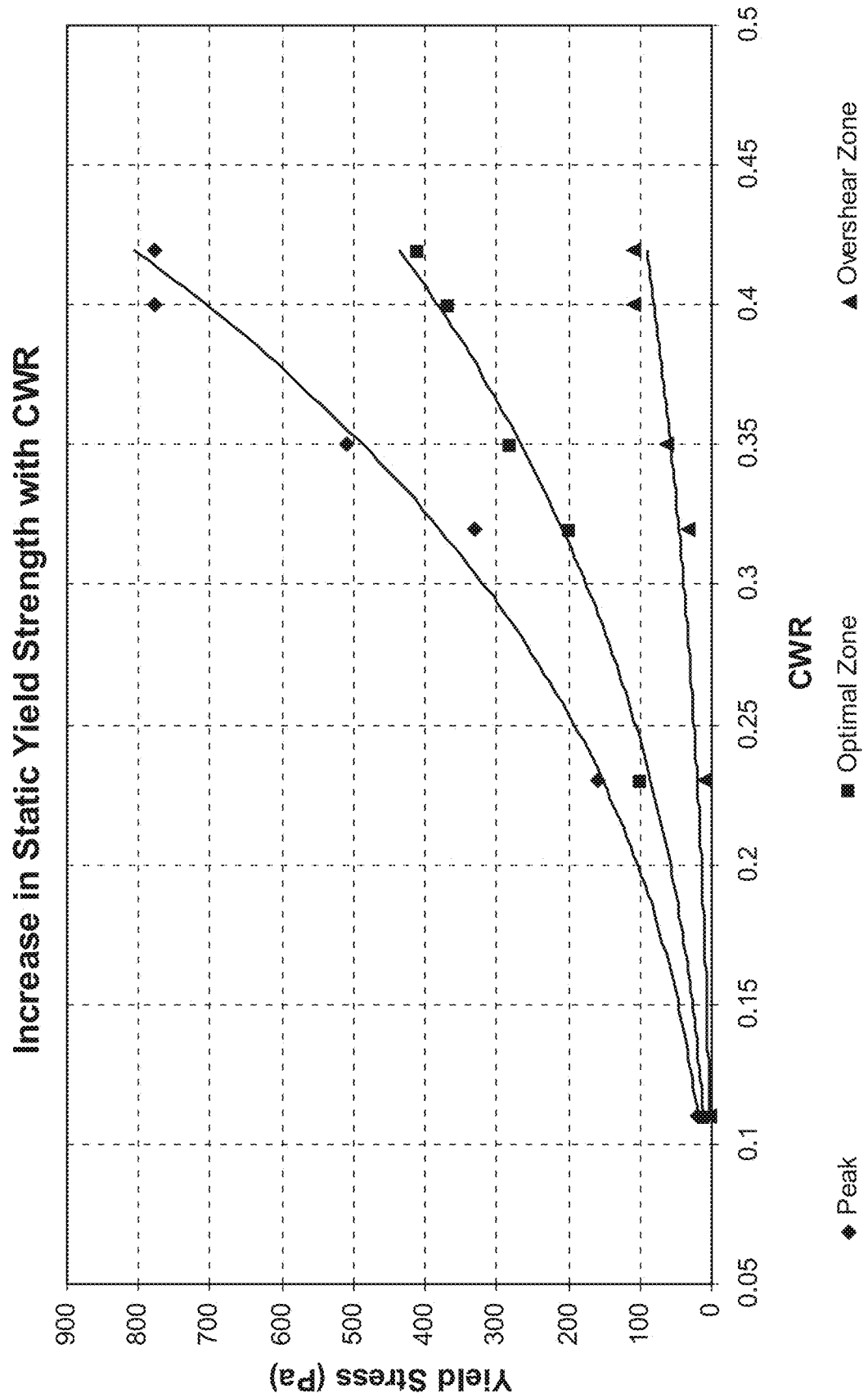
FIG. 23 is a graph of yield stress versus CWR.

In one example, a series of tests were performed on the evolution of yield stress with regard to CWR. The samples of MFT were combined with polymer flocculant and subjected to a fast shear mixing and thickening step (320 rpm) followed by a slow mixing and shear thinning step (100 rpm). The MFT samples having lower CWR displayed lower peak strength and greater floc breakdown speed. The values for peak strength, optimal water release zone, and overshear zone, can be plotted to provide a good correlation with CWR. FIGS. 20 and 23 illustrate curves on which some of the process conditions of the dewatering operation may be designed based on CWR.

Figure 24:
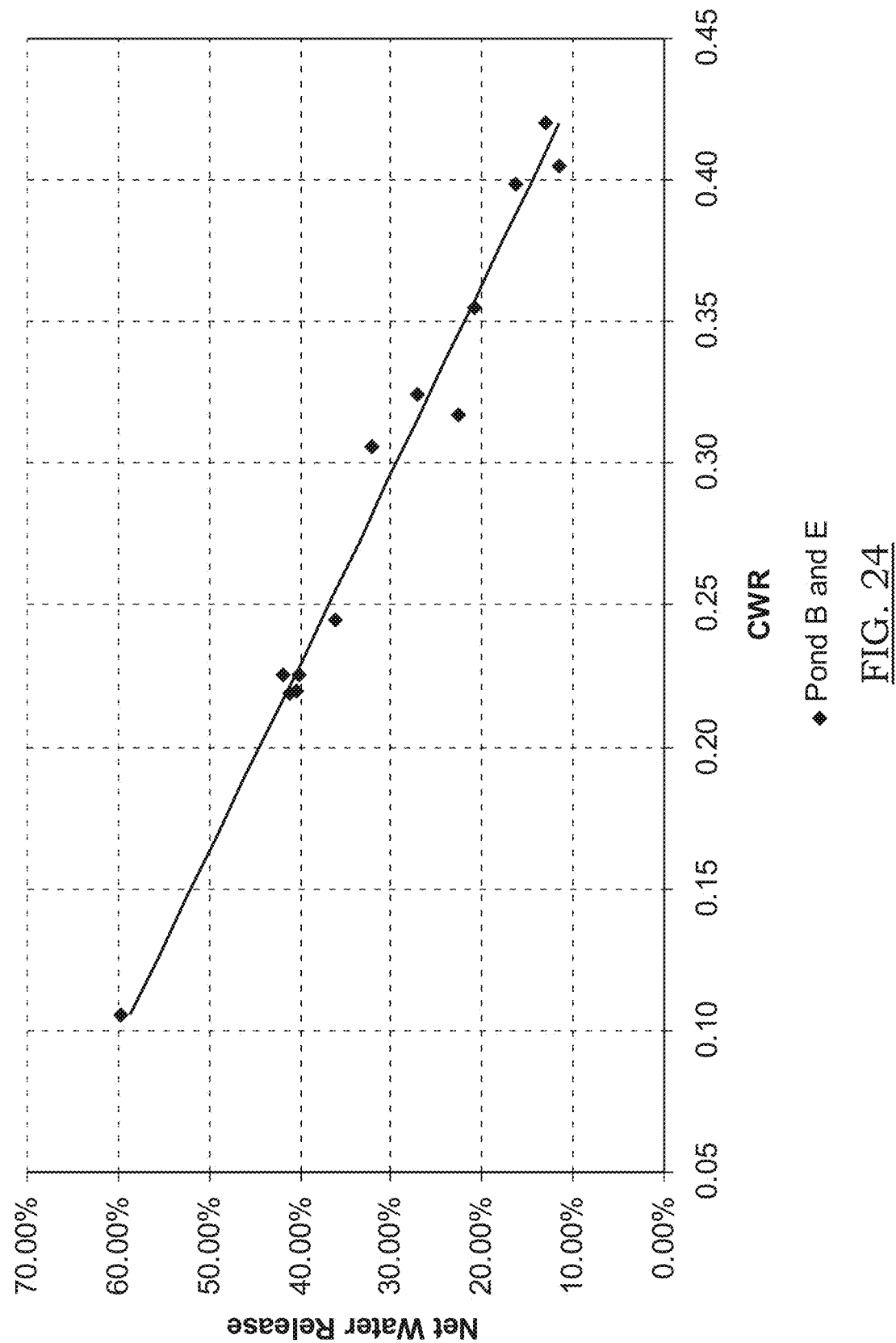
FIG. 24 is a graph of NWR versus CWR.
Figure 25:
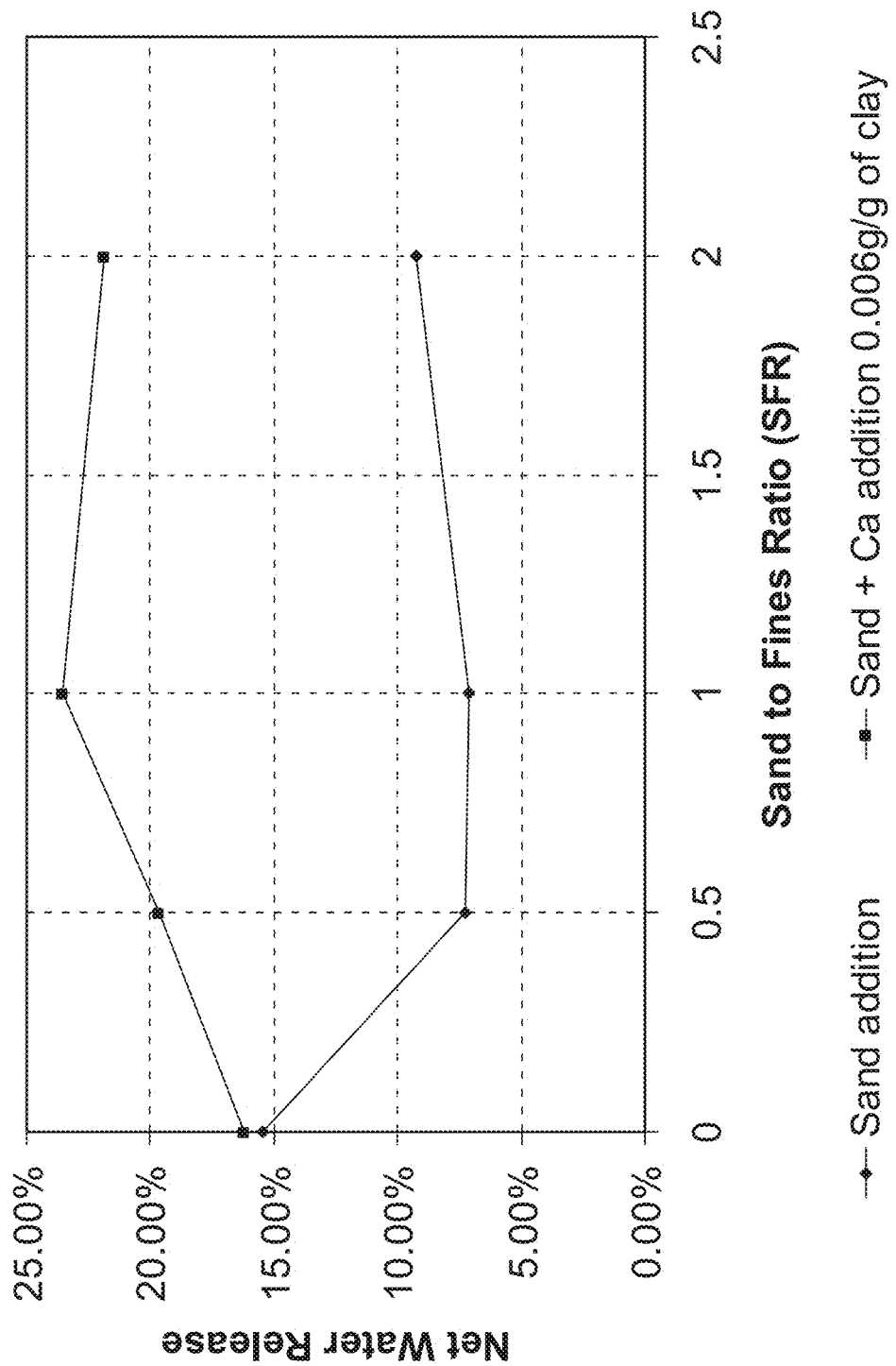
FIG. 25 is a graph of NWR versus SFR.

Referring now to FIG. 24, water release for MFT can be a function of CWR. A higher NWR has been observed at lower densities or lower CWR. FIG. 25 is based on tests with non pre-sheared MFT, and thus the higher CWR samples had higher initial yield stress. It is also noted that field NWR is typically higher than in the laboratory.

In addition, the flocculant may be dosed on a clay basis and the dose may also be approximated based on the static yield stress and the SBW of the MFT. As discussed further above, the MFT can also be pre-sheared in order to lower the yield stress and flocculant dosage.

While in thick fine tailings applications flocculant can be added on a gram per tonne of solids basis and this can be adequate for homogeneous slurries, MFT develop from settling in segregating ponds and the mineral size distribution of MFT can depend on the sampling depth. Therefore, flocculant dosing simply on a solids basis may result in an underdosed or overdosed situation regarding maximum water release.

In one example, three MFT samples were tested and showed large variations in the optimum flocculant dosage on solids or fines basis, but consistency in terms dosage on a clay content basis. The MFT samples were sourced from two ponds at different depths and with similar water chemistries.

In some experiments, MFT samples were obtained from various different depths of a tailings pond to determine flocculant dosages. These studies determined that there is a correlation between net water release (NWR) and CWR. It was also determined that the peak yield stress of flocculated MFT is dominated by the CWR.

In some implementations, the CWR of the thick fine tailings may be controlled or kept generally constant during the flocculation and dewatering operation. Large variations in CWR in thick fine tailings feed to the flocculation step can result in operational difficulties in flocculant dosing and on-spec flocculated material for consistent dewatering. For example, the CWR may be maintained by retrieving the thick fine tailings from a constant depth of a tailings pond or combined with a second stream of thick fine tailings that has higher or lower CWR, in a proportion to maintain a generally constant CWR material fed to the flocculation.

Thick fine tailings that are retrieved for processing may be tested to determine its CWR. An off-line or an on-line clay measurement testing may be performed and used to control the thick fine tailings feed, by varying the dredge depth or location or by adjusting the CWR by other methods.

Sand-to-Fines Ratio (SFR) and Calcium Content of Thick Fine Tailings

Sand is a relatively large and coarse particulate material compared to clay. The sand-to-fines ratio (SFR) can be determined by measuring the sand content and the thick fines content.

$$SFR=(\% \text{ sand})/(\% \text{ fines})$$

While in some implementations no sand is added to the thick fine tailings prior to the dewatering operation, in some implementations sand can be added or the thick fine tailings may be retrieved in a manner such that it contains a certain amount of sand.

Figure 26:
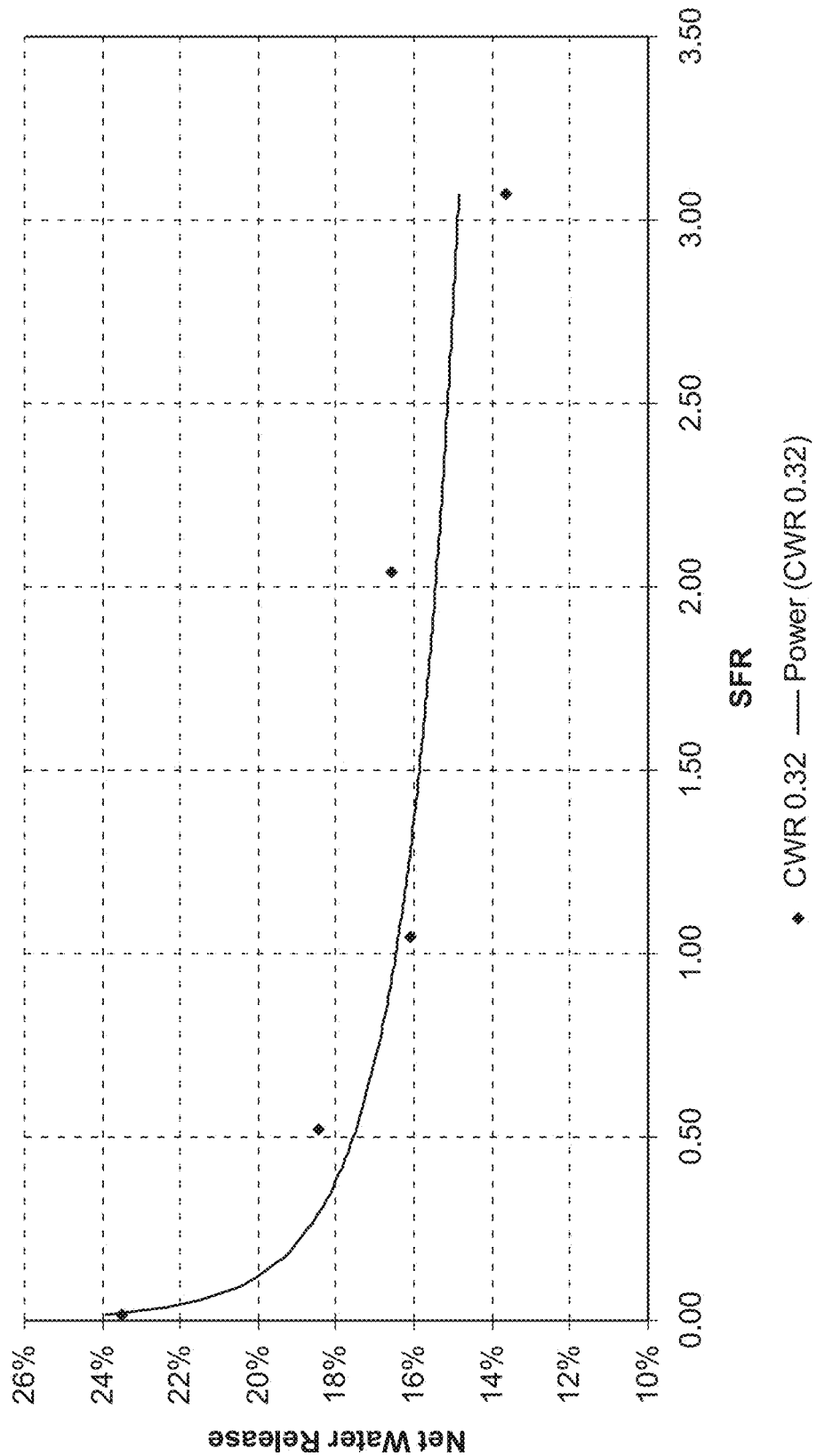
FIG. 26 is a graph of NWR versus SFR.

Referring to FIGS. 25 and 26, sand was added alone and in combination with calcium to assess the impact on NWR. In the tested conditions, at all CWR that were tested, addition of only sand to increase the SFR resulted in a decrease in NWR, while addition of both sand and calcium resulted in an increase in NWR. The co-addition of sand and calcium was performed by mixing the calcium into the thick fine tailings samples one hour before adding the flocculant.

The impact of calcium content and calcium addition was also studied. It was determined that calcium may be added in an amount and with sufficient reaction time prior to flocculation to enable clarification of release water, increased water release, and no increase in flocculant dose compared to no calcium addition. The calcium may be added in an amount and with sufficient reaction time to reduce or minimize free calcium cations in the interstitial water of the thick fine tailings and encourage the calcium to associate with clay platelets. The calcium may be added in an amount and with sufficient reaction time to avoid precipitation of polymer flocculant, which may be a monovalent ion salt of an anionic polymer, e.g. sodium polyacrylamide based polymer flocculant.

Figure 29:
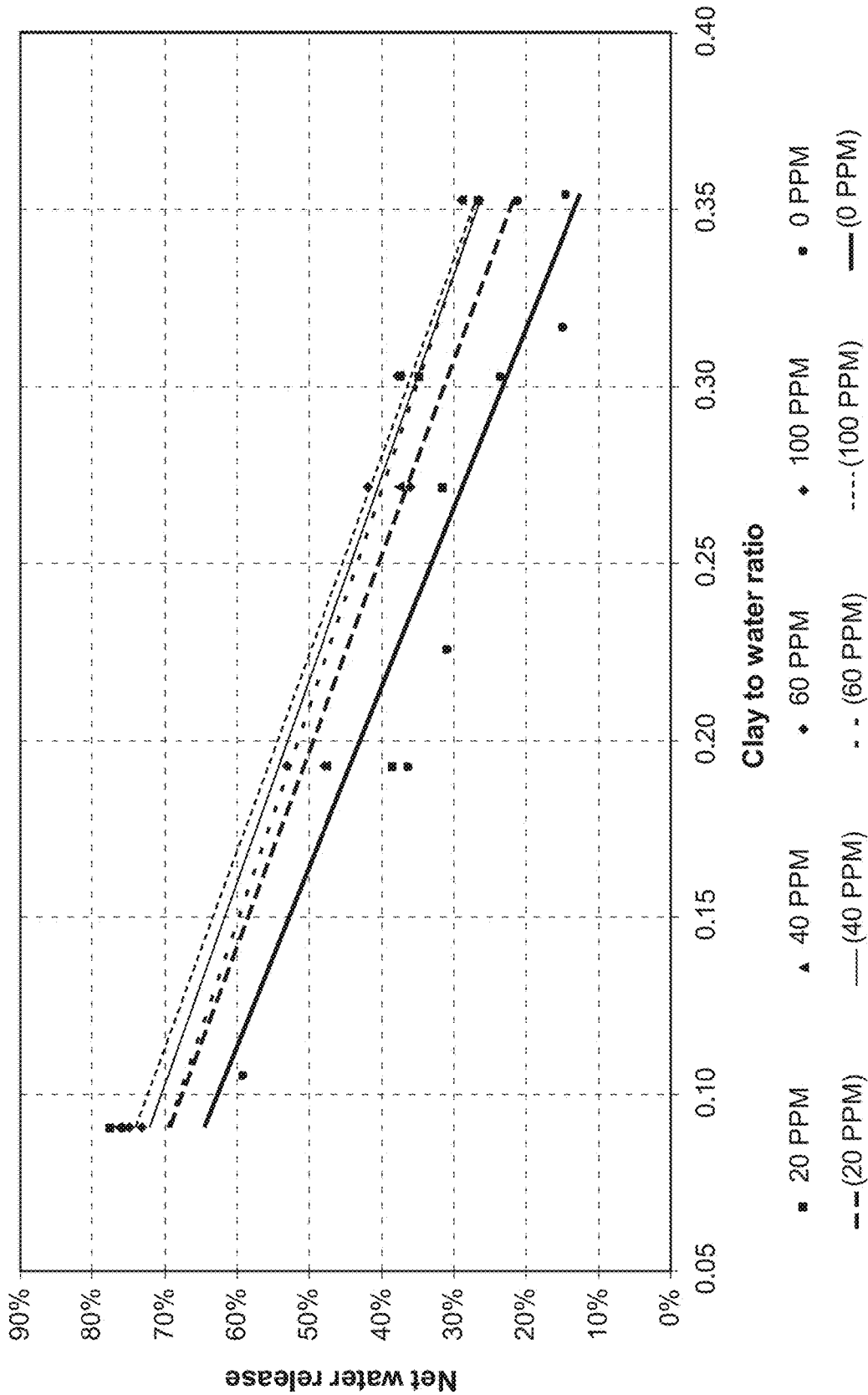
FIG. 29 is a graph of NWR versus CWR.

Referring to FIG. 29, water release response to calcium addition is shown for different CWR.

Figure 30B:
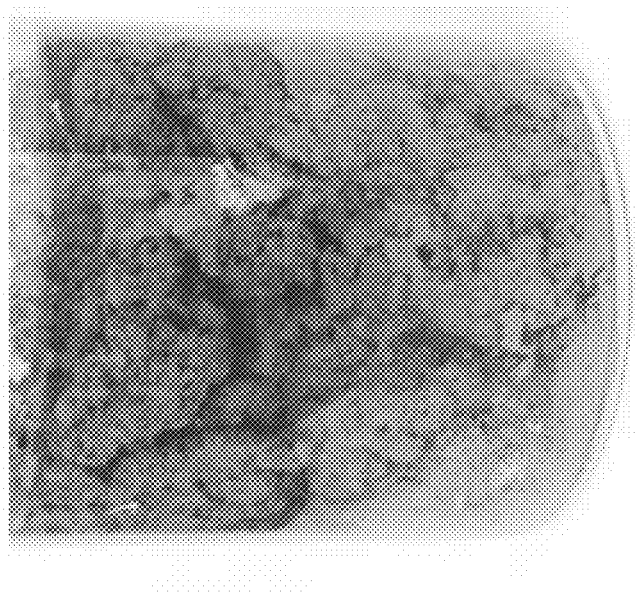
FIGS. 30a and 30b are photographs of flocculated oil sands MFT.
Figure 30A:
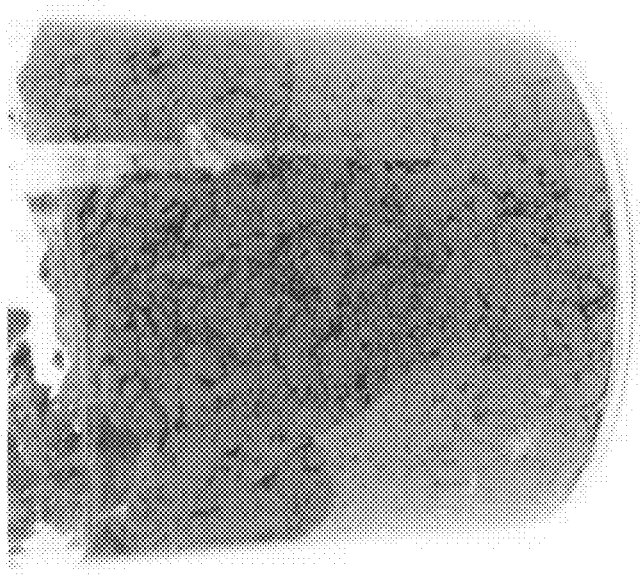

In one example, MFT samples having 0.35 CWR were mixed with 1000 ppm of gypsum. One of the MFT samples was left for 8 weeks and then flocculated. In this case, the water release significantly increased from just under 20% NWR to just over 30% NWR. This illustrates the advantage of providing sufficient reaction time after calcium addition. The appearance of the flocculated MFT also changed considerably from the appearance of the samples that were flocculated 8 weeks before: the 8 week flocculated samples displayed large fluffy flocs with relatively large water interstices between the flocs. FIGS. 30a (immediate flocculation) and 30b (flocculation after 8 weeks) illustrate the different flocculated thick fine tailings appearance depending on calcium reaction time.

In another example, thick fine tailings samples retrieved from pond F had higher yield stress after flocculation and also tended to release cleaner water compared to pond B.

Pond F contains tailings that was previously treated with gypsum and the level of calcium in the interstitial water was around 60 ppm. A sample was taken from pond F and was characterized for water release and yield stress over a range of flocculant doses. Compared to a thick fine tailings sample of similar specific gravity from pond B, the pond F sample enabled a broader range of flocculant dose and greater water release. The yield stress data showed that while the peak strength and water release zone strengths were in the expected range for this specific gravity, it took longer to disperse the flocculant into the MFT than would be expected for a pond B sample, likely caused by differences in CWR.

In another example, pond A thick fine tailings were blended with pond B or pond F thick fine tailings in order to enhance the flocculation and dewatering of the pond A tailings. Pond F thick fine tailings releases more water due to the presence of sufficient levels of calcium. The results showed that blending different MFTs can improve dewatering. For example, blending pond A MFT with a lower CWR MFT for effective dilution can enhance the flocculation and dewatering of the pond A MFT.

In some implementations, the calcium may be added in an amount between 20 ppm and 2000 ppm, between 40 ppm and 1000 ppm, between 60 ppm and 500 ppm, or between 100 ppm and 200 ppm.

In some implementations, the calcium may be added and thoroughly mixed into the thick fine tailings. After addition and mixing of the calcium, the mixture may be provided with a reaction time prior to flocculation of at least 12 hours, 24 hours, 2 days, 4 days, 1 week, 2 weeks, 4 weeks or 8 weeks. Calcium may be added to thick fine tailings and left for a sufficient time in a storage tank. In other scenarios, calcium may be added directly to a tailings pond. In this regard, some tailings ponds have been previously treated with calcium, e.g. gypsum. Thick fine tailings retrieved from such ponds may already have an effective calcium content for enhancing the flocculation and dewatering operation.

In some implementations, two thick fine tailings may be blended together in accordance with their different CWR or calcium contents, in order to enhance the flocculation and dewatering operation. Calcium addition into one thick fine tailings stream may therefore be conducted by blending it with another thick fine tailings having a higher calcium content. In one scenario, one thick fine tailings stream having low calcium content is blended with another thick fine tailings having an overly high calcium content, for a sufficient reaction time, such that the combined thick fine tailings have a calcium content enabling improved flocculation and dewatering.

In some implementations, divalent cations, such as calcium cations, may be added to the thick fine tailings in accordance with any one of the above described scenarios and examples, to improve the flocculation and dewatering operation. For instance, calcium cations may be added by adding gypsum to the thick fine tailings. Gypsum may be added in the form of a slurry. Another calcium containing compound, such as alum, may be added, alone or in combination with gypsum slurry. Gypsum addition may be done in an amount and with enough time to allow adsorption onto the clay without exceeding the adsorption capacity and creating an excess of free calcium cations in the water of the thick fine tailings.

Coagulation Pre-Treatment

A coagulant may be added to the fine tailing prior to the addition of the flocculant. Coagulant addition prior to flocculation can increase the NWR. The coagulant may be added as a solid, a dispersion, or an aqueous solution. A sufficient coagulation time may also be provided prior to the flocculation stage to facilitate the benefits of pre-coagulation. Various conventional coagulant products may be used.

Thick Fine Tailings Retrieval and Supply Techniques

The thick fine tailings supply arrangement and methodology may be provided in accordance with the properties of the thick fine tailings to be treated by the dewatering operation.

For example, dredges, barges, submersible pumps and pipe layouts and pre-treatment units may be provided and operated based on thick fine tailings properties. The dredges or submersible pumps that may be used in the case of treating tailings withdrawn from a tailings pond may be operated to retrieve the thick fine tailings from a certain depth or location to obtain thick fine tailings within desired property ranges, such as CWR, SFR, and/or bitumen content ranges.

In addition, monitoring of the thick fine tailings feed can enable adapting the dewatering operation based on the measured properties or adjusting the retrieval method. For example, water chemistry, rheological properties, and composition may be measured. Monitoring the thick fine tailings feed can enable improved flocculant dosage and other benefits.

Depending on various factors—such as the type of thick fine tailings and the extraction process that was used to generate the tailings, the location and arrangement of the tailings feed lines into the pond, the history and age of the pond, the different types of tailings that may be expelled into a given pond, and so on—a tailings pond may have various compositions at different locations and depths of the pond. There may be certain compounds that are prevalent in certain locations or depths of some ponds.

Figure 27:
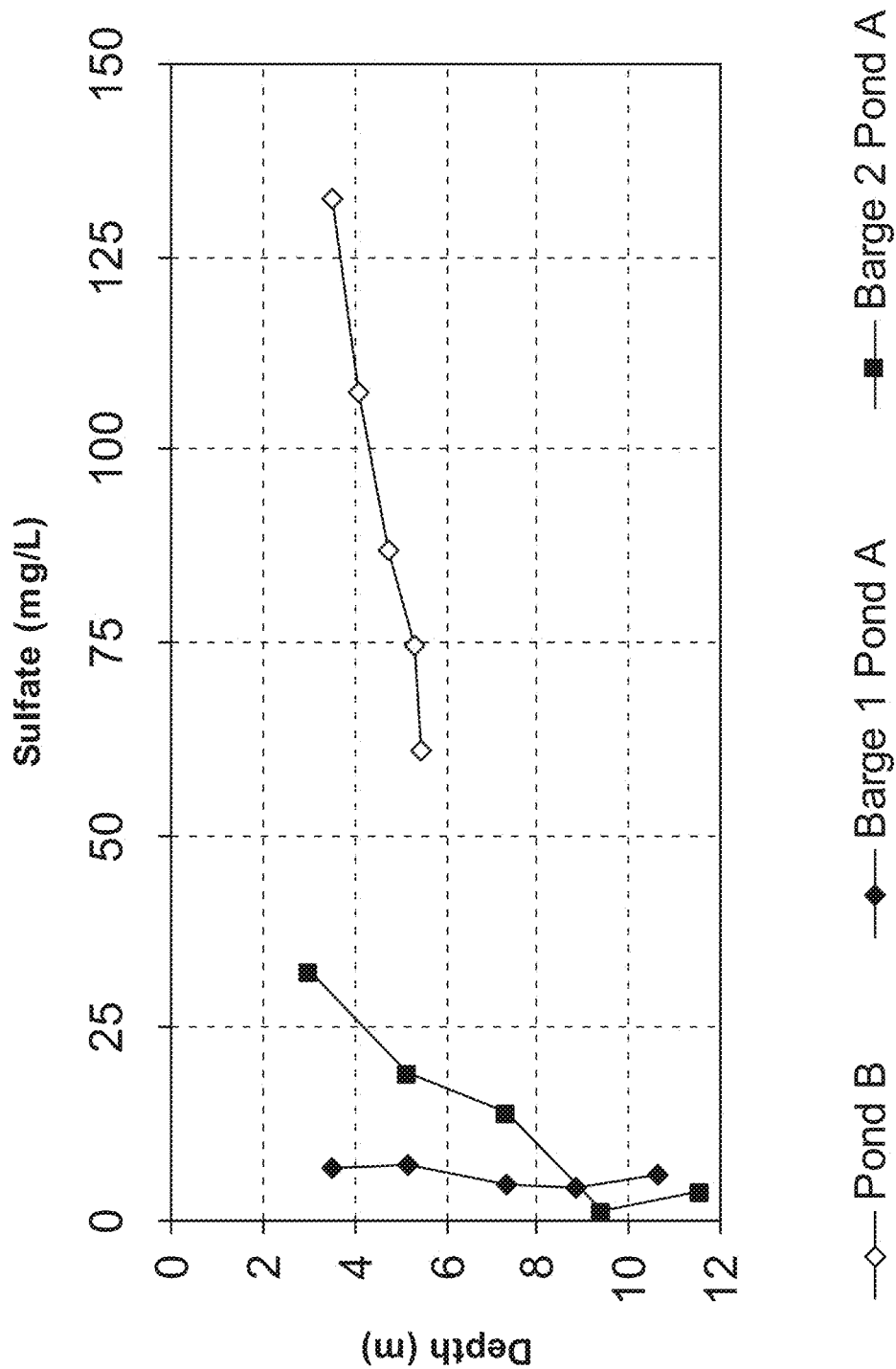
FIG. 27 is a graph of pond depth versus sulphate concentration.
Figure 28:
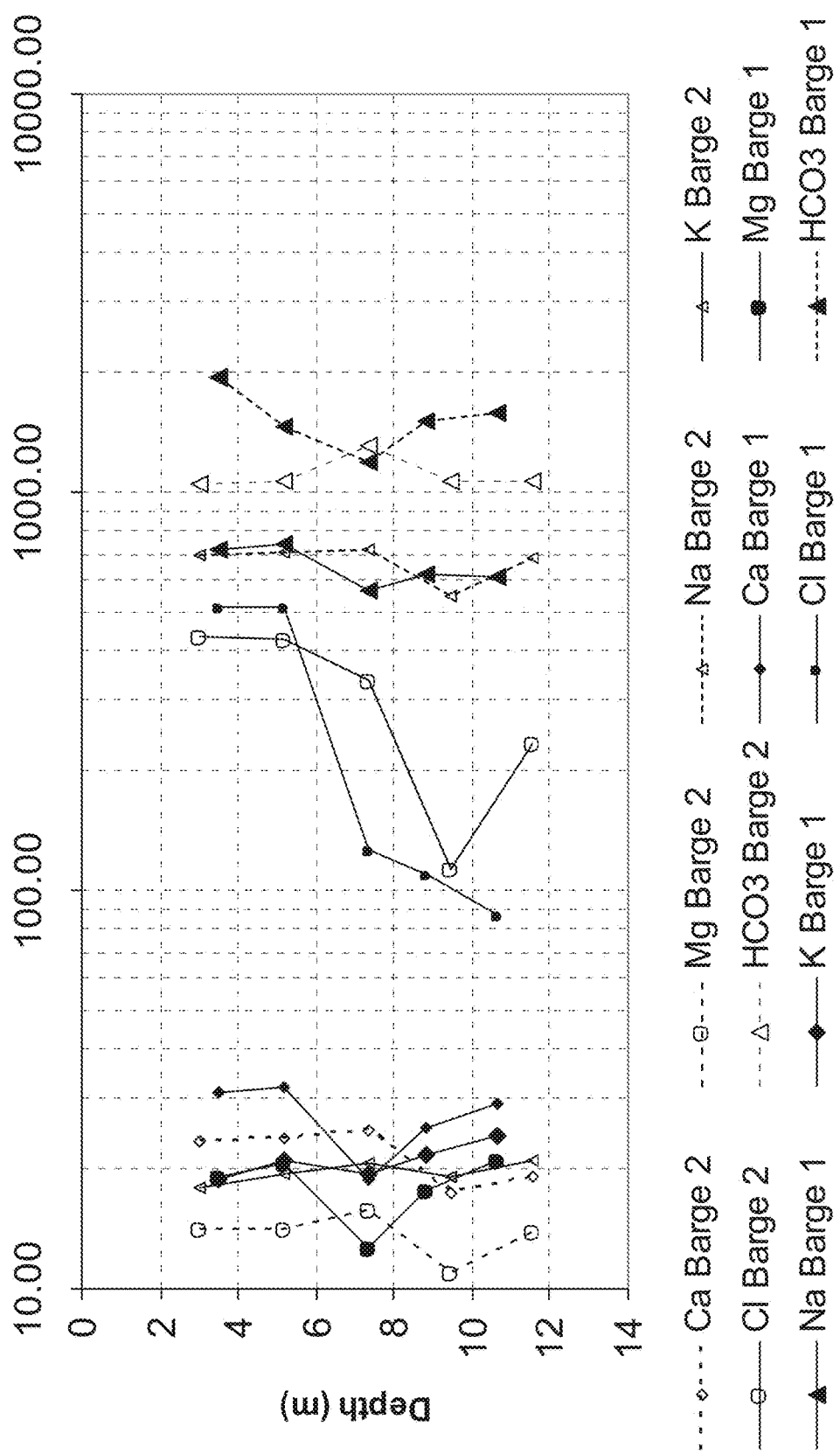
FIG. 28 is a graph of pond depth versus water chemistry.

In one example, the water chemistry of different depth samples of MFT was determined. Referring to FIG. 27, in pond A the sulphate concentration sharply decreases with greater depth. For pond B, samples were taken from two different locations using barges 1 and 2. In barge 1, the sulphate concentration is relatively low and constant at all depths from about 3 to 12 m, suggesting that the sulphate has been consumed by bacterial action. An explanation for this observation is the tailings expelled into pond B proximate barge 1 include higher levels of biodegradable compounds, resulting in a more active microbial community in that location and a corresponding consumption of sulphates. Some bacteria can produce calcite that can increase the yield stress of thick fine tailings. FIG. 28 shows other water chemistry data that was collected from barges 1 and 2.

Figure 33:
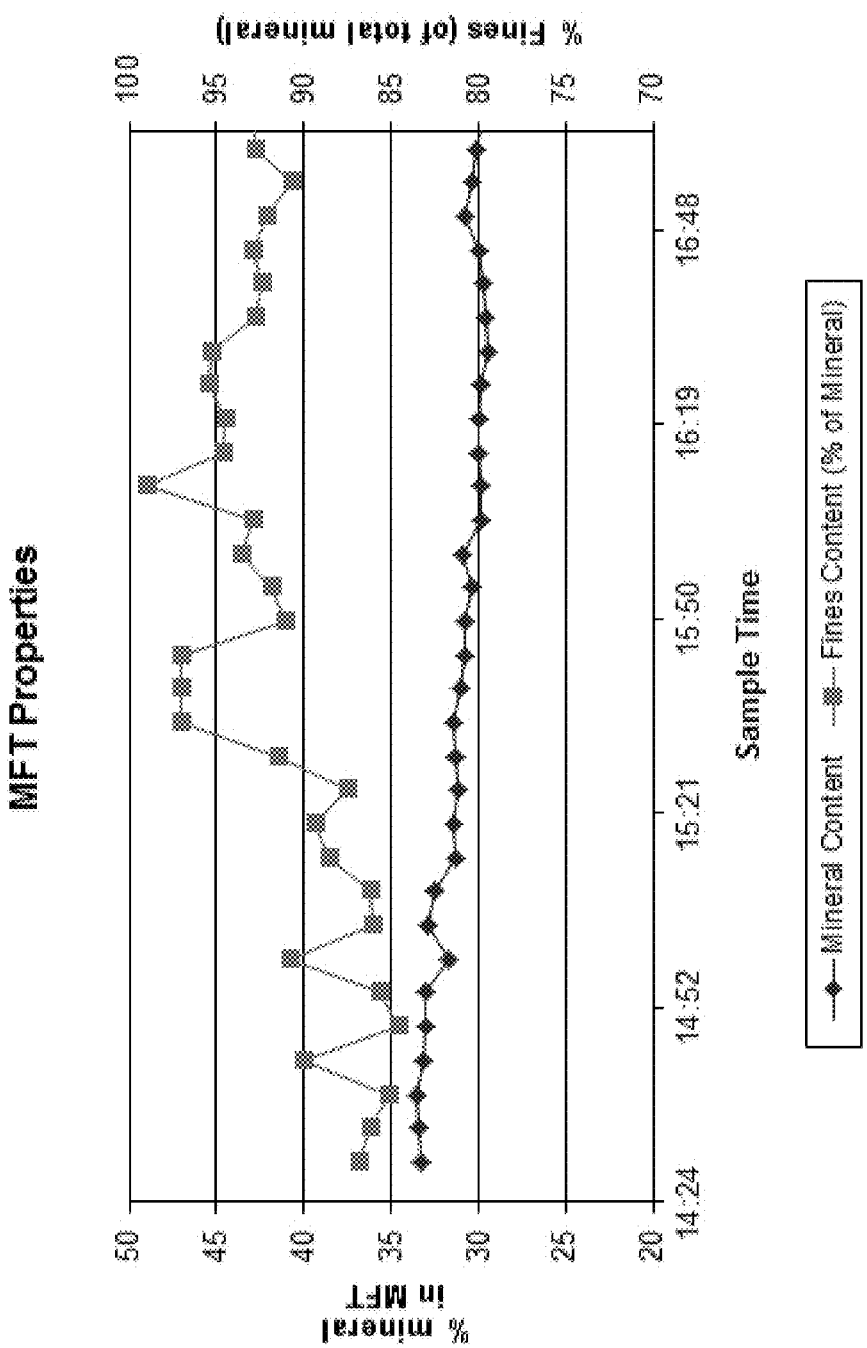
FIG. 33 is a graph of mineral and fines content versus sample time from one dewatering facility.
Figure 34:
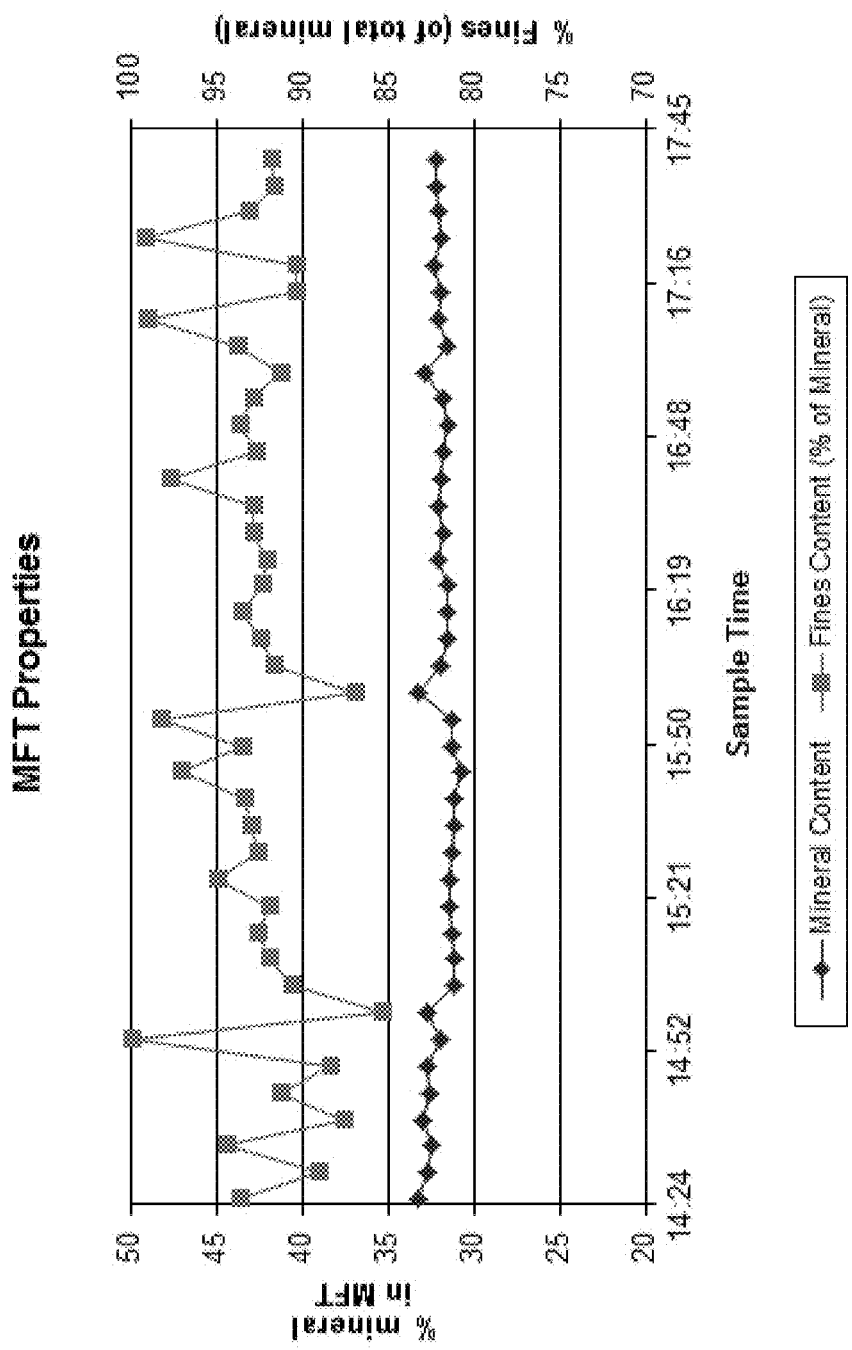
FIG. 34 is a graph of mineral and fines content versus sample time from another dewatering facility.

In another example, a variability study was conducted with sampling at 5 min intervals over several hours, performed on an MFT feed supply. The study revealed that when feeding MFT from a single pond most MFT properties may be maintained to display little variance with the exception of the fines content which displayed slight fluctuations over the sampling period. The study also revealed that blended MFT samples from different ponds displayed constant mineral content but significantly varying fines and clay content over the sampling period. Therefore, when blending thick fine tailings from different sources, the clay content should be monitored rather than approximating with mineral content for determining optimal flocculant dosage. See FIGS. 33 and 34.

In another example, thick fine tailings from ponds A, C and F were compared with regard to a dewatering operation. Pond A was the easiest to flocculate, released clean water, displayed a higher yield stress upon deposition. Ultrafines present in the pond A tailings are coagulated due calcium content of the tailings. Pond C had a lower strength thick fine tailings, resulting in laminar depositional flow upon deposition, and the water release included an amount of ultrafines. Pond F was more difficult to flocculate, displayed high yield stress and released clean water. Ultrafines present in the pond F tailings are coagulated due calcium content of the tailings.

In another example, thick fine tailings samples at varying depths in pond B were dredged up (See below table). These samples were tested for BMW, methylene blue, % fines and water chemistry. Note that with increasing depth the clay content decreases and the SFR increases.

| Depth | Wt % Bitumen | Wt % Solids | Wt % Water | Wt % Clay on Solids* | SFR | CWR |
| --- | --- | --- | --- | --- | --- | --- |
| 7.5' | 0.5% | 9.7% | 89.9% | 98% | 0.01 | 0.11 |
| 9.5' | 1.2% | 19.7% | 79.3% | 91% | 0.01 | 0.23 |
| 11.5' | 1.6% | 26.2% | 71.8% | 87% | 0.02 | 0.32 |
| 13.5' | 1.7% | 37.4% | 61.0% | 63% | 0.05 | 0.39 |
| 17.5' | 2.0% | 44.8% | 53.5% | 50% | 0.22 | 0.42 |
| 18' | 2.1% | 43.0% | 54.5% | 51% | 0.27 | 0.40 |

In some implementations, the dewatering operation includes obtaining information regarding the composition of the thick fine tailings in one or more tailings ponds at different locations and/or depths. This may include mapping of a tailings pond. The MFT retrieval methodology may then be based on the mapped tailings pond, in order to provide an improved feed to the flocculation step and/or adjust various steps in the dewatering operation in accordance with the MFT feed. Mapping may be updated on a regular basis to account for new incoming tailings and changing volumes and compositions in the tailings pond.

Dewatering Chemical Treatment Operations, e.g. Flocculation

In some implementations, the pre-treated thick fine tailings are subjected to a chemical treatment operation. The pre-treated thick fine tailings may be sent via pipeline to a chemical treatment unit. The pre-treated thick fine tailings may have been screened to remove coarse debris, aerated or subjected to gas injection, and/or shear thinned.

Various different chemical treatments may be conducted. For example, the pre-treated thick fine tailings may be subjected to a chemical aided dewatering operation. Alternatively, the pre-treated thick fine tailings may be subjected to a recovery process to recover one or more valuable substances included in the tailings, such as metals, hydrocarbons, residual ore, and the like, that would benefit from the pre-treatment operation(s). The pre-treated thick fine tailings may be subjected to a chemical treatment to alter its chemistry, such as its pH or salt content, in order to prepare the tailings for reclamation, deposition, or further processing. After the pre-treatment, the pre-treated thick fine tailings have a composition allowing improved mixing and processing with chemical additives.

In some implementations, the dewatering operation may include chemical addition to react with the fine solid particles in the tailings followed by deposition of the tailings. The chemical addition may include addition of a flocculant, such as a long chain polymer, in the form of solid particles, an aqueous solution or a dispersion of particles in a liquid medium.

Referring to FIG. 1, the pre-treated thick fine tailings 106 is supplied to the chemical addition unit 108. A chemical additive 110, such as a flocculant, may be added to the pre-treated tailings for mixing in the chemical addition unit. The flocculant may be added in the form of an aqueous solution where the flocculant is at least partially dissolved. The flocculated mixture 112 is then transported and deposited as a tailings deposit.

Figure 31:
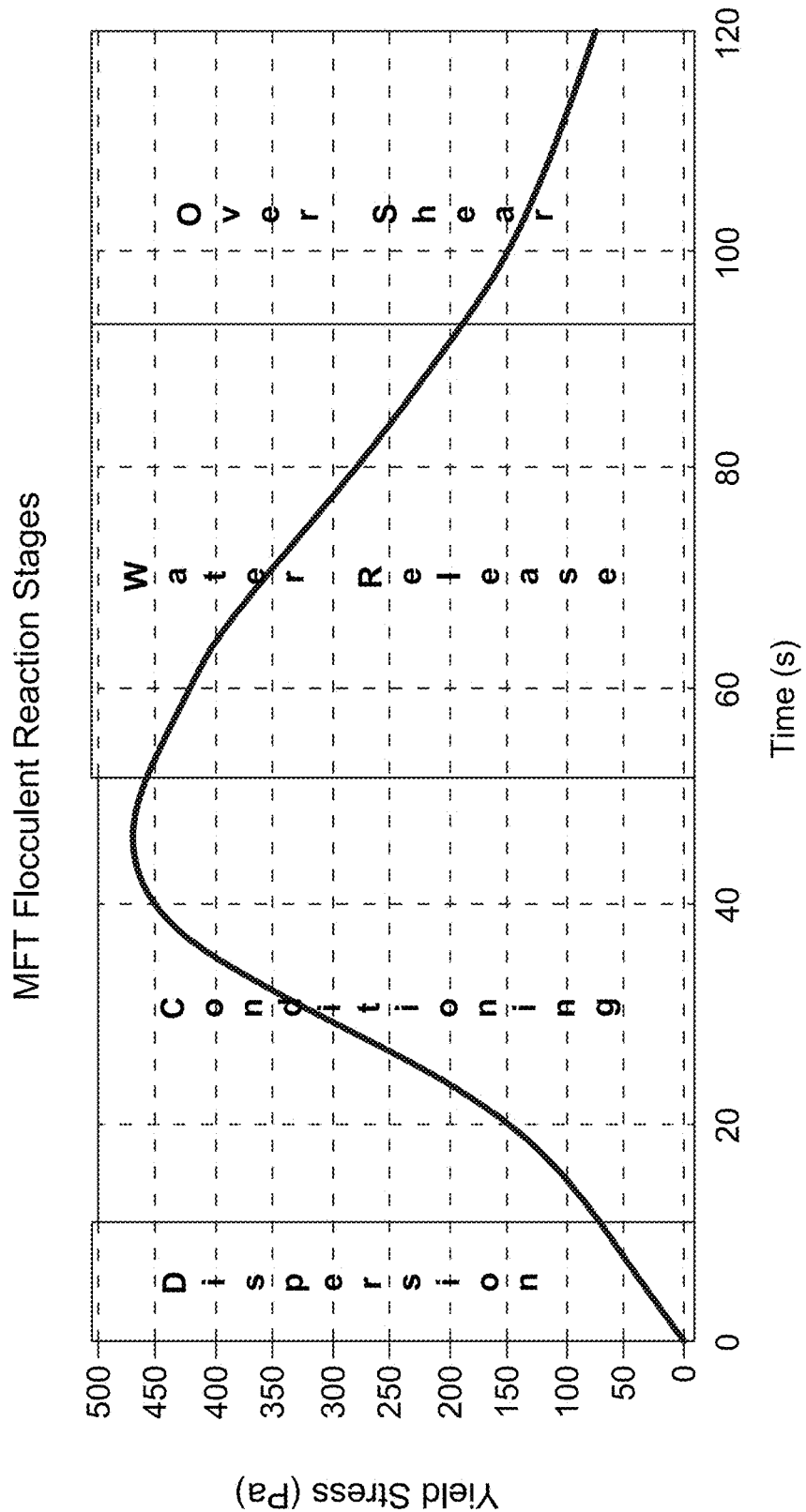
FIG. 31 is a graph of reaction stages for flocculated thick fine tailings such as oil sands MFT.

In some implementations, the pre-treated thick fine tailings may be treated with a flocculant solution. FIG. 31 illustrates reaction stages of flocculation and dewatering. Since the extent and quality of the flocculation reaction depends on the mixing of the flocculant into the thick fine tailings, the pre-treated thick fine tailings provide improved mixability by being shear thinned. Thus, initial dispersion stage of the flocculant solution into the thick fine tailings is enhanced. The next stage of the dewatering operation includes conditioning the thick fine tailings by inputting a sufficient energy to cause the formation and rearrangement of flocculated fine tailing solids to increase the yield shear strength. The conditioning stage may also be enhanced by the pre-treatment. The next stage is the water release stage. The flocculated tailings are thus subjected to sufficient energy such that the floc network structure allows water release. The input energy should not be so great as to over-shear the flocculated material. The water release stage should be attained without over-shearing the flocculated structure that can then be deposited. The flocculated thick fine tailings may be deposited to allow the water release and the formation of a deposit which is allowed to dry by drainage and evaporation.

The chemical addition unit may be any kind of device for mixing a chemical with the pre-treated tailings and may be a solid-liquid mixer, liquid-liquid mixer, in-line static mixer, impeller mixer, tank mixer, T-joint mixer, Y-joint mixer, or another type of mixer. The mixer may be selected and operated to provide rapid mixing of the chemical into the pre-treated thick fine tailings. One or more mixers may also be used in series or in parallel.

One example implementation of a mixer configuration is a pipeline reactor design that enables rapid mixing of non-Newtonian, such as MFT, or shear thinned fluids. The MFT is supplied from an upstream pipeline into a mixing zone. The mixing zone includes an injection device for injecting the flocculant solution. The injection device may also be referred to as a "mixer". The injection device may include an annular plate, injectors distributed around the annular plate and a central orifice defined within the annular plate. The MFT accelerates through the central orifice and forms a forward-flow region and an annular eddy region made up of turbulence eddies. The injectors introduce the flocculant solution directly into the eddy region for mixing with the turbulent MFT. The recirculation of the MFT eddies back towards the orifice results in mixing of the flocculant solution into the MFT forward-flow. The forward-flow region expands as it continues along the downstream pipe. For some mixer embodiments, the forward-flow region may be a vena-contra region of a jet stream created by an orifice or baffle. The main flow of the MFT thus draws in and mixes with the flocculant solution, causing dispersion of the flocculant solution, and flocculation thus commences in a short distance of pipe. This example injection device may also be referred to as an "orifice mixer". A range of orifice diameter "d" to downstream pipe diameter "D" may be 0.25-0.75.

In some implementations, the flocculant added to the pre-treated thick fine tailings, such as pre-treated MFT, may be a polymer flocculant with a high molecular weight. The polymer flocculant may be anionic in overall charge, e.g. approximately 30% anionicity, which may include certain amounts of cationic monomer and may be amphoteric. The polymer flocculant may be water-soluble to form a solution in which the polymer is completely dissolved. It is also possible that the polymer is mostly or partly dissolved in the solution. The polymer flocculant may be composed of anionic monomers selected from ethylenically unsaturated carboxylic acid and sulphonic acid monomers, which may be selected from acrylic acid, methacrylic acid, allyl sulphonic acid and 2-acrylamido-2-methyl propane sulphonic acid (AMPS), etc., and the salts of such monomers; non-ionic monomers selected from acrylamide, methacrylamide, hydroxy alkyl esters of methacrylic acid, N-vinyl pyrrolidone, acrylate esters, etc.; and cationic monomers selected from DMAEA, DMAEA.MeCl, DADMAC, ATPAC and the like. The polymer flocculant may also have monomers enabling interactions that results in higher yield stress of the flocculated MFT. Synthetic polymers such as thickeners maybe used, and may have hydrophobic groups to make associative polymers such that in aqueous solution the hydrophobic groups join together to limit water interactions and stick together to provide a desired shear, yield stress or viscosity response in solution and when reacted with the MFT. The polymer flocculant may also have a desired high molecular weight, for instance over 10,000,000, for certain flocculation reactivity and dewatering potential. The polymer flocculant may be generally linear or not according to the desired shear and process response and reactivity with the given MFT.

Other chemical enhanced dewatering operations may also be employed and may use organic and/or inorganic and/or organic-inorganic hybrid chemical additives. For example, the pre-treated thick fine tailings may be mixed with sand and gypsum to form "consolidated tailings". A typical consolidated tailings mixture may be about 60 wt % mineral (balance is process water) with a sand to fines ratio of about 4 to 1, and about 600 to 1000 ppm of gypsum. This combination can result in a non-segregating mixture when deposited into a tailings pond for consolidation. In another scenario, the pre-treated thick fine tailings may be mixed with organic-inorganic hybrid flocculant to produce a flocculated tailings material that may be deposited and allowed to drain.

Thick Fine Tailings and Suspensions

While several implementations have been described and illustrated herein in relation to oil sands MFT, it should be understood that the processes, systems, devices and techniques may also be used for other suspensions that include fine solid particles and coarse debris.

Depending on the type of thick fine tailings to be dewatered, different techniques or combinations of technique described herein may be used. For example, shear thinning may be implemented for thick fine tailings having an elevated yield stress and thixotropic behaviour. In addition, thick fine tailings that may include hydrocarbons, due to processing or the original ore from which the tailings were derived, may undergo hydrocarbon removal prior to flocculation and dewatering. Furthermore, thick fine tailings having high fines content and elevated CWR with relatively low SFR, such as MFT, may be subjected to a number of the treatment techniques described herein. MFT derived from oil sands processing is one example of MFT that may be treated using a number of the techniques described herein. The feasibility of one or more of the techniques described herein may be determined by following the testing methods that have been outlined. Such testing may include determining rheological behaviour (e.g. thixotropic fluid), composition (e.g. clay content, CWR, SFR, hydrocarbon content and type), flocculant compatibility and dosage ranges, all for a given thick fine tailings sample.

Thick fine tailings may include mining tailings such as those from coal tailings or other hydrocarbon tailings, metal ore tailings, red mud, kaolin slurries, phosphate tailings, and so on. The thick fine tailings may be retrieved from tailings ponds or provided directly from extraction facilities.

It should be noted that while various implementations described herein refer to MFT or thick fine tailings, such techniques may also be adapted and applied to various other suspensions in general.

Suspensions may be aqueous suspensions including fine solid particles that are suspended in the aqueous medium and may also include coarse debris of various types.

Any one of the various pre-treatment techniques may be used in combination with one or more other techniques, for example in an overall thick fine tailings dewatering operation.

The invention claimed is:

1. A process for treating fine tailings having a yield stress of at least 2 Pa and thixotropic behaviour, comprising:
    supplying the fine tailings into a shearing unit comprising a static mixer, an impeller tank mixer, a mixer comprising a rotor-stator assembly, or a combination thereof, configured for shear thinning the fine tailings to produce a shear thinned tailings stream having a reduced yield stress;
    mixing a flocculant into the shear thinned tailings stream to produce a flocculated tailings stream comprising water and flocs;
    supplying the flocculated tailings stream directly to a dewatering step to allow water to separate from the flocs; and
    wherein the fine tailings are selected from the group consisting of tailings that have matured in a tailings pond, oil sands mature fine tailings, tailings derived from an oil sands extraction operation, and tailings material retrieved from a tailings pond.

2. The process of claim 1, wherein the step of dewatering comprises depositing the flocculated tailings stream-at a deposition site and allowing the deposited flocculated tailings material to release water and dry.

3. The process of claim 1, wherein the shear unit is a static mixer.

4. The process of claim 3, wherein the static mixer is a static vane mixer.

5. The process of claim 1, wherein the mixing of the flocculant into the shear thinned tailings stream is performed in a flocculant mixing unit comprising an in-line static mixer, a T-joint mixer, a Y-joint mixer, or a pipeline reactor.

6. The process of claim 5, wherein the flocculant mixing unit is the pipeline reactor that comprises an injection device including an annular plate, flocculant injectors distributed around the annular plate, and a central orifice defined within the annular plate and through which the fine tailings flow.

7. A method of reducing dosage of a flocculant for flocculating and dewatering fine tailings, comprising imparting shear thinning to the fine tailings prior to mixing the flocculant therewith sufficient to reduce flocculant dosage required to achieve a peak range of water release compared to a corresponding fine tailings material not subjected to shear thinning prior to flocculation, and wherein the shear thinning is imparted by action of vanes, an impeller or a rotor-stator assembly of a mixer through which the fine tailings flow, and wherein the fine tailings are selected from the group consisting of tailings that have matured in a tailings pond, oil sands mature fine tailings, tailings derived from an oil sands extraction operation, and tailings material retrieved from a tailings pond.

8. A method of increasing water release from flocculated fine tailings, comprising imparting shear thinning to the fine tailings prior to mixing a flocculant therewith sufficient to increase water release compared to a corresponding flocculated fine tailings material not subjected to shear thinning prior to flocculation, wherein the shear thinning is imparted by action of vanes, an impeller or a rotor-stator assembly of a mixer through which the fine tailings flow, and wherein the fine tailings are selected from the group consisting of tailings that have matured in a tailings pond, oil sands mature fine tailings, tailings derived from an oil sands extraction operation, and tailings material retrieved from a tailings pond.

9. A process for treating fine tailings, comprising:
flowing the fine tailings through a shear unit comprising at least one static mixer, impeller tank mixer, or a rotor-stator assembly, or combination thereof, to produce a shear thinned fine tailings stream;
mixing a flocculant into the shear thinned fine tailings stream to produce a flocculated tailings stream comprising water and flocs;
supplying the flocculated tailings stream directly to a dewatering step to allow water to separate from the flocs; and
wherein the fine tailings are selected from the group consisting of tailings that have matured in a tailings pond, oil sands mature fine tailings, tailings derived from an oil sands extraction operation, and tailings material retrieved from a tailings pond.

10. The process of claim 9, wherein the shear thinning is performed so as to reduce flocculant dosage.

11. The process of claim 9, wherein the shear thinning is performed so as to increase water release from the mixture.

12. The process of claim 9, further comprising:
monitoring a viscosity or yield stress of the shear thinned fine tailings stream; and
adjusting dosage of the flocculant in accordance with the measured viscosity or yield stress.

13. The process of claim 9, wherein the shear unit is the impeller tank mixer and the shear thinning imparts at least a shear of approximately 360 s$^{-1}$ for 70 minutes.

14. The process of claim 9, wherein the shear unit is the impeller tank mixer and the shear thinning imparts at least a shear of approximately 400 s$^{-1}$ for two hours.

15. The process of claim 9, wherein the shear unit comprises a static vane mixer.

16. The process of claim 9, wherein the shear unit comprises the impeller tank mixer comprising an impeller.

17. The process of claim 9, wherein the shear unit comprises a rotor-stator assembly.

18. The process of claim 9, wherein the shear thinning is performed immediately upstream of the step of mixing the flocculant into the shear thinned fine tailings stream.

19. The process of claim 9, wherein the shear thinning is sufficient to reduce the yield stress of the fine tailings to below approximately 20 Pa.

20. The process of claim 9, wherein the shear thinning is sufficient to reduce the yield stress of the fine tailings to below approximately approximately 2 Pa.

21. The process of claim 9, wherein the shear thinning is sufficient to reduce the yield stress of the fine tailings by at least 50%.

22. The process of claim 9, further comprising:
retrieving the fine tailings from a tailings pond.

23. The process of claim 9, wherein the step of dewatering comprises depositing the flocculated tailings stream at a deposition site.

24. The process of claim 9, wherein the step of dewatering comprises subjecting the flocculated tailings stream to thickening and/or filtering.

25. The process of claim 9, further comprising:
employing a retrieval assembly for retrieving fine tailings from a tailings pond;
employing a fluid transportation assembly in fluid communication with the retrieval assembly for providing a fine tailings fluid flow;
employing the shear unit in fluid communication with the fluid transportation assembly for the shear thinning of the fine tailings fluid flow to produce the shear thinned fine tailings stream;
employing a mixer in fluid communication with the shear unit for the mixing of the flocculant into the shear thinned fine tailings stream to produce the flocculated tailings stream; and
employing a dewatering unit in fluid communication with the mixer via a pipeline for receiving the flocculated tailings stream and allowing separation of water from flocculated tailings solids.

26. The process of claim 25, wherein the shear unit is configured and operated to enable shear thinning sufficient to reduce flocculant dosage required to achieve a peak range of water release compared to a corresponding fine tailings material not subjected to shear thinning prior to flocculation and/or to increase water release from the mixture compared to a corresponding flocculated mixture not subjected to shear thinning prior to flocculation.

27. The process of claim 25, further comprising:
employing a monitoring device for monitoring a viscosity or yield stress of the shear thinned fine tailings stream; and
employing a controller for adjusting dosage of the flocculant in accordance with the measured viscosity or yield stress.

28. The process of claim 25, wherein the shear unit is a static vane mixer.

29. The process of claim 25, wherein the shear unit comprises at least the impeller tank mixer comprising an impeller.

30. The process of claim 25, wherein the dewatering unit comprises a deposition site for receiving the flocculated tailings stream, allowing formation of a flocculated tailings deposit and release of water from the flocculated tailings deposit.

31. The process of claim 9, further comprising pre-screening the fine tailings prior to the shear thinning to remove coarse debris.

32. A process for treating fine tailings, comprising:
shear thinning the fine tailings to produce a shear thinned fluid stream having reduced yield stress, wherein the shear thinning comprises flowing the fine tailings through a static vane mixer, an impeller tank mixer, a mixer comprising a rotor-stator assembly, or a combination thereof;
adding a flocculant into the thinned fluid stream at an addition point to produce a flocculated tailings stream comprising water and flocs;
supplying the flocculated tailings stream via a pipeline directly from the addition point to a dewatering step to allow water to separate from the flocs; and
wherein the fine tailings are selected from the group consisting of tailings that have matured in a tailings pond, oil sands mature fine tailings, tailings derived from an oil sands extraction operation, and tailings material retrieved from a tailings pond.

33. A method for increasing water release from a flocculated fine tailings stream, comprising reducing bitumen content in a fine tailings material prior to mixing a flocculant therewith and subjecting the flocculated fine tailings stream to dewatering; wherein the bitumen content is reduced below 5 wt % on a total solids basis to produce a hydrocarbon depleted tailings stream, the flocculant is added to the bitumen depleted tailings stream in-line to form the flocculated fine tailings stream, and the flocculated fine tailings stream is supplied via a pipeline directly to a sub-aerial deposition site for deposition and water release; wherein the fine tailings material is subjected to shear thinning to produce a shear thinned tailings having reduced yield stress prior to mixing of the flocculant therewith, wherein the fine tailings are selected from the group consisting of tailings that source have matured in a tailings pond, oil sands mature fine tailings, tailings derived from an oil sands extraction operation, and tailings material retrieved from a tailings pond; and wherein the shear thinning comprises flowing the fine tailings through a static vane mixer, an impeller tank mixer, a mixer comprising a rotor-stator assembly, or a combination thereof.

34. A process for treating fine tailings comprising hydrocarbons, comprising:
removing an amount of the hydrocarbons from the fine tailings to provide a hydrocarbon depleted tailings stream having a hydrocarbon content below 5 wt % on a total solids basis;
in-line mixing a flocculant into the hydrocarbon depleted tailings stream to produce a flocculated tailings stream comprising water and flocs; and
supplying the flocculated tailings stream via a pipeline directly to a sub-aerial deposition site for deposition and water release;
wherein the fine tailings material is subjected to shear thinning to produce a shear thinned tailings having reduced yield stress prior to mixing of the flocculant therewith, wherein the shear thinning comprises flowing the fine tailings through a static vane mixer, an impeller tank mixer, a mixer comprising a rotor-stator assembly, or a combination thereof, and wherein the fine tailings are selected from the group consisting of tailings that have matured in a tailings pond, oil sands mature fine tailings, tailings derived from an oil sands extraction operation, and tailings material retrieved from a tailings pond.

35. A method for increasing water release from a flocculated fine tailings stream after deposition, comprising reducing hydrocarbon content in a fine tailings prior to mixing a flocculant therewith and subjecting the flocculated fine tailings to dewatering; wherein the hydrocarbon content is reduced below 5 wt % on a total solids basis to produce a hydrocarbon depleted tailings stream, the flocculant is added to the hydrocarbon depleted tailings stream in line to form a flocculated tailings stream, and the flocculated tailings stream is supplied via a pipeline directly to a sub-aerial deposition site for deposition and water release, wherein the fine tailings material is subjected to shear thinning to produce a shear thinned tailings having reduced yield stress prior to mixing of the flocculant therewith, wherein the shear thinning comprises flowing the fine tailings through a static vane mixer, an impeller tank mixer, a mixer comprising a rotor-stator assembly, or a combination thereof, and wherein the fine tailings are selected from the group consisting of tailings that have matured in a tailings pond, oil sands mature fine tailings, tailings derived from an oil sands extraction operation, and tailings material retrieved from a tailings pond.

36. A process for treating fine tailings, comprising:
determining clay content of the fine tailings;
dosing a flocculant in accordance with the clay content of the fine tailings and mixing the flocculant into the fine tailings to produce a flocculated fine tailings stream comprising water and flocs; and
pipelining the flocculated fine tailings stream to a dewatering step to allow water to separate from the flocs; and
wherein the fine tailings are subjected to shear thinning prior to mixing the flocculant into the fine tailings, wherein the shear thinning comprises flowing the fine tailings through a static vane mixer, an impeller tank mixer, a mixer comprising a rotor-stator assembly, or a combination thereof, and wherein the fine tailings are selected from the group consisting of tailings that have matured in a tailings pond, oil sands mature fine tailings, tailings derived from an oil sands extraction operation, and tailings material retrieved from a tailings pond.

37. A process for treating fine tailings, comprising:
providing a fine tailings stream having a sand-to-fines ratio (SFR) of below 0.5;
in-line mixing a flocculant into the fine tailings stream to produce a flocculated fine tailings stream; and
supplying all of the flocculated fine tailings stream via a pipeline directly from the in-line mixing to a sub-aerial deposition site for deposition and water release;
wherein the fine tailings stream is subjected to shear thinning to produce a shear thinned tailings having reduced yield stress prior to mixing of the flocculant therewith, wherein the shear thinning comprises flowing the fine tailings through a static vane mixer, an impeller tank mixer, a mixer comprising a rotor-stator assembly, or a combination thereof, and wherein the fine tailings are selected from the group consisting of tailings that have matured in a tailings pond, oil sands mature fine tailings, tailings derived from an oil sands extraction operation, and tailings material retrieved from a tailings pond.

38. A process for treating fine tailings, comprising:
co-adding sand and calcium to the fine tailings;
mixing a flocculant into the fine tailings to produce a mixture; and
dewatering the mixture to allow water to separate from flocs;
wherein the adding of the sand provides the fine tailings with a sand-to-fines ratio (SFR) of at least 0.5, at least 0.006 grams of calcium per gram of clay is added to the fine tailings, the calcium is added to the fine tailings with a reaction time of at least 12 hours prior to mixing the flocculant therewith; and
wherein the fine tailings stream is subjected to shear thinning to produce a shear thinned tailings having reduced yield stress prior to mixing of the flocculant therewith, wherein the shear thinning comprises flowing the fine tailings through a static vane mixer, an impeller tank mixer, a mixer comprising a rotor-stator assembly, or a combination thereof, and wherein the fine tailings are selected from the group consisting of tailings that have matured in a tailings pond, oil sands mature fine tailings, tailings derived from an oil sands extraction operation, and tailings material retrieved from a tailings pond.

39. The process of claim 38, wherein the calcium is added to the fine tailings with a reaction time of at least eight weeks prior to mixing the flocculant therewith.

40. A method of increasing water release from flocculated fine tailings, comprising providing the fine tailings with a sand and calcium content prior to mixing a flocculant therewith and subjecting the flocculated fine tailings to dewatering, wherein the sand and calcium content in the fine tailings are provided such that a sand-to-fines ratio (SFR) of the fine tailings is at least 0.5, and the calcium is present in the fine tailings with a reaction time of at least 12 hours prior to mixing the flocculant therewith; wherein the fine tailings stream is subjected to shear thinning to produce a shear thinned tailings having reduced yield stress prior to mixing of the flocculant therewith, wherein the shear thinning comprises flowing the fine tailings through a static vane mixer, an impeller tank mixer, a mixer comprising a rotor-stator assembly, or a combination thereof, and wherein the fine tailings are selected from the group consisting of tailings that have matured in a tailings pond, oil sands mature fine tailings, tailings derived from an oil sands extraction operation, and tailings material retrieved from a tailings pond.

41. A process for treating fine tailings, comprising:
adding calcium to the fine tailings;
mixing a flocculant into the fine tailings to produce a mixture;
dewatering the mixture to allow water to separate from flocs;
wherein the calcium is added in an amount between 20 ppm and 2000 ppm and with a reaction time prior to flocculation of at least 12 hours;
wherein the fine tailings stream is subjected to shear thinning to produce a shear thinned tailings having reduced yield stress prior to mixing of the flocculant therewith, and wherein the fine tailings are selected from the group consisting of tailings that have matured in a tailings pond, oil sands mature fine tailings, tailings derived from an oil sands extraction operation, and tailings material retrieved from a tailings pond; and
wherein the shear thinning is performed in a shear unit comprising a static mixer, an impeller mixer, a mixer comprising a rotor-stator assembly, or a combination thereof.

42. A process for treating fine tailings, comprising:
providing a flow of fine tailings by operating a retrieval assembly comprising a dredge or a pump;
transporting the flow of the fine tailings via a supply pipeline having an upstream end coupled to the dredge or the pump and having a downstream end coupled to a mechanical shear unit;
shear thinning the flow of fine tailings in the mechanical shear unit to produce a shear thinned fine tailings stream having a reduced yield stress;
subjecting the shear thinned fine tailings to flocculation in a flocculation unit to produce a flocculated tailings stream comprising water and flocs;
supplying the flocculated tailings stream through a pipeline directly from the flocculation unit to a dewatering location and discharging the flocculated tailings stream into the dewatering location to allow water to separate from the flocs; and
wherein the fine tailings are selected from the group consisting of tailings that have matured in a tailings pond, oil sands mature fine tailings, tailings derived from an oil sands extraction operation, and tailings material retrieved from a tailings pond.

* * * * *